(12) United States Patent
Miyamoto et al.

(10) Patent No.: US 11,479,569 B2
(45) Date of Patent: Oct. 25, 2022

(54) COMPOUND, PHOTOPOLYMERIZATION INITIATOR, PHOTOCURABLE COMPOSITION AND CURED PRODUCT THEREOF, AND PHOTOCURABLE INK AND PRINT USING THE SAME

(71) Applicant: DIC Corporation, Tokyo (JP)

(72) Inventors: Masanori Miyamoto, Sakura (JP); Tomokazu Yamada, Tokyo (JP); Yong Fang, Qingdao (CN); Fangxi Xiu, Qingdao (CN); Changjun Deng, Qingdao (CN)

(73) Assignee: DIC CORPORATION, Tokyo (JP)

( * ) Notice: Subject to any disclaimer, the term of this patent is extended or adjusted under 35 U.S.C. 154(b) by 319 days.

(21) Appl. No.: 16/645,858

(22) PCT Filed: Oct. 10, 2017

(86) PCT No.: PCT/CN2017/105521
§ 371 (c)(1),
(2) Date: Mar. 10, 2020

(87) PCT Pub. No.: WO2019/071428
PCT Pub. Date: Apr. 18, 2019

(65) Prior Publication Data
US 2020/0270286 A1    Aug. 27, 2020

(51) Int. Cl.
| | | |
|---|---|---|
| *C07F 9/53* | (2006.01) | |
| *C08F 20/28* | (2006.01) | |
| *C09D 11/101* | (2014.01) | |
| *C09D 11/107* | (2014.01) | |
| *C09D 11/322* | (2014.01) | |
| *C09D 11/38* | (2014.01) | |

(52) U.S. Cl.
CPC ............ *C07F 9/5337* (2013.01); *C08F 20/28* (2013.01); *C09D 11/101* (2013.01); *C09D 11/107* (2013.01); *C09D 11/322* (2013.01); *C09D 11/38* (2013.01)

(58) Field of Classification Search
CPC ...... C07F 9/5337; C07F 9/3252; C08F 20/28; C09D 11/101; C09D 11/107; C09D 11/322; C09D 11/38; C09D 11/03
See application file for complete search history.

(56) References Cited

U.S. PATENT DOCUMENTS

| | | | |
|---|---|---|---|
| 2009/0186163 A1* | 7/2009 | Umebayashi | C09D 11/101 522/63 |
| 2010/0168359 A1 | 7/2010 | Domschke et al. | |
| 2010/0313782 A1 | 12/2010 | Loccufier et al. | |
| 2015/0197651 A1 | 7/2015 | Fukagawa | |
| 2016/0108264 A1* | 4/2016 | Yamada | C09D 133/14 522/27 |
| 2019/0177508 A1* | 6/2019 | Tsuyama | C09D 11/101 |

FOREIGN PATENT DOCUMENTS

| | | |
|---|---|---|
| JP | 2011-500932 A | 1/2011 |
| JP | 2012-46456 A | 3/2012 |
| JP | 2012-513998 A | 6/2012 |
| WO | 2014/051026 A1 | 4/2014 |
| WO | 2015/181332 A1 | 12/2015 |

OTHER PUBLICATIONS

International Search Report dated Jul. 6, 2018, issued in counterpart application No. PCT/CN2017/105521 (3 pages).

* cited by examiner

*Primary Examiner* — Jessica M Roswell
(74) *Attorney, Agent, or Firm* — WHDA, LLP

(57) ABSTRACT

There are provided a compound represented by general formula (1), a photopolymerization initiator comprising this compound, a photocurable composition having this photopolymerization initiator and a photocurable compound as essential components, and a cured product formed by curing this photocurable composition, wherein in formula (1), $R^1$ and $R^2$ each independently represents an alkyl group or the like; $R^3$ to $R^5$ each independently represent a hydrogen atom, an alkyl group or the like; $X^1$ represents a single bond or an alkylene group; and $X^2$ represents a bonding group represented by general formulas (2) to (4), and wherein n represents an integer of 1 to 6, when n is an integer of 1, Y represents an alkyl group, an aryl group or the like.

9 Claims, 8 Drawing Sheets

COMPOUND, PHOTOPOLYMERIZATION INITIATOR, PHOTOCURABLE COMPOSITION AND CURED PRODUCT THEREOF, AND PHOTOCURABLE INK AND PRINT USING THE SAME

TECHNICAL FIELD

This invention relates to a novel compound useful as a photopolymerization initiator, and a photocurable composition containing this photopolymerization initiator, a cured product thereof, a photocurable ink comprising the photopolymerization initiator described above, and a print using this ink.

BACKGROUND ART

In the past, from the view point of high production efficiency, low cost of curing energy, and the reduction of VOCs, the photocuring systems have been widely used. Here, compared to other photocuring systems, facilities of ultraviolet-curing systems have become the mainstream due to low cost of introduction and small disposition area.

Unlike the reactive monomers which become high molecular weight matters and are fixed in the cured films after curing, with respect to the photopolymerization initiator as an essential component in an ultraviolet-curing system, the photopolymerization initiator itself or a decomposition product thereof remains in the cured product. Most of the monoacyl phosphine oxide photopolymerization initiators used at present and the acyl phosphine oxide compounds described in Patent Documents 1 and 2 are low molecular weight compounds. Therefore, the residual photopolymerization initiator itself or a decomposition product thereof is also low molecular weight, and always becomes a reason for an unpleasant odor or the like.

In turn, in recent years, it is further indicated that this residue may transfer (migrate) to a side of a substance in contact with a cured product. In particular, with respect to a photocurable ink used in a print for a food package, the residue may migrate to the back side of the print in direct contact with food. Therefore, the provisions related to the migration of photopolymerization initiators become stricter gradually.

With regard to this problem of migration, attempts have been made to reduce the migration of the photopolymerization initiator itself or the migration of the decomposition product thereof by achieving the high polymerization or multi-functionalization of the photopolymerization initiator itself or allowing the compound to have polymerizable functional groups in the molecule. For example, Patent Document 3 discloses a polymerizable composition comprising a highly polymerized photopolymerization initiator or a polymerizable initiator. Furthermore, Patent Document 4 discloses an acyl phosphine oxide compound having a polymerizable functional group. However, when this compound is used, the phosphoryl free radicals having a higher reactivity enter a cured film while the benzoyl free radicals having a lower reactivity do not enter the cured film, and as a result, benzaldehyde compounds gradually migrate and therefore there is a problem of reduced safety for the prints.

Furthermore, Patent Document 5 discloses a highly polymerized and multi-functionalized acyl phosphine oxide photopolymerization initiator. However, a low molecular weight decomposition product benzaldehyde will also be generated at this point, and therefore there is a problem of reduced safety.

PRIOR ART DOCUMENTS

Patent Documents

Patent Document 1: JP 2012-513998A
Patent Document 2: JP 2012-46456A
Patent Document 3: JP 2011-500932A
Patent Document 4: WO 2014/051026
Patent Document 5: International Publication WO2015/181332

SUMMARY OF THE INVENTION

Problems to be Solved by the Invention

Therefore, the problem to be solved by this invention is to provide a novel acyl phosphine oxide compound which can reduce the migration of unreacted initiator residues and initiator decomposition products after curing and can exhibit an excellent curability when being used as a photopolymerization initiator; a photopolymerization initiator using the same; and a photocurable composition containing the photopolymerization initiator.

Means for Solving the Problems

This inventor has repeated intensive investigations and it is found that by using a high molecular weight compound having a plurality of free radical generation sites in the molecular structure and having a specific molecular structure as a photopolymerization initiator used in a photocurable composition, not only can the migration of unreacted residues of this photopolymerization initiator after curing be effectively reduced, but the migration of the decomposition products thereof can be also effectively reduced. Also, the photocurable composition has an excellent curability, and the coloring of cured products can be reduced. Thus, this invention has been completed.

That is, this invention provides a compound, which is represented by general formula (1):

[Chemical formula 0]

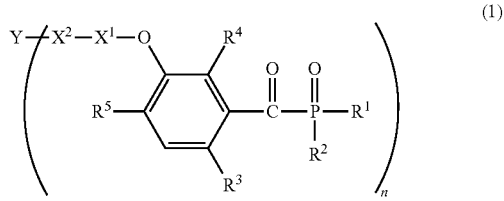

(in formula (1), $R^1$ and $R^2$ each independently represent an alkyl group, an aryl group, or an alkoxy group; $R^3$ to $R^5$ each independently represent a hydrogen atom, an alkyl group having a carbon atom number of 1 to 4, or an alkoxy group having a carbon atom number of 1 to 4; $X^1$ represents a single bond or an optionally branched alkylene group having a carbon atom number of 1 to 6; and $X^2$ represents a bonding group represented by general formulas (2) to (4),

[Chemical formula 0]

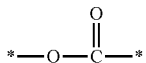

(2)

[Chemical formula 0]

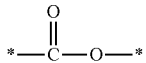

(3)

[Chemical formula 0]

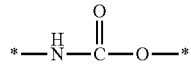

(4)

n represents an integer of 1 to 6; when n is an integer of 1, Y represents an alkyl group, an aryl group, a structural moiety (y-3) represented by formula (y-3), a structural moiety (y-5) represented by formula (y-5), a structural moiety (y-8) represented by formula (y-8), a structural moiety (y-9) represented by formula (y-9); and when n is an integer of 2 to 6, Y represents a 2- to 6-valent linking group.)

[Chemical formula 5]

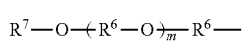

(y-3)

(In the formula, $R^6$ represents an alkylene group having a carbon atom number of 2 to 4; $R^7$ represents a hydrogen atom or a phenyl group or an alkyl group having a carbon atom number of 1 to 4; and m represents an integer of 1 to 20.)

[Chemical formula 6]

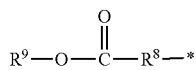

(y-5)

(In the formula, $R^8$ represents an alkylene group having a carbon atom number of 1 to 18 or an arylene group having a carbon atom number of 6 to 18; and $R^9$ represents an alkyl group having a carbon atom number of 1 to 18 or an aryl group having a carbon atom number of 6 to 18.)

[Chemical formula 7]

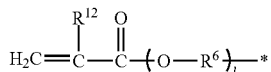

(y-8)

(In the formula, $R^6$ represents an alkylene group having a carbon atom number of 2 to 4; $R^{12}$ represents a hydrogen atom or a methyl group; and l represents an integer of 2 to 20.)

[Chemical formula 8]

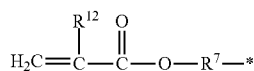

(y-9)

(In the formula, $R^7$ represents an alkylene group having a carbon atom number of 1 to 18; and $R^{12}$ represents a hydrogen atom or a methyl group.) Moreover, this invention provides a photopolymerization initiator, comprising the compound described above.

Moreover, this invention provides a photocurable composition, comprising the photopolymerization initiator described above and a photocurable compound as essential components.

Moreover, this invention provides a cured product, which is a cured product formed by curing the photocurable composition described above.

Moreover, this invention provides a photocurable ink, comprising the photocurable composition described above.

Moreover, this invention provides a print, which is a print formed by printing the photocurable ink described above on a base material, wherein the print comprises a benzaldehyde compound (2a), an alkyl phosphine oxide compound (2b), or an alkyl phosphinic acid compound (2c), and wherein the migration concentration of the compound (2a) as measured by the following method is 50 ppb or less, the migration concentration of the compound (2b) as measured by the following method is 50 ppb or less, and the migration concentration of the compound (2c) as measured by the following method is 50 ppb or less.

the method for measurement comprises the steps of:
performing overlapping in a manner of bringing the back side of a milk carton white board in a non-printed state into contact with a cured ink layer evenly printed on a milk carton board, and pressurizing at 25° C. for 48 hours under a press pressure of 40 kg/cm²;

manufacturing a liquid container having a volume of 1000 ml from this milk carton white board in a non-printed state after pressurization;

injecting 1000 ml of an aqueous ethanol solution (a mixed solution of 95 wt % ethanol and 5 wt % pure water) into this liquid container and enclosing the liquid container;

keeping the liquid container at room temperature at 25° C. for 24 hours for extracting the ink components transferred to the back side of the milk carton white board into the aqueous ethanol solution; and withdrawing the aqueous ethanol solution from the liquid container, and quantifying the dissolution concentrations of the compound (2a), the compound (2b), and the compound (2c) by a LC/MS/MS analysis as the migration concentrations.

Effects of the Invention

According to this invention, there may be provided a novel compound which can reduce the migration of the unreacted initiator residues and initiator decomposition products after curing and can exhibit an excellent curability and coloring reduction of cured products when used as a photopolymerization initiator; a photopolymerization initiator using the same; and a photocurable composition containing this photopolymerization initiator.

DESCRIPTION OF EMBODIMENTS

Figure 1:
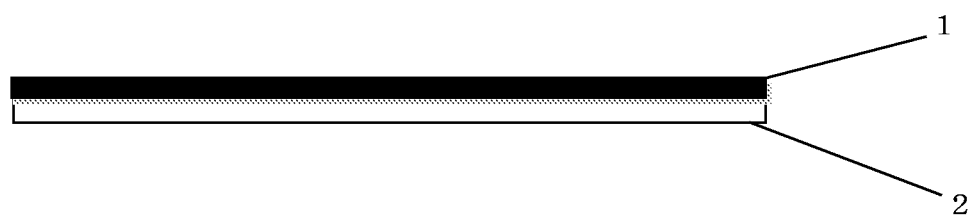
FIG. 1 is a graph illustrating a print, which is obtained by irradiating a print, obtained by using the photocurable composition of this invention as an ink and performing development, with ultraviolet light so as to cure an ink layer.

As described above, the novel compound of this invention is a compound, characterized in that it is represented by general formula (1):

[Chemical formula 0]

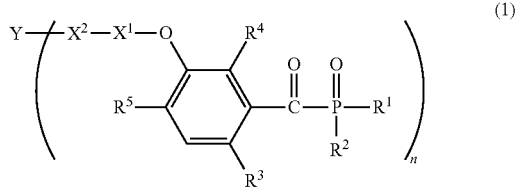

(1)

In general formula (1), $R^1$ and $R^2$ each independently represent:

an alkyl having a carbon atom number of 1 to 12, such as a methyl group, an ethyl group, a propyl group, an isopropyl group, a n-butyl group, an isobutyl group, a t-butyl group, a s-butyl group, a pentyl group, a hexyl group, a heptyl group, an octyl group, a nonyl group, a decanyl group, a 2-ethylbutyl group, an isopentyl group, a 1-methylpentyl group, a 1,3-dimethylbutyl group, a 1-methylhexyl group, an isoheptyl group, a 1,1,3,3-tetramethylbutyl group, a 2,2,4,4-tetramethylbutyl group, a 1-methylheptyl group, a 3-methylheptyl group, a 2-ethylhexyl group, a 1,1,3-trimethylhexyl group, a 1,1,3,3-tetramethyl pentyl group, an isodecanyl group or the like;

an aryl group having a carbon atom number of 6 to 15, such as a phenyl group, a benzyl group, a phenethyl group, a biphenyl group, a naphthyl group, a tolyl group, a xylenyl group, a tritolyl group, an isopropylphenyl group, a chlorophenyl group, a bromophenyl group, a chloromethylphenyl group, a hydroxyphenyl group, a methoxyphenyl group, an ethoxyphenyl group, a phenoxyphenyl group, an acetoxyphenyl group, a benzoyloxyphenyl group, a methylthiophenyl group, a phenylthiophenyl group, a methylaminophenyl group, a dimethylaminophenyl group, an acetylaminophenyl group, a carboxyphenyl group, a methoxycarbonylphenyl group, a phenoxycarbonylphenyl group, a N-phenylcarbamoylphenyl group, a cyanophenyl group, a sulfophenyl group, a sulfonatephenyl group, a phosphonophenyl group, a phosphonatephenyl group or the like; or an alkoxy group having a carbon atom number of 1 to 6, such as a methoxy group, an ethoxy group, a propoxy group, a butoxy group, a hexyloxy group or the like.

$R^3$ to $R^5$ each independently represent: a hydrogen atom; an alkyl group having a carbon atom number of 1 to 4, such as a methyl group, an ethyl group, a propyl group, an isopropyl group, a n-butyl group, an isobutyl group, a t-butyl group, a s-butyl group, a pentyl group, a hexyl group or the like; or an alkoxy group having a carbon atom number of 1 to 4, such as a methoxy group, an ethoxy group, a propoxy group, a butoxy group or the like.

Furthermore, $X^1$ represents a single bond or an optionally branched alkylene group having a carbon atom number of 1 to 6, such as a methylene group, an ethylene group, a propylene group, an isopropylene group, a n-butylene group, an isobutylene group, a s-butylene group, a pentylene group, a hexylene group or the like; and $X^2$ represents a bonding group represented by general formulas (2) to (4).

[Chemical formula 0]

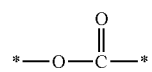

(2)

[Chemical formula 0]

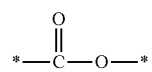

(3)

[Chemical formula 0]

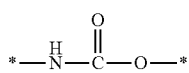

(4)

n represents an integer of 1 to 6.

When n is an integer of 1, Y represents:

an alkyl group having a carbon atom number of 8 to 18, such as an octyl group, a nonyl group, a decanyl group, a 2-ethylbutyl group, an isopentyl group, a 1-methylpentyl group, a 1,1,3,3-tetramethylbutyl group, a 2,2,4,4-tetramethylbutyl group, a 1-methylheptyl group, a 3-methylheptyl group, a 2-ethylhexyl group, a 1,1,3-trimethylhexyl group, a 1,1,3,3-tetramethylpentyl group, an isodecanyl group, a dodecyl group, a stearyl group or the like;

an aryl group having a carbon atom number of 8 to 15, such as a phenethyl group, a biphenyl group, a naphthyl group, a tolyl group, a xylenyl group, a tritolyl group, an isopropylphenyl group, a phenoxyphenyl group, an acetoxyphenyl group, a benzoyloxyphenyl group, a methylthiophenyl group, a phenylthiophenyl group, a methylaminophenyl group, a dimethylaminophenyl group, an acetylaminophenyl group, a carboxyphenyl group, a methoxycarbonylphenyl group, a phenoxycarbonylphenyl group, a N-phenylcarbamoylphenyl group or the like; or a structural moiety (y-3) represented by formula (y-3), a structural moiety (y-5) represented by formula (y-5), a structural moiety (y-8) represented by formula (y-8), a structural moiety (y-9) represented by formula (y-9), and when n is an integer of 2 to 6, Y represents a 2- to 6-valent linking group.

[Chemical formula 9]

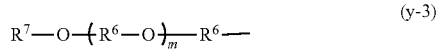

(y-3)

(in the formula, $R^6$ represents an alkylene group having a carbon atom number of 2 to 4; $R^7$ represents a hydrogen atom or a phenyl group or an alkyl group having a carbon atom number of 1 to 4; and m represents an integer of 1 to 20.)

[Chemical formula 10]

(y-5)

(in the formula, $R^8$ represents an alkylene group having a carbon atom number of 1 to 18 or an arylene group having a carbon atom number of 6 to 18; and $R^9$ represents an alkyl group having a carbon atom number of 1 to 18 or an aryl group having a carbon atom number of 6 to 18.)

[Chemical formula 11]

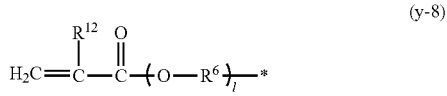

(y-8)

(in the formula, $R^6$ represents an alkylene group having a carbon atom number of 2 to 4; $R^{12}$ represents a hydrogen atom or a methyl group; and l represents an integer of 2 to 20.)

[Chemical formula 12]

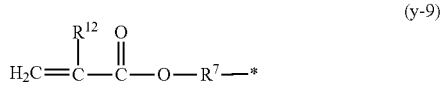

(y-9)

(in the formula, $R^7$ represents an alkylene group having a carbon atom number of 1 to 18; and $R^{12}$ represents a hydrogen atom or a methyl group.)

Here, in the structural formula moiety (y-3) described above, the alkylene group having a carbon atom number of 2 to 4 as $R^6$, may be exemplified by an ethylene group, a n-propylene group, a 1,2-propylene group, a n-butylene group, a 2-methylpropan-1,2-diyl group or the like. Furthermore, the alkyl group having a carbon atom number of 1 to 4 as $R^7$ may be exemplified by a methyl group, an ethyl group, a propyl group, an isopropyl group, a n-butyl group, an isobutyl group, a t-butyl, s-butyl group or the like.

Here, in the structural formula moiety (y-5) described above, the alkylene group having a carbon atom number of 1 to 18 as $R^8$ may be exemplified by an ethylene group, a n-propylene group, a 1,2-propylene group, a n-butylene group, a 2-methylpropan-1,2-diyl group, a 1,5-pentanediyl group, a 1,6-hexanediyl group, a 1,7-heptanediyl group, a 1,8-octanediyl group, a 1,9-nonanediyl group, a 1,10-decanediyl group, a 3,8-decanediyl group, a 1,11-undecanediyl group, a 1,12-dodecanediyl group, a 1,13-tridecanediyl group, a 1,14-tetradecanediyl group, a 1,15-pentadecanediyl group, a 1,16-hexadecanediyl group, a 1,17-heptadecanediyl group, a 1,18-octadecanediyl group, a 1,4-cyclohexanediyl group, a 1,4-dimethylcyclohexanediyl group, a xylylenediyl group or the like. The arylene group having a carbon atom number of 6 to 18 as $R^8$ may be exemplified by a phenylene group, a naphthylene group or the like.

The alkyl having a carbon atom number of 8 to 18 as $R^9$ may be exemplified by a methyl group, an ethyl group, a propyl group, an isopropyl group, a n-butyl group, an isobutyl group, a t-butyl group, a s-butyl group, a pentyl group, a hexyl group, a heptyl group, an octyl group, a nonyl group, a decanyl group, a 2-ethylbutyl group, an isopentyl group, a 1-methylpentyl group, a 1,1,3,3-tetramethylbutyl group, a 2,2,4,4-tetramethylbutyl group, a 1-methylheptyl group, a 3-methylheptyl group, a 2-ethylhexyl group, a 1,1,3-trimethylhexyl group, a 1,1,3,3-tetramethyl pentyl group, an isodecanyl group, a dodecyl group, a stearyl group or the like.

Furthermore, the aryl group having a carbon atom number of 6 to 18 may be exemplified by a phenethyl group, a biphenyl group, a naphthyl group, a tolyl group, a xylenyl group, a tritolyl group, an isopropylphenyl group, a phenoxyphenyl group, an acetoxyphenyl group, a benzoyloxyphenyl group, a methylthiophenyl group, a phenylthiophenyl group, a methylaminophenyl group, a dimethylaminophenyl group, an acetylaminophenyl group, a carboxyphenyl group, a methoxycarbonylphenyl group, a phenoxycarbonylphenyl group, a N-phenylcarbamoylphenyl group or the like.

The meaning of $R^6$ in the structural moiety (y-8) described above is the same as that of $R^6$ in the structural moiety (y-3).

In the structural moiety (y-9) described above, the alkylene group having a carbon atom number of 1 to 18 as $R^6$ may be exemplified by the groups equivalent to the alkylene group having a carbon atom number of 1 to 18 as $R^8$ described above.

When n is an integer of 1, the molecular weight of the linking group represented by Y is preferably 100 or more, from the view point of inhibiting migration of decomposition products. Furthermore, the reactivity will be reduced when the molecular weight becomes remarkably excessively large, and therefore it is preferably 1500 or less and more preferably 150 to 500. It is to be indicated that the molecular weight of Y refers to a molecular weight calculated from the sum of atomic weights of the atom species constituting Y.

In the structural moiety represented by Y in the general formula (1) described above in detail, the structural moiety (y-5) described above and the structural moiety (y-8) described above are preferable, in particular from the view point of good effect of reducing migration after curing, and the structural moiety (y-8) are particularly preferable, in particular from the view point of being a compound which has an acryl group and has more significant curability and migration-resistant effect of ink coating films.

Furthermore, when n is an integer of 2 to 6, Y represents a 2- to 6-valent linking group.

As a 2-valent linking group, it represents a substituted or unsubstituted alkylene group, a substituted or unsubstituted arylene group, a substituted or unsubstituted 2-valent heterocyclic group, a substituted or unsubstituted alkenylene group, or a 2-valent linking group formed by combining such substituted or unsubstituted alkylene group, substituted or unsubstituted arylene group, substituted or unsubstituted 2-valent heterocyclic group, substituted or unsubstituted alkenylene group with —O—, —S—, —CO—, —$CO_2$—.

The substituted or unsubstituted alkylene group in Y may be exemplified by, but not limited to, a bivalent group obtained by removing one hydrogen atom from a substituent which is the same as the alkyl group described above.

The substituted or unsubstituted arylene group in Y may be exemplified by a bivalent group obtained by removing one hydrogen atom from the aryl group described above.

The substituted or unsubstituted alkenylene group in Y may be exemplified by a bivalent group obtained by removing one hydrogen atom from a linear, branched, monocyclic, or fused polycyclic alkenyl group having a carbon atom number of 2 to 18. The linear, branched, monocyclic, or fused polycyclic alkenyl group having a carbon atom number of 2 to 18 may have a plurality of carbon-carbon double bonds, and may be exemplified by an ethylenyl group, a 1-propenyl group, an allyl group, a 2-butenyl group, a 3-butenyl group, an isopropenyl group, an isobutylenyl group, a 1-pentenyl group, a 2-pentenyl group, a 3-pentenyl group, a 4-pentenyl group, a 1-hexenyl group, a 2-hexenyl group, a 3-hexenyl group, a 4-hexenyl group, a 5-hexenyl group, a cyclopentenyl group, a cyclohexenyl group, a 1,3-butadienyl group, a cyclohexadienyl group, a cyclopentadienyl group or the like, as specific examples, but not limited to them.

Furthermore, as a 3-valent linking group, it may be specifically exemplified by an alkanetriyl group, a cycloalkanetriyl group, an arenetriyl group, a triazinyl group, and a cyanuric acid group.

Furthermore, as a 4-valent linking group, it may be exemplified by an alkanetetrayl group, a cycloalkanetetrayl group, an arenetetrayl group or the like.

Furthermore, as a 5-valent linking group, it may be exemplified by an alkanepentayl group, a cycloalkanepentayl group, an arenepentayl group or the like.

Furthermore, as a 6-valent linking group, it may be exemplified by an alkanehexayl group, a cycloalkanehexayl group, an arenehexayl group or the like.

Among the 2- to 6-valent linking groups in Y, the specific examples comprising a combination of a plurality of groups are exemplified below. It may be exemplified by, for example:

2-valent linking groups formed by performing ester condensation of a 2-valent group (such as an ethylene group, a n-propylene group, a 1,2-propylene group, a n-butylene group, a 2-methylpropan-1,2-diyl group, a 1,5-pentanediyl group, a 1,6-hexanediyl group, a 1,7-heptanediyl group, a 1,8-octanediyl group, a 1,9-nonanediyl group, a 1,10-decanediyl group, a 3,8-decanediyl group, a 1,11-undecanediyl group, a 1,12-dodecanediyl group, a 1,13-tridecanediyl group, a 1,14-tetradecanediyl group, a 1,15-pentadecanediyl group, a 1,16-hexadecanediyl group, a 1,17-heptadecanediyl group, a 1,18-octadecanediyl group, a 1,4-cyclohexanediyl group, a 1,4-dimethylcyclohexanediyl group, a xylylenediyl group or the like) and an ether condensation group thereof with a monocarboxylic acid such as acetic acid, propionic acid, butyric acid or the like;

3- to 6-valent linking groups formed by performing ester condensation of a 3- to 6-valent group of an aliphatic polyol residue (such as a glycerol residue, a trimethylolpropane residue, a pentaerythritol residue or the like) and an ether condensation group thereof with a monocarboxylic acid such as acetic acid, propionic acid, butyric acid or the like, but is not limited thereto.

When n is in a range of 2 to 6, the molecular weight of the linking group represented by Y is preferably in a range of 50 to 1500 and more preferably 100 to 450, from the view point of reactivity. It is to be indicated that the molecular weight of Y refers to a molecular weight calculated from the sum of atomic weights of atom species constituting Y.

More specifically, the novel compound of this invention represented by the general formula (1) described above in detail may be exemplified by, for example, compounds M1 to M39 as shown in Table 0 below.

TABLE 0

| Table 1 | Number of n | Y | *—X²—X¹—* | (R³, R⁴, R⁵ substituted phenyl ether carbonyl) | (Phosphine oxide R¹, R²) |
|---|---|---|---|---|---|
| M1 | 1 | CH₃—(CH₂)₁₀—* | *—C(=O)—O—CH₂CH₂—* | 2,6-dimethyl-4-methylphenyl ether carbonyl | P(=O)(Ph)₂ |
| M2 | 1 | CH₃—(CH₂)₁₆—* | *—C(=O)—O—CH₂CH₂—* | 2,6-dimethyl-4-methylphenyl ether carbonyl | P(=O)(Ph)₂ |
| M3 | 1 | CH₃—(CH₂)₁₇—* | *—C(=O)—CH₂—* | 2,6-dimethyl-4-methylphenyl ether carbonyl | P(=O)(Ph)₂ |
| M4 | 1 | CH₃—(CH₂)₁₇—* | *—C(=O)—CH₂—* | 2,6-dimethyl-4-methylphenyl ether carbonyl | P(=O)(Ph)₂ |

TABLE 0-continued
| Table 1 | Number of n | Y | *—X²—X¹—* | | |
|---|---|---|---|---|---|
| M5 | 1 | 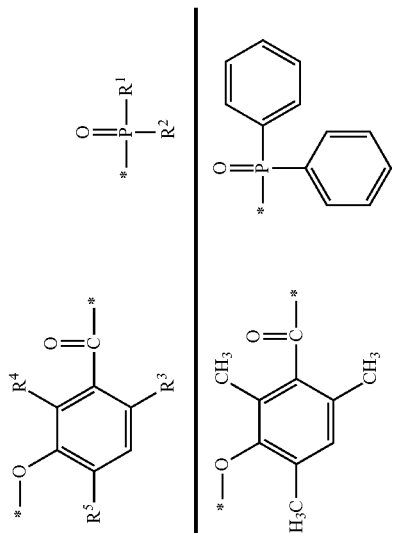 | 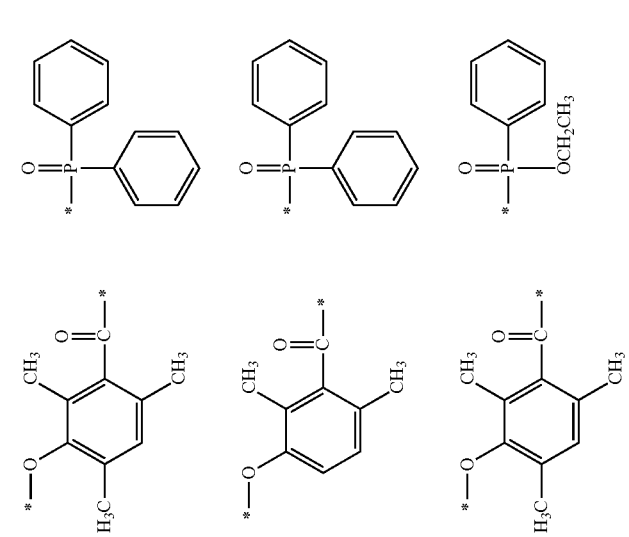 | 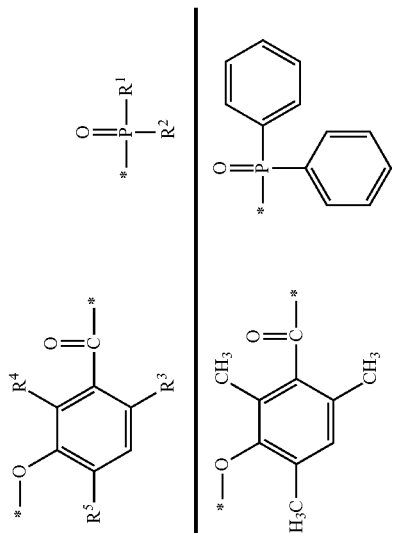 | 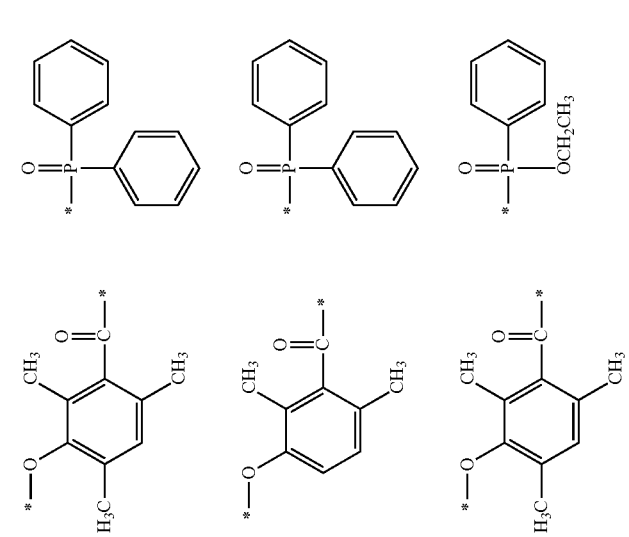 |
| M6 | 2 | 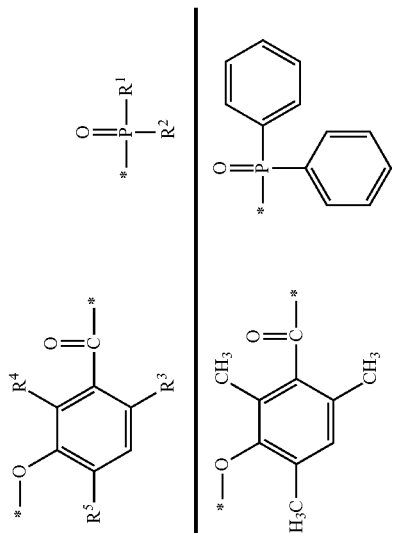 | | 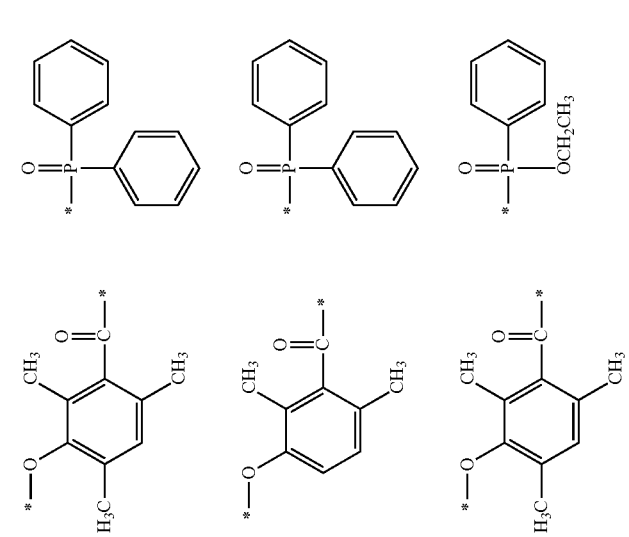 | |
| M7 | 2 | 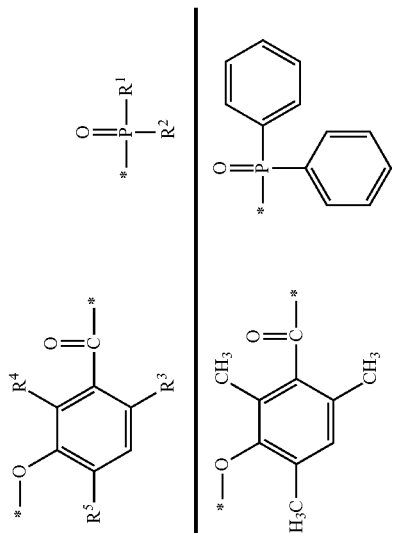 | | | |
| M8 | 2 | 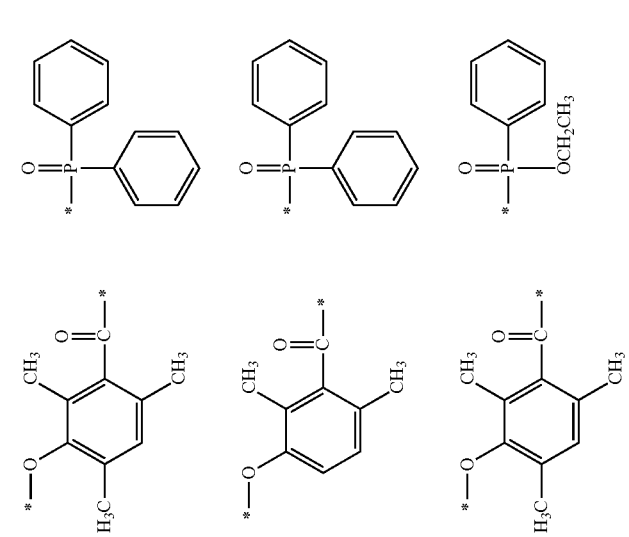 | | | |

TABLE 0-continued

| Table 1 | Number of n | Y | *—X²—X¹—* | [aroyl group] | [phosphine oxide group] |
|---|---|---|---|---|---|
| M9 | 2 | *—CH₂CH₂—C(=O)—O—(CH₂CH₂O)₄—C(=O)—CH₂CH₂—* | *—C(=O)—O—CH₂CH₂—* | 2,6-dimethyl-4-methoxy benzoyl (with H₃C groups) | *—P(=O)(Ph)(C(CH₃)₂CH₃) type (phenyl, C(CH₃)₃)  |
| M10 | 2 | *—CH₂CH₂—C(=O)—O—(CH₂)₆—O—C(=O)—CH₂CH₂—* | *—C(=O)—O—CH₂CH₂—* | 2,6-dimethyl-4-methoxy benzoyl | *—P(=O)(Ph)₂ |
| M11 | 2 | *—CH₂CH₂—C(=O)—O—CH₂—[cyclohexyl]—CH₂—O—C(=O)—CH₂CH₂—* | *—C(=O)—O—CH₂CH₂—* | 2,6-dimethyl-4-methoxy benzoyl | *—P(=O)(Ph)₂ |
| M12 | 2 | *—(CH₂)₄—* | *—C(=O)—O—CH₂CH₂—* | 2,6-dimethyl-4-methoxy benzoyl | *—P(=O)(Ph)₂ |

TABLE 0-continued

| Table 1 | Number of n | Y | *—X²—X¹—* | (aryl ketone group) | (phosphine oxide group) |
|---|---|---|---|---|---|
| M13 | 2 | *—(CH₂)₇—* | *—C(=O)—O—CH₂CH₂—* | 2,6-dimethyl-4-methyl-3-oxy substituted benzoyl | diphenylphosphine oxide |
| M14 | 2 | *—(CH₂)₆—* | *—NH—C(=O)—O—CH₂CH₂—* | 2,6-dimethyl-4-methyl-3-oxy substituted benzoyl | diphenylphosphine oxide |
| M15 | 2 | (trimethyl-substituted cyclohexyl group) | *—NH—C(=O)—O—CH₂CH₂—* | 2,6-dimethyl-4-methyl-3-oxy substituted benzoyl | diphenylphosphine oxide |
| M16 | 2 | (dicyclohexylmethane group) | *—NH—C(=O)—O—CH₂CH₂—* | 2,6-dimethyl-4-methyl-3-oxy substituted benzoyl | diphenylphosphine oxide |

TABLE 0-continued

| Table 1 | Number of n | Y | *—X²—X¹—* | (structure with R³, R⁴, R⁵) | O=P(R¹)(R²) |
|---|---|---|---|---|---|
| M17 | 2 | *—(CH₂)₆—* | *—O—C(=O)—CH₂—* | 2,6-dimethyl-3-oxy-4-methyl-benzoyl | P(=O)(Ph)₂ |
| M18 | 2 | *—CH₂CH₂—(OCH₂CH₂)₃—* | *—O—C(=O)—CH₂—* | 2,6-dimethyl-3-oxy-4-methyl-benzoyl | P(=O)(Ph)₂ |
| M19 | 2 | cyclohexane-1,4-diyl-bis(CH₂) | *—C(=O)—CH₂—* | 2,6-dimethyl-3-oxy-4-methyl-benzoyl | P(=O)(Ph)₂ |
| M20 | 3 | pentaerythritol-based trifunctional | *—O—C(=O)—CH₂CH₂—* | 2,6-dimethyl-3-oxy-4-methyl-benzoyl | P(=O)(Ph)₂ |

TABLE 0-continued

| Table 1 | Number of n | Y | *—X²—X¹—* | (aryl group) | (phosphine oxide) |
|---|---|---|---|---|---|
| M21 | 3 | O—(CH₂—CH₂—O)ₙ—C(=O)—CH₂—CH₂—*<br>CH₂<br>H₃C—CH₂—C—CH₂<br>CH₂<br>O—(CH₂—CH₂—O)ₘ—C(=O)—CH₂—CH₂—*<br>O—(CH₂CH₂—O)ₙ—C(=O)—CH₂—CH₂—*<br>l + m + n = ~4 | *—C(=O)—O—CH₂CH₂—* | 2,6-(CH₃)₂, 4-CH₃ phenyl C(=O)—* with O—* | P(=O)(phenyl)₂—* |
| M22 | 3 | CH₂—*<br>H₃C—CH₂—C—CH₂—*<br>CH₂—* | *—O—C(=O)—CH₂—* | 2,6-(CH₃)₂, 4-CH₃ phenyl C(=O)—* with O—* | P(=O)(phenyl)₂—* |
| M23 | 3 | CH₂—(O—CH₂—CH₂)ₙ—*<br>H₃C—CH₂—C—CH₂—(O—CH₂—CH₂)ₘ—*<br>CH₂—(O—CH₂—CH₂)ₗ—*<br>l + m + n = ~4 | *—O—C(=O)—CH₂—* | 2,6-(CH₃)₂, 4-CH₃ phenyl C(=O)—* with O—* | P(=O)(phenyl)₂—* |

TABLE 0-continued

| Table 1 | Number of n | Y | *—X²—X¹—* | (R³/R⁴/R⁵ aryl group) | (phosphine oxide group) |
|---|---|---|---|---|---|
| M24 | 4 | bis-neopentyl diether structure | *—O—C(=O)—CH₂—* | 2,6-dimethyl-4-methyl phenyl ester | P(=O)(Ph)₂ |
| M25 | 6 | bis-neopentyl diether structure | *—O—C(=O)—CH₂—* | 2,6-dimethyl-4-methyl phenyl ester | P(=O)(Ph)₂ |
| M26 | 1 | H₂C=CH—C(=O)—(OCH₂CH₂)₄—* | *—O—C(=O)—CH₂—* | 2,6-dimethyl-4-methyl phenyl ester | P(=O)(Ph)₂ |
| M27 | 1 | H₂C=CH—C(=O)—O—(CH₂)₆—* | *—O—C(=O)—CH₂—* | 2,6-dimethyl-4-methyl phenyl ester | P(=O)(Ph)₂ |

TABLE 0-continued

| Table 1 | Number of n | Y | *—X²—X¹—* | (R³,R⁴,R⁵ benzoyl group) | (P(=O)R¹R²) |
|---|---|---|---|---|---|
| M28 | 1 | H₂C=CH—C(=O)—(OCH₂CH₂)₄—* | *—O—C(=O)—CH₂—* | 2,6-dimethyl-4-(2-methylpropan-2-yl)benzoyl (via O) | P(=O)(C₆H₅)₂ |
| M29 | 1 | H₂C=CH—C(=O)—O—(CH₂)₆—* | *—O—C(=O)—CH₂—* | 2,6-dimethyl-4-(2-methylpropan-2-yl)benzoyl (via O) | P(=O)(C₆H₅)₂ |
| M30 | 2 | *—CH₂CH₂—C(=O)—O—(CH₂CH₂O)₄—C(=O)—CH₂CH₂—* | *—C(=O)—O—CH₂CH₂—* | 2,6-dimethyl-4-(2-methylpropan-2-yl)benzoyl (via O) | P(=O)(C₆H₅)₂ |
| M31 | 2 | *—CH₂CH₂—C(=O)—O—(CH₂)₆—O—C(=O)—CH₂CH₂—* | *—C(=O)—O—CH₂CH₂—* | 2,6-dimethyl-4-(2-methylpropan-2-yl)benzoyl (via O) | P(=O)(C₆H₅)₂ |

TABLE 0-continued

| Table 1 | Number of n | Y | *—X²—X¹—* | | |
|---|---|---|---|---|---|
| M32 | 2 | | | | |
| M33 | 2 | | | | |
| M34 | 3 | | | | |

TABLE 0-continued

| Table 1 | Number of n | Y | *—X²—X¹—* | | |
|---|---|---|---|---|---|
| M35 | 3 | (structure) | (structure) | (structure) | (structure) |
| M36 | 3 | (structure) | (structure) | (structure) | (structure) |
| M37 | 3 | (structure) | (structure) | (structure) | (structure) |

TABLE 0-continued

| Table 1 | Number of n | Y | *—X²—X¹—* | | |
|---|---|---|---|---|---|
| M38 | 4 | (structure) | *—O—C(=O)—CH₂—* | (structure) | (structure) |
| M39 | 6 | (structure) | *—O—C(=O)—CH₂—* | (structure) | (structure) |

Among the compounds of M1 to M39 described above, from the view point of the good balance between photocurability and low mobility and the availability of raw materials, the compounds of M1, M6, M10, M12, M15, M17, M18, M20, M22, M27, M30 to M34, and M36 are preferable.

The compound of this invention represented by the general formula (1) described above may be synthesized by the following processes: a synthesis process [P1] of an acyl phosphine oxide derivative having the function as an initiator in photocuring; and a condensation process [P2] for increasing the molecular weight of the acyl phosphine oxide derivative obtained by the synthesis process [P1].

In the synthesis process [P1] of the acyl phosphine oxide initiator unit, the synthesis intermediates of the acyl phosphine oxide derivative may be exemplified by an intermediate (A1) and an intermediate (A2) as shown below, which may be synthesized by the synthesis processes represented by P1-1 and P1-2 respectively.

[Chemical formula 0]

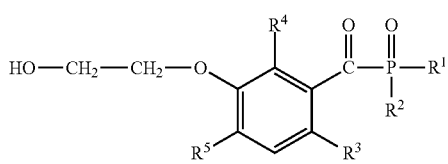

(A1)

[Chemical formula 0]

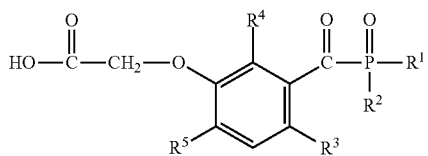

(A2)

The phosphine oxide intermediate represented by the general formula A1 described above may be synthesized by a process I to a process IV below in P1-1.

[Chemical formula 0]

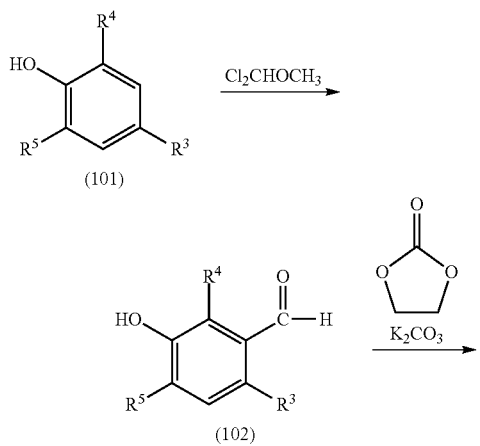

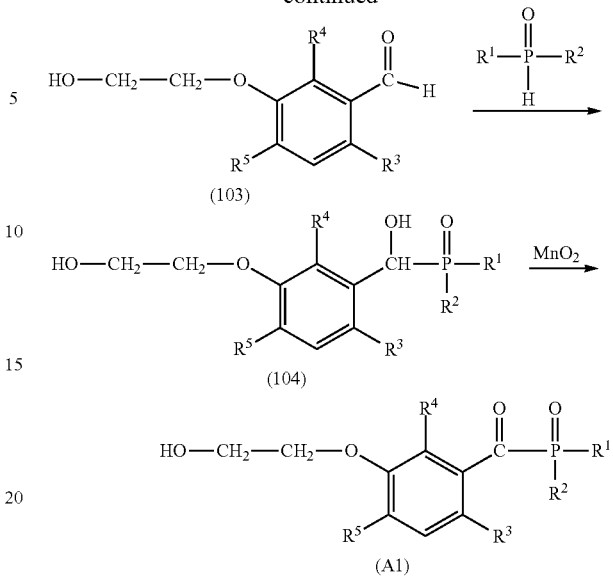

[P1-1]
[Process I]
A di-substituted or tri-substituted phenol compound (101) which is substituted with an alkyl group is used as a starting material and is reacted with a formylating agent so as to be capable of synthesizing a synthesis intermediate (102) in which the m-position of a phenolic hydroxy group is formylated. The formylating agent may be exemplified by the formylating agents derived from dichloromethoxy methane, or a dialkyl amide compound such as N,N-dimethylformaldehyde or the like, and phosphorus oxychloride, or a dialkyl amide compound and thionyl chloride or the like.

[Process II]
Next, by subjecting the phenolic hydroxy group to hydroxyethylation, a synthesis intermediate (103) having a primary hydroxy group on the side chain can be synthesized. As the hydroxyethylation method of the phenolic hydroxy group, a method for allowing the coexistence of a carbonate salt such as potassium carbonate or the like, and an organic amine such as 1,8-diazabicyclo[5,4,0]-7-undecene (DBU) or the like, which are used as basic catalysts, with ethylene glycol carbonate ester or ethylene oxide may be used.

[Process III]
Next, by performing condensation reaction between a dialkyl phosphine oxide compound and the synthesis intermediate (103) which is a benzaldehyde derivative, a α-hydroxy phosphine oxide derivative (104) can be synthesized. Examples of the dialkyl phosphine oxide compound may include diphenyl phosphine oxide, di(p-tolyl)phosphine oxide, bis(3,5-dimethylphenyl)phosphine oxide, phenylmethyl phosphine oxide, phenylethyl phosphine oxide, phenylisopropyl phosphine oxide, phenyl t-butyl phosphine oxide or the like.

[Process IV]
Next, by oxidizing a s-hydroxy group at the α-position of the α-hydroxy phosphine oxide derivative (104) to be a ketone group using an oxidizing agent, an intermediate A1 which is a phosphine oxide derivative can be synthesized. As an example of the oxidizing agent, an inorganic oxidizing agent such as manganese dioxide, potassium permanganate or the like may be used; and a peroxide such as t-butyl hydroperoxide, cumene hydroperoxide, peracetic acid, hydrogen peroxide or the like may be used in the presence of a metal catalyst such as acetylacetone vanadium (IV) oxide salt or the like.

Specific examples of the phosphine oxide intermediate represented by the general formula A1 described above may include A1-1, A1-2, A1-3, A1-4, and A1-5 as shown below.

[Chemical formula 0]

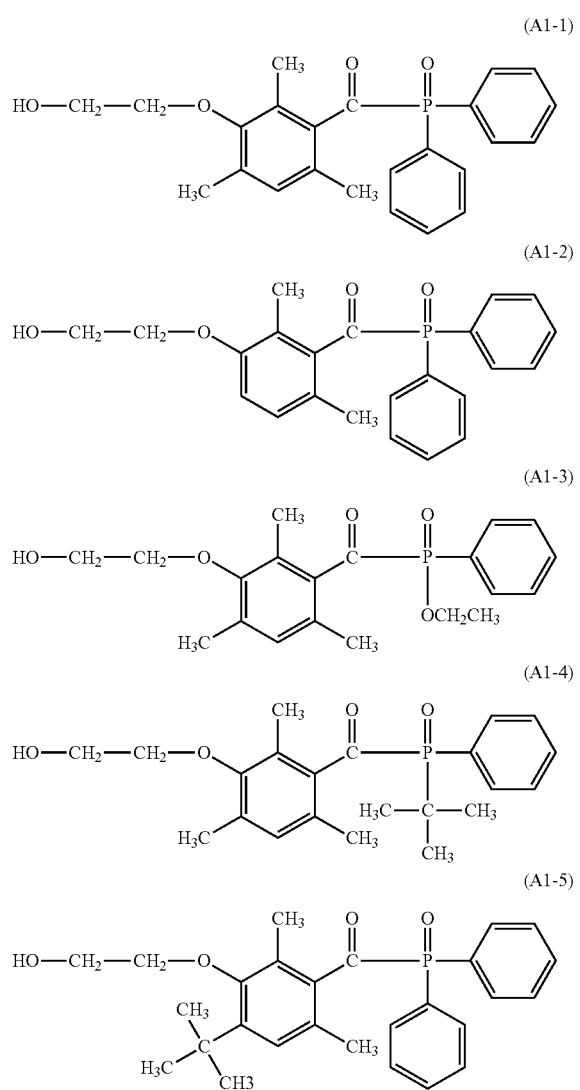

The phosphine oxide intermediate represented by the general formula A2 described above may be synthesized by a process V to a process VIII below in P1-2.

[Chemical formula 0]

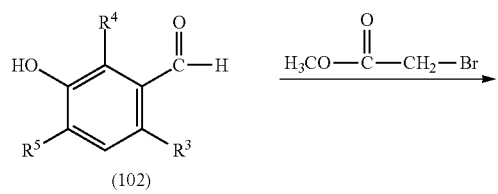

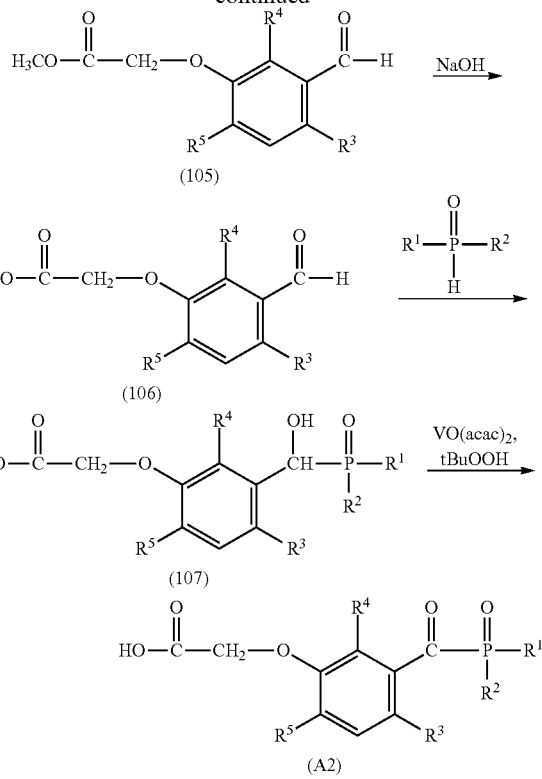

[P1-2]
[Process V]

By reacting α-haloacetate with 102 synthesized as an intermediate of P1-1 in coexistence with a base catalyst at room temperature to 100° C., a derivative 105 which is aromatically etherified can be synthesized. At this point, the bromoacetates such as methyl bromoacetate, ethyl bromoacetate or the like, and chloroacetates such as methyl chloroacetate, ethyl chloroacetate or the like may be used as the α-haloacetate. As the base catalyst, carbonates such as sodium carbonate, potassium carbonate, cesium carbonate or the like, and metal hydroxides such a sodium hydroxide, potassium hydroxide or the like may be used. By adding sodium iodide and potassium iodide, the reaction can be promoted.

[Process VI]

Next, an ester group introduced by a previous reaction is hydrolyzed with an aqueous sodium hydroxide solution, and a carboxylic acid derivative (106) can be synthesized.

[Process VII]

By performing condensation reaction between a dialkyl phosphine oxide compound and the intermediate (106) obtained by a previous reaction, a α-hydroxy phosphine oxide derivative (107) can be synthesized. Similarly to the process III, the examples of the dialkyl phosphine oxide compound, may include diphenyl phosphine oxide, di(p-tolyl) phosphine oxide, bis(3,5-dimethylphenyl) phosphine oxide, phenylmethyl phosphine oxide, phenylethyl phosphine oxide, phenylisopropyl phosphine oxide, phenyl t-butyl phosphine oxide or the like.

[Process VIII]

Next, by oxidizing a s-hydroxy group at the α-position of the α-hydroxy phosphine oxide derivative (107) to be a ketone group using an oxidizing agent, an intermediate A2 which is a phosphine oxide derivative can be synthesized. As an example of the oxidizing agent, an inorganic oxidizing agent such as manganese dioxide, potassium permanganate or the like may be used; and a peroxide such as t-butyl hydroperoxide, cumene hydroperoxide, peracetic acid, hydrogen peroxide or the like may be used in the presence of a metal catalyst such as acetylacetone vanadium (IV) oxide salt or the like.

Specific examples of the phosphine oxide intermediate represented by the general formula A2 described above may include A2-1, A2-2, A2-3, A2-4, and A2-5 as shown below.

[Chemical formula 0]

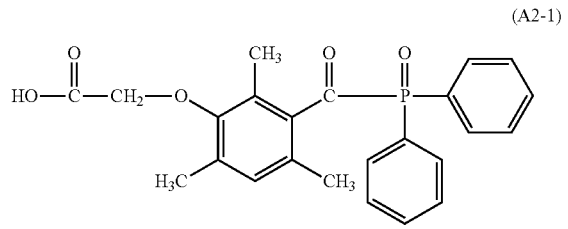
(A2-1)

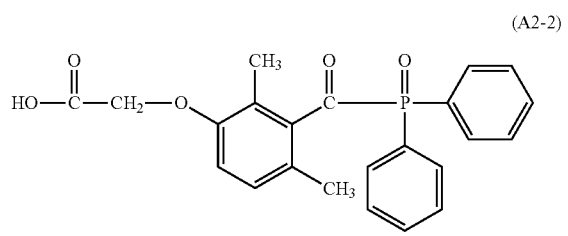
(A2-2)

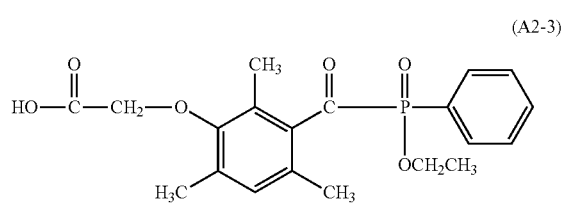
(A2-3)

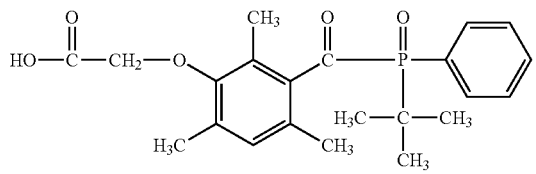
(A2-4)

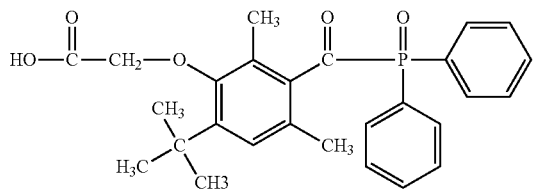
(A2-5)

The two acyl phosphine oxide intermediates obtained by the synthesis process [P1], i.e., A1 and A2, have a primary hydroxy group and a carboxy group at the molecular terminal respectively. By the condensation process [P2] which increases the corresponding molecular weights of the primary hydroxy group and the carboxy group respectively, the compound of this invention can be synthesized. At this time, the synthesis is performed from the intermediate A1 through a synthesis process P2-1, a synthesis process P2-2, and a synthesis process P2-3. The synthesis process P2-1 comprises an esterification reaction with a compound having a carboxy group. The synthesis process P2-2 comprises a ring-opening esterification reaction based on a cyclic acid anhydride and a subsequent esterification reaction with a terminal hydroxy group at an alkylene group. The synthesis process P2-3 comprises an urethanization reaction with an isocyanate. In addition, the synthesis is performed from the intermediate A2 through a synthesis process P2-4. The synthesis process P2-4 comprises an esterification reaction with a terminal hydroxy group at an alkylene group.

[Formula 0]

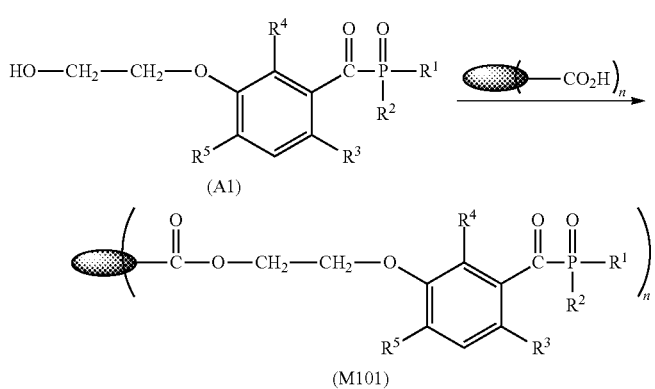
[P2-1]

[Formula 0]
[P2-2]
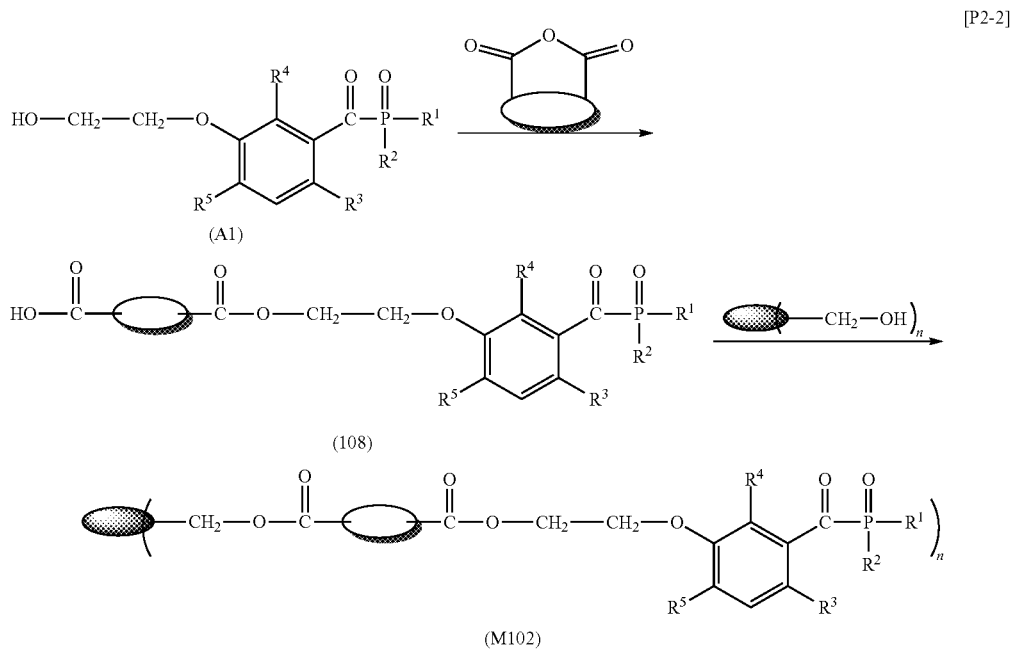
[Formula 0]
[P2-3]
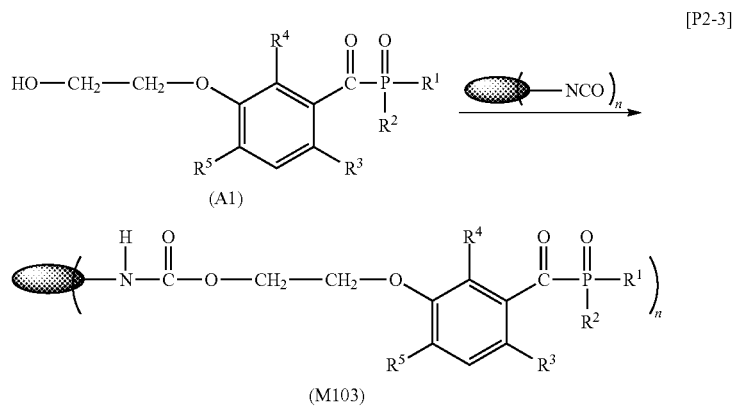
[Formula 0]
[P2-4]
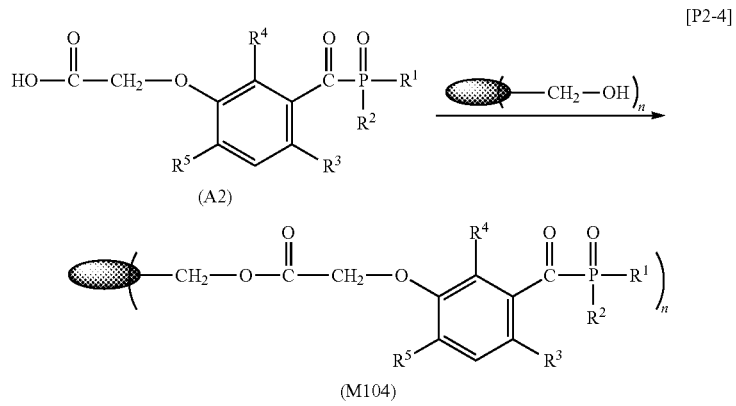

[P2-4]

[Process IX]

The intermediate A1 obtained by the process P1-1 is subjected to an esterification reaction using a compound having a carboxy group and an active esterifying agent, and thus the phosphine oxide derivative of this invention, i.e., M101, can be synthesized. As the active esterifying agent, a combination of a carbodiimide compound (such as a dicyclohexyl carbodiimide or the like) and N,N-dimethylaminopyridine, a combination of an azodicarboxylate compound (such as diethyl azodicarboxylate or the like) and a trialkyl phosphine compound (such as triphenyl phosphine or the like) may be used.

[Process X]

By reacting a cyclic acid anhydride with the intermediate A1 obtained by the process P1-1 in the presence a base catalyst, an intermediate (108) having a carboxy group at the terminal can be synthesized. As the examples of the base catalyst, carbonates such as sodium carbonate, potassium carbonate, cesium carbonate or the like, and organic amine bases such as triethylamine, diisopropyl ethylamine or the like may be used. The cyclic acid anhydride may be exemplified by succinic anhydride, dodecylsuccinic anhydride, maleic anhydride, cyclohexane-1,2-dicarboxylic anhydride, 4-methylcyclohexane-1,2-dicarboxylic anhydride, tetrahydrophthalic anhydride, 5-norbornene-2,3-dicarboxylic anhydride, phthalic anhydride, and derivatives thereof substituted with fluorine, chlorine, bromine, an alkyl group having a carbon atom number of 1 to 12.

[Process XI]

Next, by performing esterification reaction between the intermediate (108) having a carboxylic acid group at the terminal obtained by a previous reaction and a compound having a hydroxy group, the phosphine oxide derivative of this invention, i.e., M102, can be synthesized. Examples of the active esterifying agent are as described above.

[Process XII]

By performing urethanization reaction between a compound having an isocyanato group and the intermediate A1 obtained by the process P1-1, the phosphine oxide derivative of this invention, i.e., M103, can be synthesized. In this urethanization reaction, metal catalysts such as stannous octoate or the like, and basic organic amines such as 1,8-diazabicyclo[5,4,0]-7-undecene (DBU), N,N-dimethylaminopyridine or the like may be used as catalysts.

[Process XIII]

By performing esterification reaction between the intermediate A2 having a carboxylic acid group at the terminal obtained by the process P1-2 and a compound having a hydroxy group, the phosphine oxide derivative of this invention, i.e., M104, can be synthesized. Examples of the active esterifying agent are as described above.

(Use as a Photopolymerization Initiator)

The novel compound of this invention described above in detail is useful as a photopolymerization initiator, and may be produced into a photocurable composition in cooperation with a photocurable compound such as a photocurable monomer, a photocurable resin or the like.

(Photocurable Composition Photocurable Compound)

That is, the photocurable composition of this invention is characterized in that it uses the novel compound of this invention as a photopolymerization initiator and contains a photocurable compound. As the photocurable compound, maleimide compounds, maleate compounds, fumarate compounds, (meth)acrylate compounds or the like, which have olefinic double bonds, may be used according to applications. Here, in particular from the view point of the availability and the curing speed of materials, (meth)acrylate compounds are preferable.

Such (meth)acrylate compounds may be exemplified by the polyfunctional (meth)acrylate compounds having a plurality of reactive groups contributing to curing by irradiation. Specifically, the following may be included:

monomeric poly(meth)acrylates, such as, bifunctional acrylates such as diethylene glycol di(meth)acrylate, dipropylene glycol di(meth)acrylate, tripropylene glycol di(meth)acrylate, 3-methyl-1,5-pentanediol di(meth)acrylate, hexanediol di(meth)acrylate, neopentyl glycol di(meth)acrylate or the like; polyfunctional (meth)acrylates, such as, trimethylolpropane tri(meth)acrylate, tri(meth)acrylates of a triol obtained by modifying trimethylolpropane with an alkylene oxide such as an ethylene oxide, propylene oxide or the like, pentaerythritol tri(meth)acrylate or pentaerythritol tetra(meth)acrylate, tri(meth)acrylates or tetra(meth)acrylates of a tetrol obtained by modifying pentaerythritol with an alkylene oxide such as an ethylene oxide, propylene oxide or the like, ditrimethylolpropane tetra(meth)acrylate, tri(meth) acrylates or tetra(meth) acrylates of a tetrol obtained by modifying ditrimethylolpropane with an alkylene oxide such as an ethylene oxide, propylene oxide or the like, dipentaerythritol tetra(meth)acrylate or dipentaerythritol penta(meth)acrylate or dipentaerythritol hexa(meth)acrylate, caprolactone-modified substances of dipentaerythritol or the like;

epoxy (meth)acrylates obtained by the reaction of a polyglycidyl ether such as bisphenol A diglycidyl ether, trimethylolpropane triglycidyl ether or the like with (meth)acrylic acid; carbamate (meth)acrylates obtained by the reaction of a polyisocyanate compound such as isophorone diisocyanate, hexamethylene diisocyanate trimer or the like with an acrylate having a hydroxy group such as hydroxyethyl (meth)acrylate, pentaerythritol tri(meth)acrylate or the like; polyester (meth)acrylates obtained by the reaction of a polyacid such as trimellitic acid, succinic acid or the like, a polyol such as ethylene glycol, neopentyl glycol or the like, and a (meth)acrylate having a hydroxy group such as hydroxyethyl (meth)acrylate, pentaerythritol tri(meth)acrylate or the like;

oligomeric poly(meth)acrylates, such as high molecular weight poly(meth)acrylates or the like obtained by the reaction of a polymer of glycidyl (meth)acrylate and monofunctional (meth)acrylate with (meth)acrylic acid.

Furthermore, where a photocurable composition with a low viscosity is desired, monofunctional (meth)acrylate compounds, monofunctional vinyl caprolactam compounds, or monofunctional vinyl ether compounds, which are monomeric monofunctional compounds with a low viscosity, may be used together in addition to the (meth)acrylate compounds described above to the extent that the effects of this invention are not impaired.

The (meth)acrylate compounds with a low viscosity may be exemplified by, for example, alkyl (meth)acrylates such as methyl acrylate, ethyl acrylate, butyl acrylate, 2-ethylhexyl acrylate or the like; hydroxyalkyl (meth)acrylates such as 2-hydroxyethyl acrylate, 2-hydroxypropyl acrylate, or the like; alkoxyalkyl (meth)acrylates such as butoxyethyl acrylate, methoxybutyl (meth)acrylate or the like; polyalkylene glycol (meth)acrylates such as polyethylene glycol mono(meth)acrylate, methoxy diethylene glycol (meth)acrylate, phenoxy polyethylene glycol (meth)acrylate, polypropylene glycol mono(meth)acrylate, methoxypoly propylene glycol (meth)acrylate, nonylphenoxy polypropylene glycol (meth)acrylate or the like; cycloalkyl (meth)acrylates such as cyclohexyl (meth)acrylate, dicyclopentadiene(meth)acrylate, isobornyl (meth)acrylate or the like; (meth)acrylates such as benzyl (meth)acrylate, 2-hydroxyethyl (meth)acrylphosphate, tetrahydrofurfuryl (meth)acrylate, diethylaminoethyl (meth)acrylate, dimethylaminomethyl (meth) acrylate or the like; (meth)acrylamides such as diacetone (meth)acrylamide, acryloylmorpholine or the like; alkyl vinyl ethers and cycloalkyl vinyl ethers such as ethyl vinyl ether, isobutyl vinyl ether, 2-ethylhexyl vinyl ether, cyclohexyl vinyl ether or the like; hydroxy-containing vinyl ethers such as 2-hydroxyethyl vinyl ether, 3-hydroxypropyl vinyl ether or the like; vinyl ether acrylates such as 2-ethyleneoxyethoxyethyl (meth)acrylate or the like; N-vinyl lactams and N-vinyl alkylamides such as N-vinyl-2-pyrrolidone, N-vinyl caprolactam, N-vinyl acetamide or the like; or the like.

Among the (meth)acrylate compounds described above, in particular from the view point of having an excellent effect in reducing the viscosity and reducing the curing speed, N-vinyl-2-pyrrolidone, N-vinyl caprolactam, N-vinyl acetamide, 2-ethyleneoxyethoxyethyl (meth)acrylate are preferably used, wherein 2-ethyleneoxyethoxyethyl (meth)acrylate is in particular more preferably used.

The usage amount of the (meth)acrylate compound is not particularly limited, and is preferably 60 to 99 parts by mass, with respect to 1 to 40 parts by mass of the novel compound of this invention. If the content of the novel compound of this invention is lower than 1 part by mass, a sufficient curing property may not be obtained. Furthermore, if the content of the (meth)acrylate compound is lower than 1 part by mass, the physical properties of coating films tends to be deteriorated. Here, 1 to 30 parts by mass of the novel compound of this invention is preferably contained.

Furthermore, when 2-ethyleneoxyethoxyethyl (meth)acrylate described above is used, it's content may be appropriately adjusted according to desired viscosity and curing speed, and is preferably 10 parts by mass to 90 parts by mass, and more preferably 20 parts by mass to 80 parts by mass, with respect to 100 parts by mass of the photocurable composition of this invention.

Commercially available products of 2-ethyleneoxyethoxyethyl (meth)acrylate may include VEEA, VEEA-AI, and VEEM produced by Nippon Shokubai.

(Photocurable Composition Photoinitiation Promoter)

The photocurable composition of this invention can be cured even if a common photopolymerization initiator is not added. However, in order to further improve the curing property, a photoinitiation promoter such as photo-sensitizers, tertiary amines or the like may be used. The photo-sensitizers are not particularly limited, and may include thioxanthones such as 2,4-diethyl thioxanthone, 2,4-diisopropyl thioxanthone or the like; benzophenones such as 4,4'-bis(diethylamino) benzophenone or the like; anthraquinones or the like. On the other hand, the tertiary amines are not particularly limited, and may include ethyl p-dimethylaminobenzoate, isopentyl p-dimethylaminobenzoate, N,N-dimethylbenzylamine or the like. Furthermore, a high molecular weight compound, which is obtained by branching a plurality of photosensitizers and tertiary amines in 1 molecule with a polyol, may be appropriately used.

The photoinitiation promoter described above is preferably used in an amount of 0.03 to 20 parts by mass and more preferably 0.1 to 10 parts by mass, with respect to the total amount of the photocurable composition.

Furthermore, the well-known photopolymerization initiators may also be used together to the extent that the effects of this invention are not impaired. Specifically, benzoin isobutyl ether, 2,4-diethyl thioxanthone, 2-isopropyl thioxanthone, benzil, 2,4,6-trimethylbenzoyldiphenylphosphine oxide, 2-benzyl-2-dimethylamino-1-(4-morpholinophenyl)-butan-1-one, bis (2,6-dimethoxybenzoyl)-2,4,4-trimethyl-pentylphosphine oxide or the like may be suitably used together. In turn, as additional molecule cleaving type photopolymerization initiators, 1-hydroxycyclohexylphenyl ketone, benzoin ethyl ether, benzyldimethyl ketal, 2-hydroxy-2-methyl-1-phenylpropan-1-one, 1-(4-isopropylphenyl)-2-hydroxy-2-methylpropan-1-one, 2-methyl-1-(4-methylthiophenyl)-2-morpholinopropan-1-one or the like may also be used together. In turn, as hydrogen-leaving type photopolymerization initiators, benzophenone, 4-phenylbenzophenone, isophthalic phenone, 4-benzoyl-4'-methyl diphenyl ether or the like may also be used together.

(Photocurable Composition Colorant)

Furthermore, when the photocurable composition of this invention is used as a coating or ink, a colorant may also be used. The colorant may be any one of dyes and pigments. A pigment is preferably used from the view point of the durability of prints. Furthermore, when these colorants are added, the well-known and commonly-used dispersants are preferably used as needed.

Dyes used in this invention may include various dyes typically used for ink jet recording such as direct dyes, acid dyes, food dyes, basic dyes, reactive dyes, disperse dyes, vat dyes, soluble vat dyes, reactive disperse dyes or the like.

As the pigments used in this invention, inorganic pigments or organic pigments may be used. As the inorganic pigments, chrome yellow, Prussian blue, barium sulfate, cadmium red, titanium oxide, zinc white, alumina white, calcium carbonate, ultramarine, carbon black, graphite, imperial red, ferric oxide, or the carbon black produced by a well-known method such as a contact method, a furnace method, a thermal method or the like may be used.

Furthermore, as the organic pigments, various well-known and commonly-used pigments such as azo pigments (including azo lakes, insoluble azo pigments, condensed azo pigments, chelated azo pigments or the like), polycyclic pigments (for example, phthalocyanine pigments, perylene pigments, perynone pigments, anthraquinone pigments, quinacridone pigments, dioxazine pigments, thioindigo pigments, isoindolinone pigments, quinophthalone pigments or the like), dye chelates (for example, basic dye type chelates, acid dye type chelates or the like), nitro pigments, nitroso pigments, aniline black, various fluorescent pigments, metal powder pigments or the like may be used.

The average particle diameters of the pigments described above may be appropriately designed according to applications. For example, when the photocurable composition of this invention is used for a printing ink such as an offset printing ink or the like, the average particle diameter of the pigment is preferably in a range of 10 to 500 nm, and more preferably about 50 to 300 nm.

Furthermore, for example, when the photocurable composition of this invention is used for an ink for ink jetting recording, the average particle diameter of the pigment is preferably in a range of 10 to 200 nm, and more preferably about 50 to 150 nm. Furthermore, with respect to the addition amount of the colorant described above, the colorant is preferably contained in a range of 1 to 20 mass % based on the total amount of the composition, in order to obtain a sufficient image concentration and sufficient light resistance of a printed image.

Particle sizes of these pigments may be appropriately adjusted by a pigment dispersant and pigment dispersion methods used.

When a pigment is used, a pigment dispersant is preferably used in order to improve the dispersion stability with respect to the active energy ray polymerizable compounds or the like described above. Specifically, it may include AJISPER PB821, PB822, and PB817 produced by Ajinomoto Fine-Techno Co., Inc.; SOLSPERSE 5000, 24000GR, 32000, 33000, 36000, 39000, 44000, 71000, 88000, J180, and J200 produced by The Lubrizol Corporation; DISPARLON DA-703-50, DA-705, and DA-725 produced by Kusumoto Chemicals, Ltd.; DISPERBYK 111, 168, and 180 produced by BYK Corporation or the like, but is not limited thereto. Furthermore, the usage amount of the pigment dispersant is preferably in a range of 1 to 80 mass % with respect to the pigment, and the pigment dispersant is preferably used in a range of 2 to 40 mass % in particular when it is used as an ink for offset printing. When it is less than 2 mass %, there are tendencies that the dispersibility becomes instable, the flowability of the ink is significantly reduced, and the printing adaptability is reduced. On the other hand, when it is more than 40 mass %, since a printing mode in which water is used to emulsify an ink to form an image at the time of printing is used, an excessive pigment dispersant functions as a surfactant so that the ink is significantly emulsified and it fails to form a normal image. Furthermore, it is preferably used in a range of 10 to 70 mass % when used as an ink for ink jetting. When it is less than 10%, it fails to sufficiently cover the active surface of a crushed pigment and fails to achieve a stable dispersion. Furthermore, when it is more than 70 mass %, the viscosity of the ink tends to become higher, and the speed of the ink ejected from an inkjet head may be significantly reduced.

(Photocurable Composition Other Components)

In turn, other components may also be contained as needed, in the scope without departing from the object of this invention, in particular in the scope where the preservation stability, the heat resistance, the solvent resistance or the like may be maintained. As other components, various coupling agents, antioxidants, polymerization inhibitors, stabilizers, fillers or the like may be added.

The coupling agent is a compound which chemically bonds an inorganic material and an organic material or improves the affinity along with the chemical reaction so as to enhance the function of a composite material. It may include, for example, silane-based compounds such as γ-(2-aminoethyl)aminopropyltrimethoxysilane, γ-(2-aminoethyl)aminopropylmethyldimethoxysilane, γ-methacryloyloxypropyltrimethoxysilane; γ-glycidoxypropyltrimethoxysilane or the like; titanium-based compounds such as titanium tetraisopropoxide, titanium tetra-n-butoxide or the like; aluminum-based compounds such as aluminum isopropylate or the like. The addition amount thereof is 0.1 to 10 parts by mass and preferably 0.2 to 5 parts by mass, with respect to 100 parts by mass of the photocurable composition of this invention.

The antioxidant may include phenol-based antioxidants such as 2,6-di-t-butyl p-cresol, butylated hydroxyanisole, 2,4,6-tri-t-butyl phenol, 2,2'-methylenebis (4-methyl-6-t-butylphenol) or the like, an antioxidant of 2,2,6,6-tetramethylpiperidine derivative referred to as HALS, and phosphorus-based and sulfur-based secondary antioxidants.

On the other hand, the polymerization inhibitor may include nitroso amine salts or the like, but is not limited thereto.

These antioxidants and polymerization inhibitors may be used alone or in combinations of two or more thereof. The addition amount thereof is 0.01 to 2.0 parts by mass and preferably 0.03 to 1.0 parts by mass, with respect to 100 parts by mass of the photocurable composition of this invention.

The photocurable composition of this invention may be used in the absence of a solvent, or an appropriate solvent may be used as needed. The solvent is not particularly limited as long as it does not react with the components described above, and may be used alone or used in combinations of two or more thereof.

(Production Method)

In order to obtain the photocurable composition of this invention, the components described above may be mixed, and the order and the method of mixing are not particularly limited. For example, it may be chieved by mixing the components described above at normal temperature to 100° C. by using kneading, mixing, producing machines such as a kneader, a three-roll machine, a sand mill, a gate mixer, an ultrasonic homogenizer, a high-pressure homogenizer, a coating mixer, a sand grinder, a Dinomill, a Dispermat, a bead mill, a SC Mill, a NANOMIZER or the like.

(Curing Method)

The photocurable composition of this invention may be cured by polymerization using an active energy ray. Here, the active energy ray used refers to ionizing radiations such as ultraviolet rays, electron rays, α rays, β rays, γ rays or the like, microwaves, high frequencies, visible light beams, infrared rays, laser beams or the like. Here, ultraviolet rays are preferable.

As the ultraviolet ray, it is effective as long as the wavelength is 180 to 400 nm. Particularly, the lights having a wavelength of 254 nm, 308 nm, 313 nm, 365 nm, 385 nm, and 395 nm are effective in the curing of the photocurable composition of this invention and an active energy ray curable ink composition.

As a luminescent light source, it may include, for example, a low-pressure mercury lamp, a high-pressure mercury lamp, an extra-high-pressure mercury lamp, a metal halide lamp, a chemical lamp, a black light lamp, a mercury-xenon lamp, an excimer lamp, a short arc lamp, a helium-cadmium laser, an argon laser, an excimer laser, and an LED lamp.

The irradiation amount of an ultraviolet ray is influenced by the type of the light source used and the amount of the novel compound of this invention and cannot be generalized, and is preferably in a range of 10 to 2000 $J/m^2$ from the view point of the productivity.

(Applications)

The photocurable composition of this invention may be used for printing inks using polymerization or crosslinking reactions, inks for ink jetting recording, coatings, molding resins, injection molding resins, resins for stereolithography, sealants, dental polymerizable resins, photosensitive resins for printing plates, color proofs for printing, resists for color filters, resists for black matrices, photo spacers for liquid crystals, screen materials for rear projection, optical fibers, rib materials for plasma displays, dry film resists, resists for printed circuit boards, solder resists, photoresists for semiconductors, resists for microelectronic techniques, resists for producing members of micromachines, etching resists, microlens arrays, insulation materials, holographic materials, optical switches, materials for waveguides, protective coating agents, powder coating agents, bonding agents, adhesives, release agents, optical recording media, bonding adhesives, peeling coating agents, compositions using microcapsules for image recording materials, various facilities or the like.

Particularly, the existing problems, such as odors of coating films, extracts derived from cured coating films, and migration of inks, will not occur in the photocurable composition of this invention, and therefore it is highly effective in terms of safety and hygiene. It may be widely popularized and used in packaging and filling applications of, for example, food packages, toys, food supplements/cosmetics/medicines or the like, and may be preferably used as, for example, bonding agents for lamination, coatings, printing inks in applications of offset printing, gravure printing, flexographic printing, screen printing or the like, inks for ink jetting recording or the like.

(Application Coating)

When the photocurable composition of this invention is used as a coating, in addition to the additives and the colorant described above, flowability adjusting agents such as silicon, polyamide or the like; inorganic particulates such as silicon dioxide, titanium oxide, zinc oxide or the like; various leveling agents such as silicon-based leveling agents, fluorine-based leveling agents, acrylic leveling agents or the like; various additives such as ultraviolet absorbents, anti-sagging agents, thickening agents or the like may be incorporated in a commonly used amount.

(Application Printing Ink)

In this invention, the printing ink is a collective term of inks used in printing methods which use plates.

When the photocurable composition of this invention is used as a printing ink, in addition to the additives and the colorant described above, various binder resins may be used. The binder resins mentioned herein represent all resins which have appropriate pigment affinity and dispersibility and have rheological properties required by printing inks. For example, non-reactive resins may be exemplified by diallyl phthalate resin, epoxy resin, polyurethane resin, polyester resin, petroleum resin, rosin ester resin, poly(meth)acrylate, cellulose derivatives, vinyl chloride-vinyl acetate copolymer, polyamide resin, polyvinyl acetal resin, butadiene-acrylonitrile copolymer or the like. Otherwise, epoxy acrylate compounds, carbamate acrylate compounds, polyester acrylate compounds or the like which have one or more polymerizable groups in the molecule of resin may also be used. These binder resin compounds may be used alone, or may be used in combinations of any one or more.

For example, when used in an offset printing ink, a combination of 1 to 70 parts by mass of the pigment described above and 3 to 70 parts by mass of the binder resin described above may be used, with respect to 100 parts by mass of a mixture of the novel compound of this invention and the reactive compound having photocurability described above. From the view point of the balance between the color concentration of prints and the printing adaptability, the pigment is preferably 5 to 30 parts by mass and the binder resin described above is preferably 5 to 50 parts by mass, with respect to 100 parts by mass of a mixture of the novel compound of this invention and the reactive compound having photocurability described above. The offset printing inks obtained by the operation in this manner vary due to the printing apparatuses used, but are preferably designed such that 3 to 200 Pa·s (25° C.) can be reached.

Furthermore, when offset printing inks are used in multi-color printing, the photocurable composition of this invention can be used for one color of the inks used, for example the process four-color inks, which are yellow, red (magenta), blue (cyan) and ink (black), or may be used for all colors. For example, when the print is used in applications of food packages, the photocurable composition of this invention is preferably used in all colors, in order to inhibit migration as much as possible.

Furthermore, various additives used in applications of offset printing inks may be used as needed. For the purpose of providing abrasion resistance, blocking resistance, smoothness, or scratch resistance, a representative additive may be exemplified by, for example, paraffin, polyethylene wax, polypropylene wax, polytetrafluoroethylene wax, silicon compounds or the like. Furthermore, the additives such as an ultraviolet absorbent, an infrared absorbent, an antimicrobial agent or the like may be added according to required properties. The addition amount of these additives is 0 to 10 parts by mass with respect to the total amount of 100 parts by mass of the composition.

(Application Ink for Ink Jetting Recording)

On the other hand, when the photocurable composition of this invention is used for an ink for inkjet recording without using a plate, a combination of 0.1 to 30 parts by mass of a pigment, 0 to 20 parts by mass of the binder resin compound described above, and 40 to 90 parts by mass of a (meth)acrylate derivative and/or a low-viscosity monomer may be used, with respect to 100 parts by mass of the photocurable composition described above. From the view point of the balance between the color concentration of prints and the adaptability of ink ejection, the pigment is preferably 0.2 to 20 parts by mass, the binder resin compound described above is preferably 0 to 10 parts by mass, and the acrylate derivative and/or the low-viscosity monomer is preferably 50 to 80 parts by mass, with respect to 100 parts by mass of the photocurable composition described above. The inks for inkjet recording obtained by the operation in this manner vary due to the inkjet apparatuses used, but are preferably designed such that 1 to 100 mPa·s (25° C.) can be reached.

Furthermore, when the inks for inkjet recording described above are used in multi-color printing, the photocurable composition of this invention can also be used for one color of inks used, for example the process four-color inks, which are yellow, red (magenta), blue (cyan) and ink (black), or may be used for all colors. Otherwise, in the case where a darker color and a lighter color in the same series are added to each color, there are also light magenta and dark red on the basis of magenta, there are also light cyan and dark blue on the basis of cyan, and there are also gray as a light color, light black, and matte black as a dark color on the basis of black.

Furthermore, to the extent that the ejecting stability is not impaired, surfactants, leveling additives, matting agents, and polyester-based resins, polyurethane-based resins, vinylic resins, acrylic resins, rubber-based resins, and waxes for adjusting physical properties of films may be added as needed.

When the cured product obtained by operationally curing in this manner is used as a photocurable ink, in the print formed by printing on a base material, the decomposition residues of the novel compound of this invention represented by the general formula (1) described above comprises the compound (2a) represented by the general formula 2a described below, the compound (2b) represented by the general formula 2b described below, and the compound (2c) represented by the general formula 2c described below.

[Chemical formula 13]

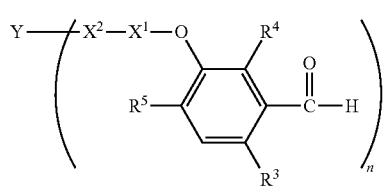

General Formula 2a (in the formula, $R^3$ to $R^5$, $X^1$ to $X^2$, Y, and n have the same meanings as those in the general formula (1) described above.)

[Chemical formula 14]

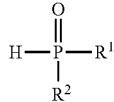

General Formula 2b (in the formula, $R^1$ to $R^2$ have the same meanings as those in the general formula (1) described above.)

[Chemical formula 15]

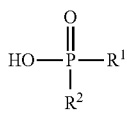

General Formula 2c (in the formula, $R^1$ to $R^2$ have the same meanings as those in the general formula (1) described above.)

Specifically, the compound represented by the general formula (1) described above generates free radicals by absorbing ultraviolet rays to initiate polymerization, and comprises the compounds represented by the general formula 2a described above, the general formula 2b described above, and the general formula 2c described above.

[Chemical formula 16]

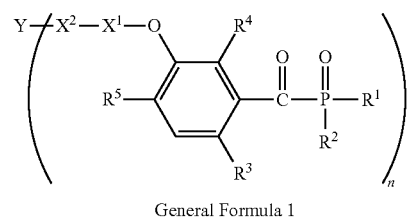

General Formula 1

↓ Light Irradiation

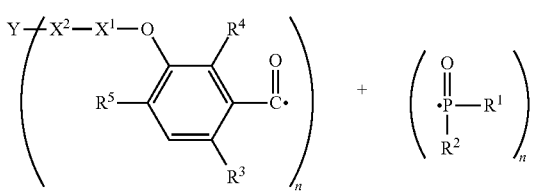

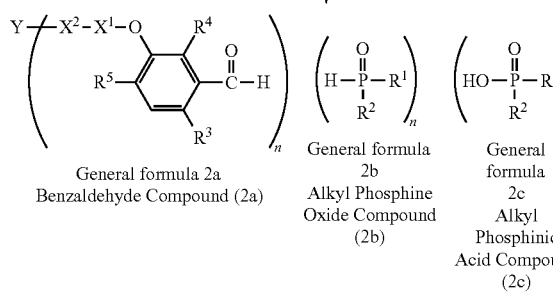

| General formula 2a Benzaldehyde Compound (2a) | General formula 2b Alkyl Phosphine Oxide Compound (2b) | General formula 2c Alkyl Phosphinic Acid Compound (2c) |

For example, in the case of the compound (M6) described above, free radicals are generated by irradiating with ultraviolet rays to initiate polymerization. Furthermore, the byproducts remain in the cured product as shown below.

[Chemical formula 17]

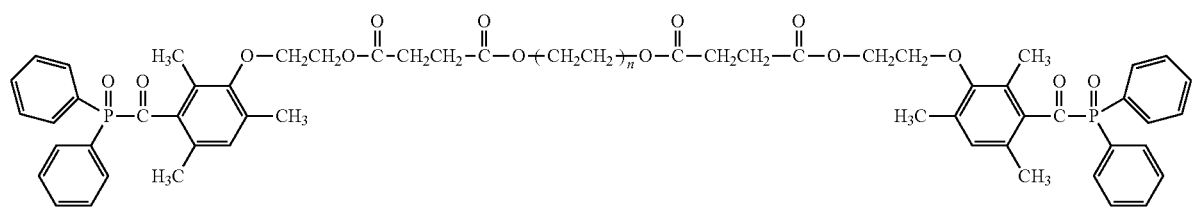

(M6)

-continued

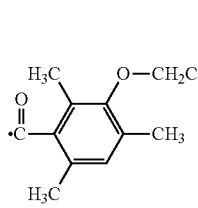 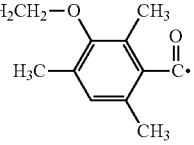 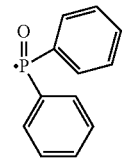

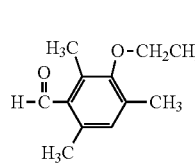 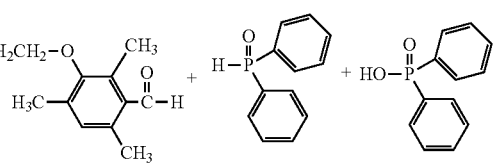

The print of this invention is characterized in that this print comprises the compound (2a) described above, the compound (2b) described above, and the compound (2c) described above, and the migration concentration of the above compound (2a) as measured by the following method is 50 ppb or less, the migration concentration of the above compound (2b) as measured by the following method is 50 ppb or less, and the migration concentration of the above compound (2c) as measured by the following method is 50 ppb or less.

[Conditions for Measurement]

performing overlapping in a manner of bringing the back side of a milk carton white board in a non-printed state into contact with a cured ink layer evenly printed on a milk carton board, and pressurizing at 25° C. for 48 hours under a press pressure of 40 kg/cm²;

manufacturing a liquid container having a volume of 1000 ml from this milk carton white board in a non-printed state after pressurization;

injecting 1000 ml of an aqueous ethanol solution (a mixed solution of 95 wt % ethanol and 5 wt % pure water) into this liquid container and enclosing the liquid container;

keeping the liquid container at room temperature at 25° C. for 24 hours for extracting the ink components transferred to the back side of the milk carton white board into the aqueous ethanol solution; and withdrawing the aqueous ethanol solution from the liquid container, and quantifying the dissolution concentrations of the compound (2a), the compound (2b), and the compound (2c) by a LC/MS/MS analysis as the migration concentrations.

EXAMPLES

This invention is illustrated below in further detail by Examples, but this invention is not limited to these Examples.

[Conditions for ¹H-NMR Measurement]

Apparatus: FT-NMR JNM-ECM400S (400 MHz) from JEOL Ltd.

Solvent for measurement: deuterated chloroform (CDC₃-d1)

Internal standard substance: tetramethyl silane (TMS)

(Example 1) Synthesis of Acyl Phosphine Oxide Intermediate (A1-1)

[Chemical formula 0]

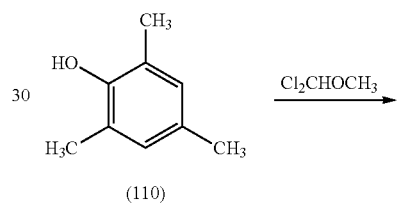

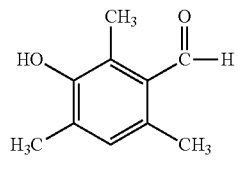

111.4 g of titanium tetrachloride and 470 mL of dichloromethane were added to a 2 L flask having a condenser, a thermometer, a nitrogen introducing tube, a dropping funnel, and a mixer, and cooled with ice under a nitrogen atmosphere. 20 g of 2,4,6-trimethylphenol (110) and 33.8 g of dichloromethoxymethane were dissolved in 450 mL of dichloromethane to obtain a solution, which was dropped to the previous titanium tetrachloride solution in 1 hour with stirring at 20° C. After completion of dropping, the temperature was increased to room temperature, and stirring was maintained for 2 hours to finish the reaction. The liquid reaction mixture was injected into ice water to stop the reaction, then extracted with dichloromethane, and washed with 10% hydrochloric acid. The organic layer was dried with anhydrous magnesium sulfate and then reduced-pressure concentration was performed to remove the solvent, so as to obtain 21.8 g of an intermediate (111) at a yield of 90%.

GC-MS (m/z): 164[M], 149[M-CH₃], 135, 121, 91, 77

Melting point: 108° C.

[Chemical formula 0]

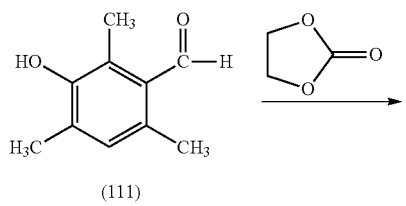

(111)

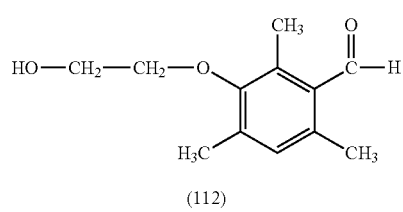

(112)

5.22 g of the intermediate (111), 5.70 g of anhydrous potassium carbonate, 3.36 g of ethylene glycol carbonate, and 30 mL of N,N-dimethylformamide were filled into a 500 mL flask having a condenser, a thermometer, a nitrogen introducing tube, and a mixer, and stirred under a nitrogen atmosphere at 150° C. for 2 hours. After the liquid reaction mixture was cooled, solid substances were removed by filtration, and ethyl acetate was used for extraction. After washing with saturated saline water, the organic layer was dried with magnesium sulfate, and reduced-pressure concentration was performed to remove the solvent. 5.71 g of a light yellow oily intermediate (112) was obtained at a yield of 86%.

GC-MS (m/z): 208[M], 193, 163, 135, 121, 91, 45

[Chemical formula 0]

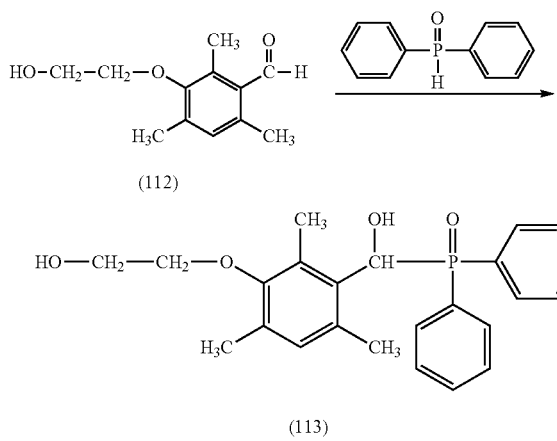

4.99 g of the intermediate (112), 5.33 g of diphenyl phosphine oxide, and 50 mL of toluene were filled into a 300 mL flask having a condenser, a thermometer, a nitrogen introducing tube, and a mixer, and stirred under a nitrogen atmosphere at room temperature for one day and one night. A white crystal precipitated in the reaction mixture was filtered and collected, and was dried under a reduced pressure. The resultant white crystal is 9.8 g of an intermediate (113) at a yield of 97%.

[Chemical formula 0]

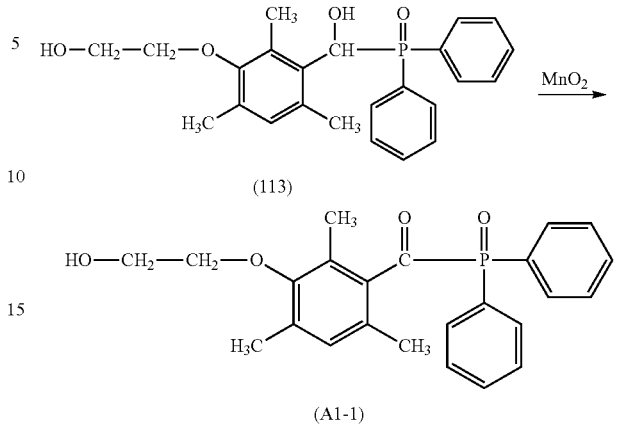

41.8 g of manganese dioxide and 200 mL of dichloromethane were added to a 500 mL flask having a condenser, a thermometer, a nitrogen introducing tube, and a mixer, and cooled with ice under a nitrogen atmosphere. 19.7 g of the intermediate (113) was added to this solution, and stirred at room temperature for one day and one night. The reaction mixture was filtered, and the filtrate was dried with anhydrous sodium sulfate. Heptane was added to a dichloromethane solution of the resultant crude product, dichloromethane was further distilled off by reduced-pressure concentration, and a thus generated white crystal was filtered and collected, so as to obtain 17.1 g of an acyl phosphine oxide intermediate (A1-1) at a yield of 87%.

(Example 2) Synthesis of Acyl Phosphine Oxide Intermediate (A1-5)

[Chemical formula 0]

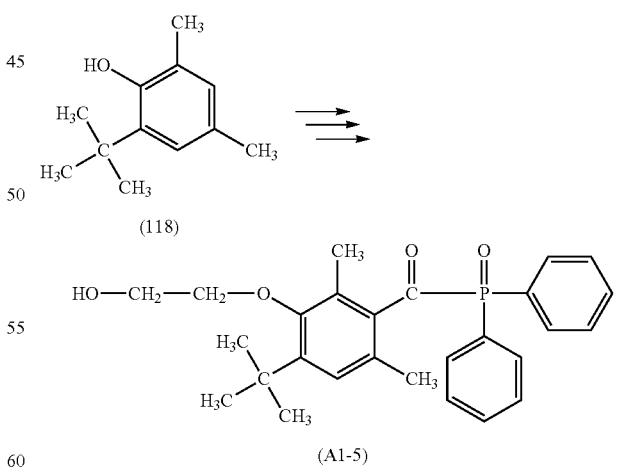

In the synthesis of A1-1 of Example 1, an exemplary acyl phosphine oxide compound (A1-5) of this invention was synthesized at a yield of 72% according to the method described in Example 1, except that 2,4,6-trimethylphenol (110) was replaced by 2-t-butyl-4,6-dimethyl phenol (118).

(Example 3) Synthesis of Acyl Phosphine Oxide Intermediate (A2-1)

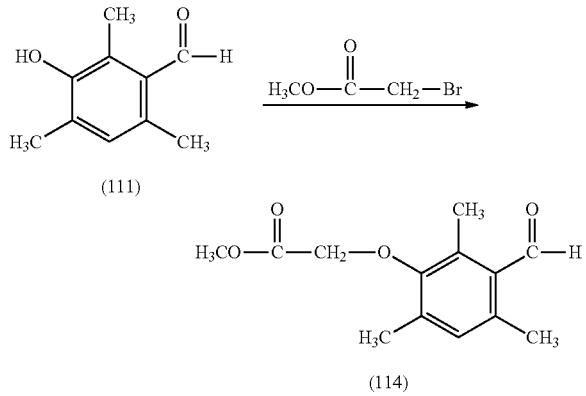

(111)

(114)

9.8 g of the intermediate (111) synthesized by Example 1, 12.4 g of potassium carbonate, and 100 mL of acetone were filled into a 500 mL flask having a condenser, a thermometer, a nitrogen introducing tube, and a mixer, and 9.6 g of methyl α-bromoacetate was dropped at room temperature with stirring. Next, the reaction was finished by stirring at room temperature for one day and one night. Ethyl acetate and water were added to the reaction mixture, then the reaction was stopped, and the organic layer was sequentially washed with water and saturated saline water. The organic layer was dried with anhydrous sodium sulfate, reduced-pressure concentration was performed on the solvent, and thereby an intermediate (114) was obtained at a yield of 86%.

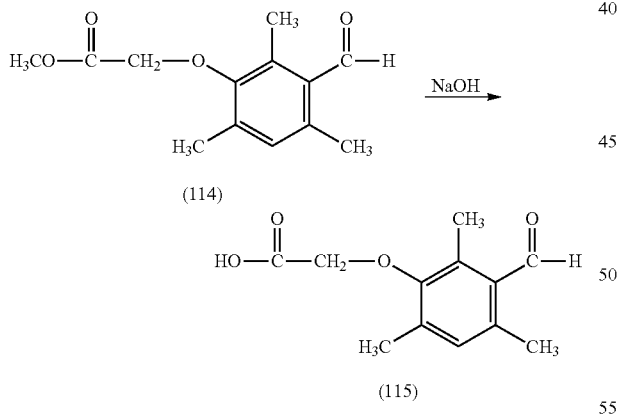

(114)

(115)

60 mL of methanol dissolved with 12.2 g of the intermediate (114) and 4.13 g of sodium hydroxide was filled into a 500 mL flask having a condenser, a thermometer, a nitrogen introducing tube, and a mixer, and stirred at room temperature for 4 hours. After it was confirmed by gas chromatography that the intermediate (114) used as the starting material had disappeared, 3M hydrochloric acid was used for neutralization to stop the reaction. Ethyl acetate was used for extraction, water and saturated saline water were sequentially used for washing, and the organic layer was dried with anhydrous sodium sulfate. After the solvent was distilled off by reduced-pressure concentration, recrystallization was performed with heptane, and thereby 10.8 g of a white crystal, i.e., an intermediate (115), was obtained at a yield of 94%.

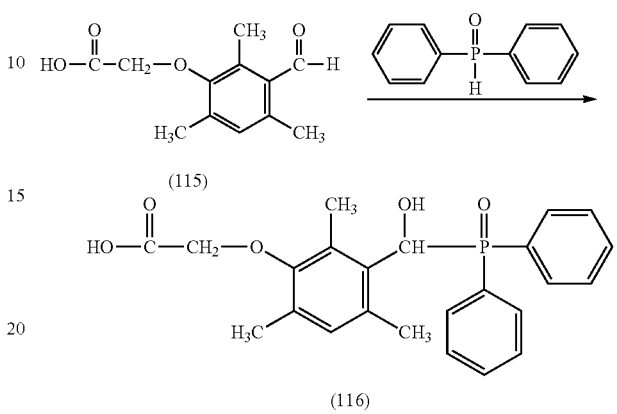

(115)

(116)

9.7 g of the intermediate (115), 8.83 g of diphenyl phosphine oxide, and 250 mL of tetrahydrofuran (THF) were filled into a 500 mL flask having a condenser, a thermometer, a nitrogen introducing tube, and a mixer, and stirred under a nitrogen atmosphere at room temperature for one day and one night. A white crystal precipitated in the reaction mixture was filtered and collected, and was dried under a reduced pressure. The resultant white crystal is 16.1 g of an intermediate (116) at a yield of 87%.

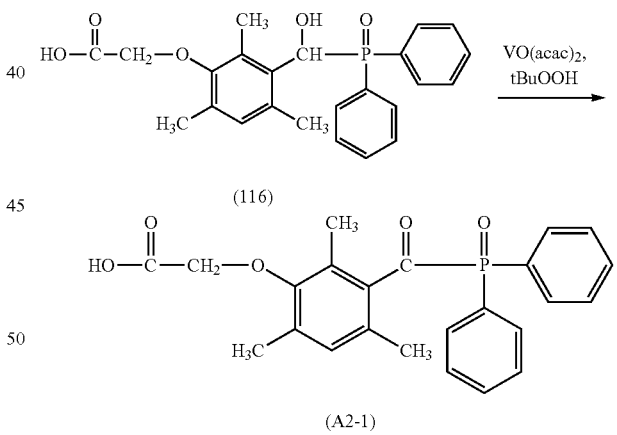

(116)

(A2-1)

0.3 g of acetylacetone vanadium oxide and 200 mL of dichloromethane were added to a 500 mL flask having a condenser, a thermometer, a nitrogen introducing tube, and a mixer, and cooled with ice under a nitrogen atmosphere. After 8.4 g of the intermediate (116) was added to this solution, 7.0 g of di-t-butyl peroxide (70% aqueous solution) was dropped under cooling with ice at the same time of stirring. After completion of dropping, the reaction solution was warmed up to room temperature, and stirred at the same temperature for one day and one night. After 100 mL of toluene was added to the reaction mixture, dichloromethane was distilled off at a reduced pressure to precipitate a white crystal. The generated white crystal was filtered and collected, and thereby 6.3 g of an acyl phosphine oxide intermediate (A2-1) was obtained at a yield of 74%.

(Example 4) Synthesis of Acyl Phosphine Oxide Intermediate (A2-5)

[Chemical formula 0]

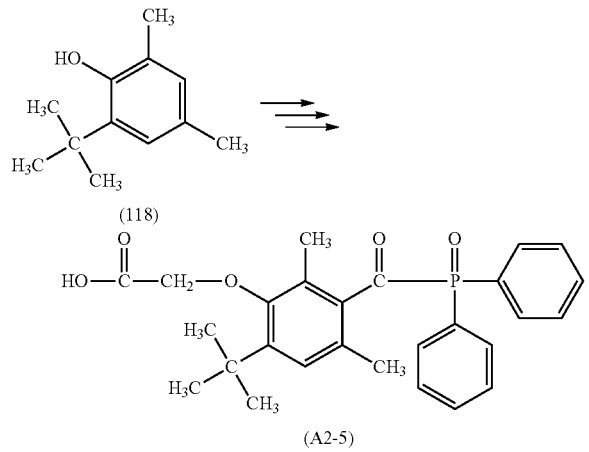

(A2-5)

In the synthesis of A2-1 of Example 3, an exemplary acyl phosphine oxide compound (A2-5) of this invention was synthesized at a yield of 51% according to the method described in Example 3, except that 2,4,6-trimethylphenol (110) was replaced by 2-t-butyl-4,6-dimethyl phenol (118).

(Example 5) Synthesis of Exemplary Acyl Phosphine Oxide Compound (M1)

[Chemical formula 0]

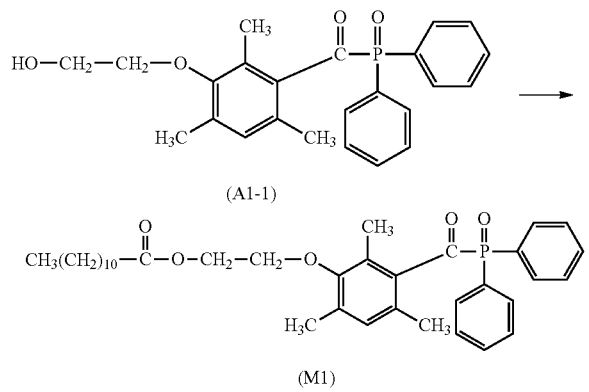

(M1)

In a 300 mL flask having a condenser, a thermometer, a nitrogen introducing tube, a dropping funnel, and a mixer, 4.8 g of the acyl phosphine oxide intermediate (A1-1) synthesized by Example 1, 5.1 g of triethylamine, and 50 mL of dichloromethane were cooled with ice, and 3.3 g of lauroyl chloride was dropped. After completion of dropping, the temperature was increased to room temperature, followed by stirring for one day and one night, and thereby the reaction is finished. 5% hydrochloric acid was used for neutralization to stop the reaction, and the organic layer was sequentially washed with aqueous saturated sodium bicarbonate solution and saturated saline water. After drying with anhydrous sodium sulfate, the solvent was distilled off at a reduced pressure. The resultant residues were refined by silica gel chromatography, so as to obtain 5.1 g of an exemplary acyl phosphine oxide compound (M1) of this invention at a yield of 86%.

(Example 6) Synthesis of Exemplary Acyl Phosphine Oxide Compound (M6)

[Chemical formula 0]

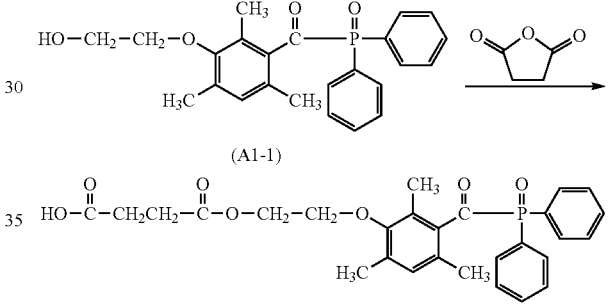

(117)

In a 500 mL flask having a condenser, a thermometer, a nitrogen introducing tube, a dropping funnel, and a mixer, 10.0 g of the acyl phosphine oxide intermediate (A1-1) synthesized by the method of Example 1, 2.4 g of succinic anhydride, 9.9 g of triethylamine, and 250 mL of dichloromethane were stirred under cooling with ice for 2 hours. Ethyl acetate was added, dichloromethane was distilled off at a reduced pressure, and the organic layer was washed with 10% hydrochloric acid. In turn, after washing with water twice and drying with anhydrous sodium sulfate, the solvent was distilled off at a reduced pressure, and thereby 12.7 g of a light yellow crystal, i.e., an intermediate (117), was obtained at a yield of 98%.

[Chemical formula 0]

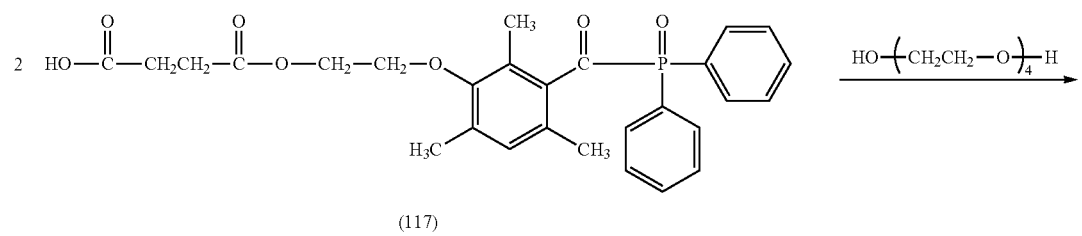

(117)

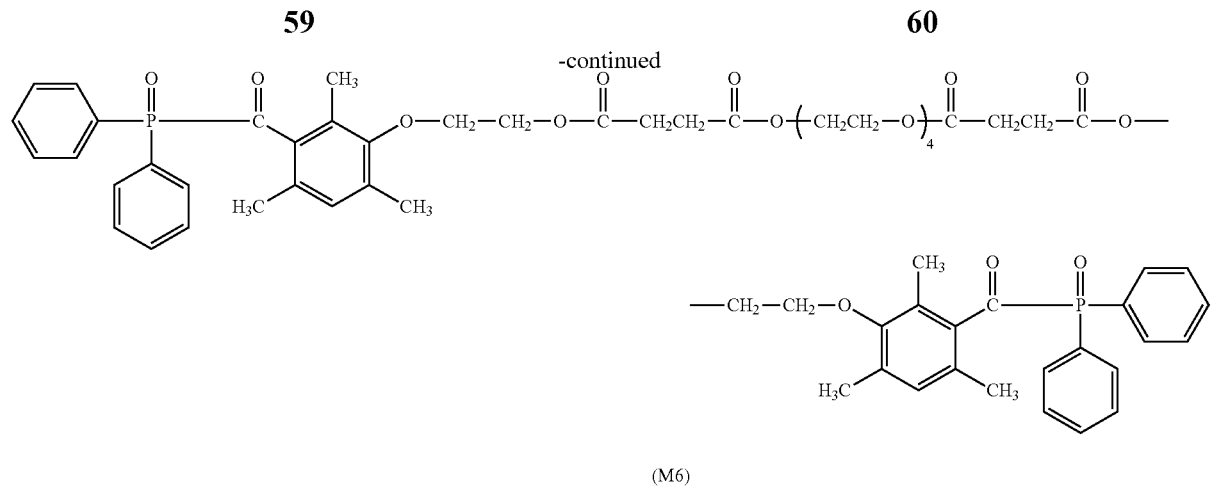

(M6)

In a 1 L flask having a condenser, a thermometer, a nitrogen introducing tube, a dropping funnel, and a mixer, 7.82 g of the intermediate (117) synthesized by Example 4, 1.34 g of tetraethylene glycol, and 0.28 g of N,N-dimethylaminopyridine were dissolved in 200 mL of dichloromethane, and cooled with ice under a nitrogen atmosphere. Under cooling with ice, a dichloromethane solution of 2.31 g of N,N'-diisopropyl carbodiimide was dropped to this solution, and stirred at room temperature for one day and one night, so as to finish the reaction. The urea derivative generated by the reaction was filtered and collected, and the filtrate was washed with 10% hydrochloric acid once and washed with distilled water twice. The organic layer was dried with anhydrous sodium sulfate, reduced-pressure concentration was performed, and thereby a crude product was obtained. The crude product was refined by column chromatography, so as to obtain 4.6 g of an exemplary acyl phosphine oxide compound (M6) of this invention at a yield of 51%.

(Example 7) Synthesis of Exemplary Acyl Phosphine Oxide Compound (M10)

[Chemical formula 0]

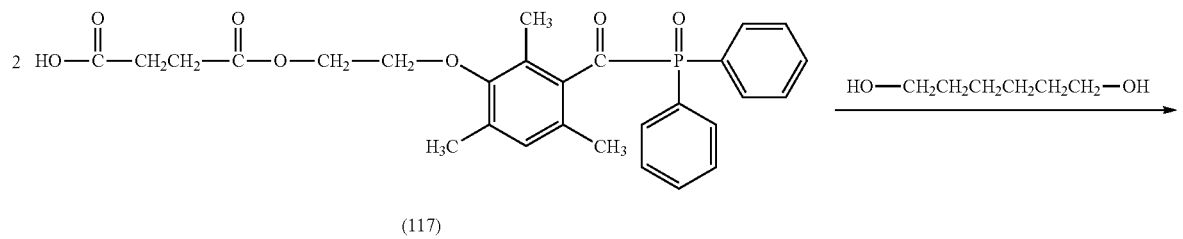

(117)

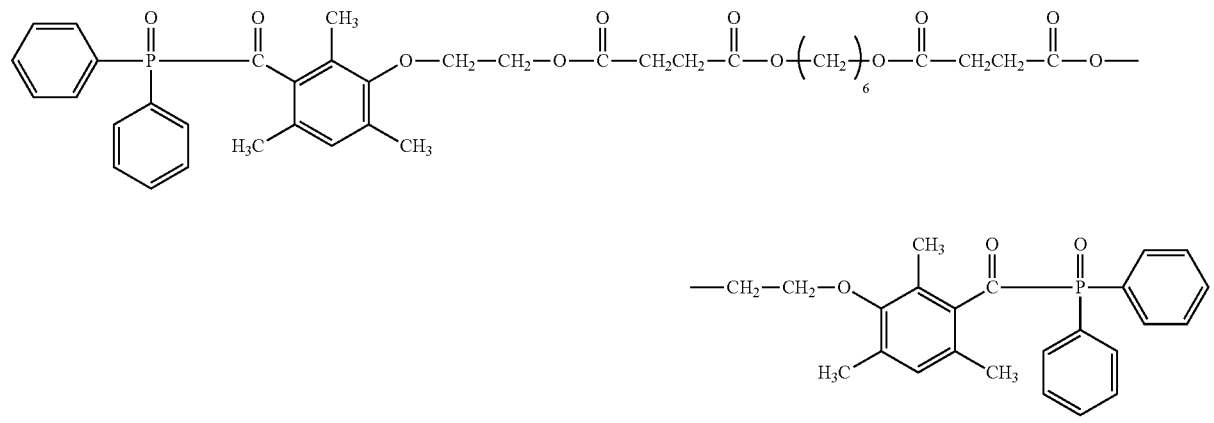

(M10)

In the synthesis of M6 of Example 4, an exemplary acyl phosphine oxide compound (M10) of this invention was synthesized at a yield of 69% according to the method described in Example 4, except that tetraethylene glycol was replaced by 1,6-hexanediol.

(Example 8) Synthesis of Exemplary Acyl Phosphine Oxide Compound (M12)

[Chemical formula 0]

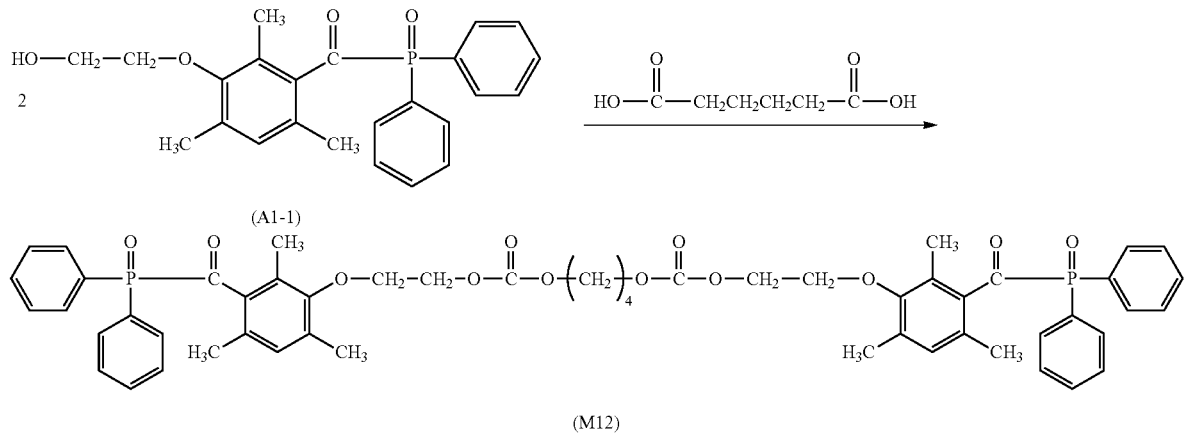

In a 500 mL flask having a condenser, a thermometer, a nitrogen introducing tube, a dropping funnel, and a mixer, 4.08 g of the acyl phosphine oxide intermediate (A1-1) synthesized by the method of Example 1, 0.73 g of adipic acid, and 0.25 g of N,N-dimethylaminopyridine were dissolved in 100 mL of dichloromethane, and cooled with ice under a nitrogen atmosphere. Under cooling with ice, a dichloromethane solution of 1.51 g of N,N'-diisopropyl carbodiimide was dropped to this solution, and stirred at room temperature for one day and one night, so as to finish the reaction. The urea derivative generated by the reaction was filtered and collected, and the filtrate was washed with 10% hydrochloric acid once and washed with distilled water twice. The organic layer was dried with anhydrous sodium sulfate, reduced-pressure concentration was performed, and thereby a crude product was obtained. The crude product was refined by column chromatography, so as to obtain 2.98 g of an exemplary acyl phosphine oxide compound (M12) of this invention at a yield of 65%.

(Example 9) Synthesis of Exemplary Acyl Phosphine Oxide Compound (M14)

[Chemical formula 0]

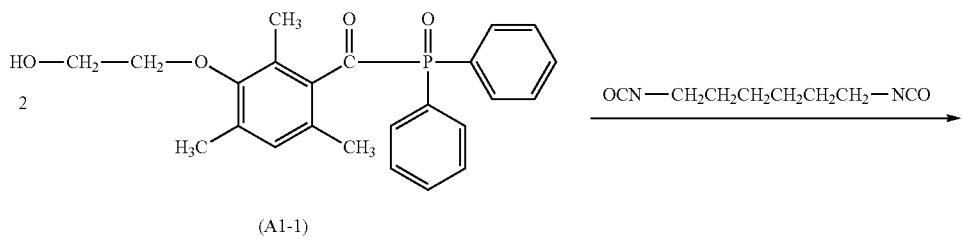

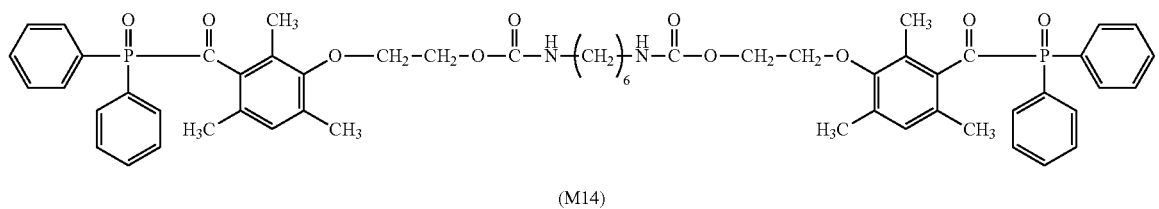

10.0 g of the acyl phosphine oxide intermediate (A1-1) synthesized by the method of Example 2, 2.04 g of 1,6-hexanediisocyanate (HDI), 0.15 g of N,N-dimethylaminopyridine, 0.05 g of DBU, and 250 mL tetrahydrofuran (THF) were filled into a 500 mL flask having a condenser, a thermometer, a nitrogen introducing tube, a dropping funnel, and a mixer, and heated to reflux under a nitrogen atmosphere for 13 hours with stirring. After the solvent THF was distilled off at a reduced pressure, ethyl acetate was used for extraction, followed by washing with 10% hydrochloric acid once and washing with distilled water twice. The organic layer was dried with anhydrous sodium sulfate, reduced-pressure concentration was performed, and thereby a crude product was obtained. The crude product was refined by column chromatography, so as to obtain 8.4 g of an exemplary acyl phosphine oxide compound (M14) of this invention at a yield of 70%.

(Example 10) Synthesis of Exemplary Acyl Phosphine Oxide Compound (M15)

[Chemical formula 0]

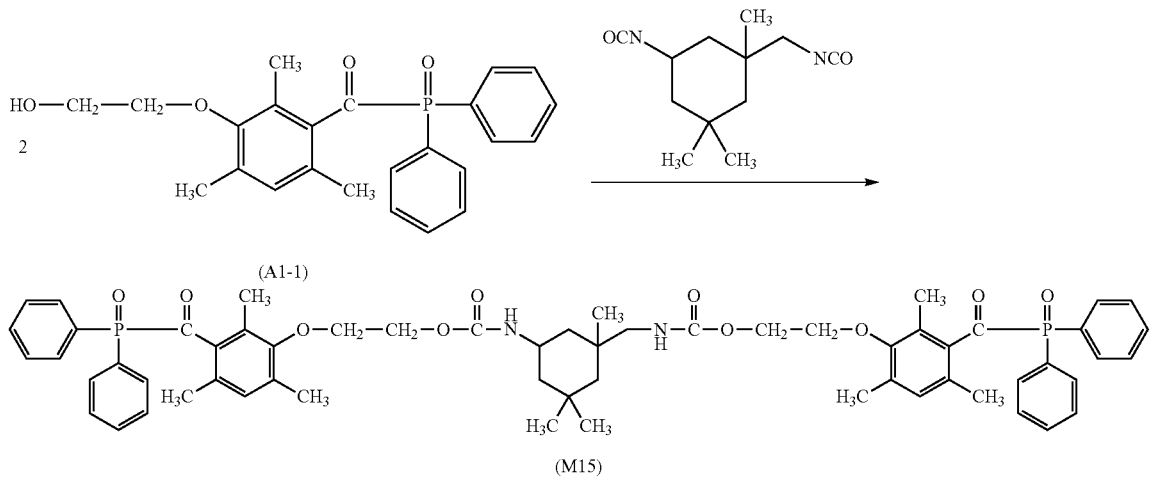

In the synthesis of M14 of Example 7, an exemplary acyl phosphine oxide compound (M15) of this invention was synthesized at a yield of 65% according to the method described in Example 7, except that 1,6-hexanediisocyanate (HDI) was replaced by isophorone diisocyanate (IPDI).

(Example 11) Synthesis of Exemplary Acyl Phosphine Oxide Compound (M17)

[Chemical formula 0]

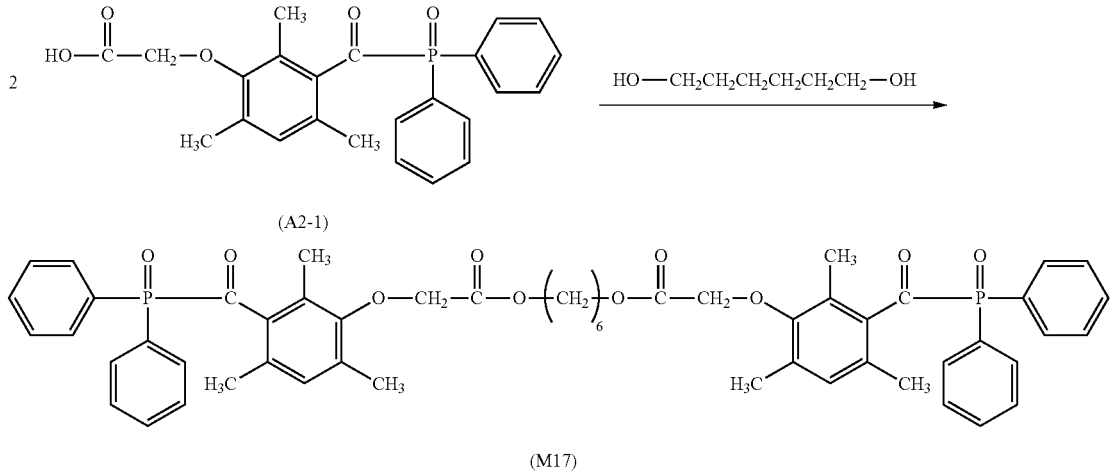

In a 300 mL flask having a condenser, a thermometer, a nitrogen introducing tube, a dropping funnel, and a mixer, 4.24 g of the acyl phosphine oxide intermediate (A2-1) synthesized by Example 2, 0.59 g of 1,6-hexanediol, and 0.25 g of N,N-dimethylaminopyridine were dissolved in 100 mL of dichloromethane, and cooled with ice under a nitrogen atmosphere. Under cooling with ice, a dichloromethane solution of 1.51 g of N,N'-diisopropyl carbodiimide was dropped to this solution, and stirred at room temperature for one day and one night, so as to finish the reaction. The urea derivative generated by the reaction was filtered and collected, and the filtrate was washed with 10% hydrochloric acid once and washed with distilled water twice. The organic layer was dried with anhydrous sodium sulfate, reduced-pressure concentration was performed, and thereby a crude product was obtained. The crude product was refined by column chromatography, so as to obtain 3.66 g of an exemplary acyl phosphine oxide compound (M17) of this invention at a yield of 79%.

(Example 12) Synthesis of Exemplary Acyl Phosphine Oxide Compound (M18)

[Chemical formula 0]

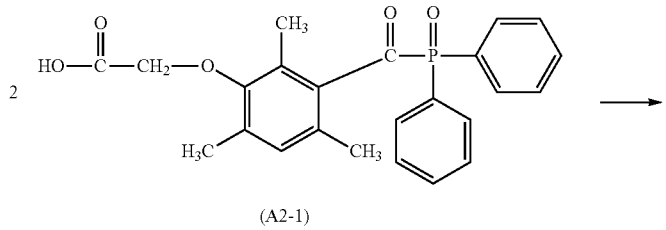

(A2-1)

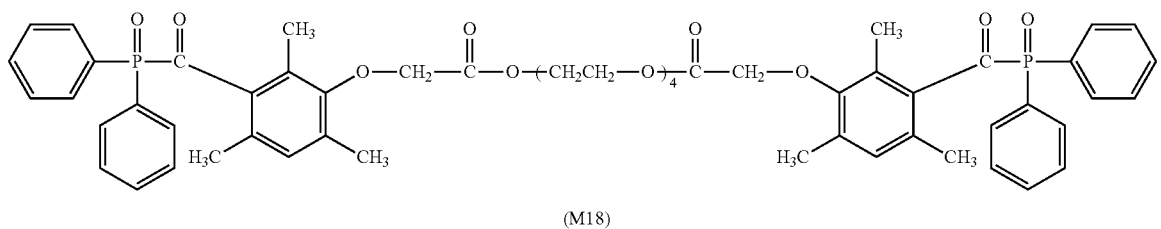

(M18)

In the synthesis of M17 of Example 9, an exemplary acyl phosphine oxide compound (M18) of this invention was synthesized at a yield of 82% according to the method described in Example 9, except that 1,6-hexanediol was replaced by tetraethylene glycol.

(Example 13) Synthesis of Exemplary Acyl Phosphine Oxide Compound (M20)

[Chemical formula 0]

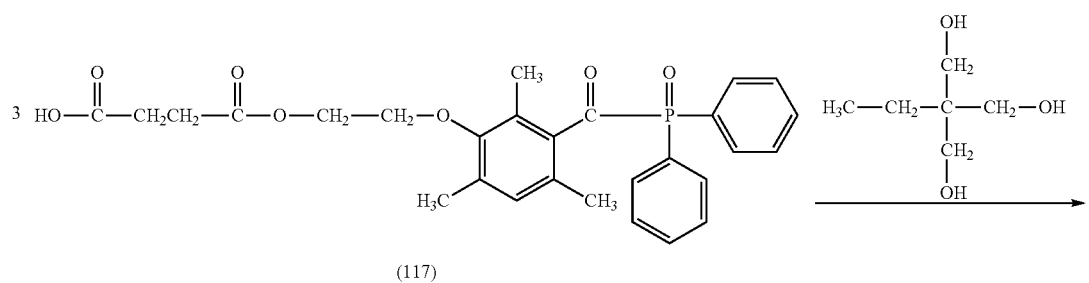

(117)

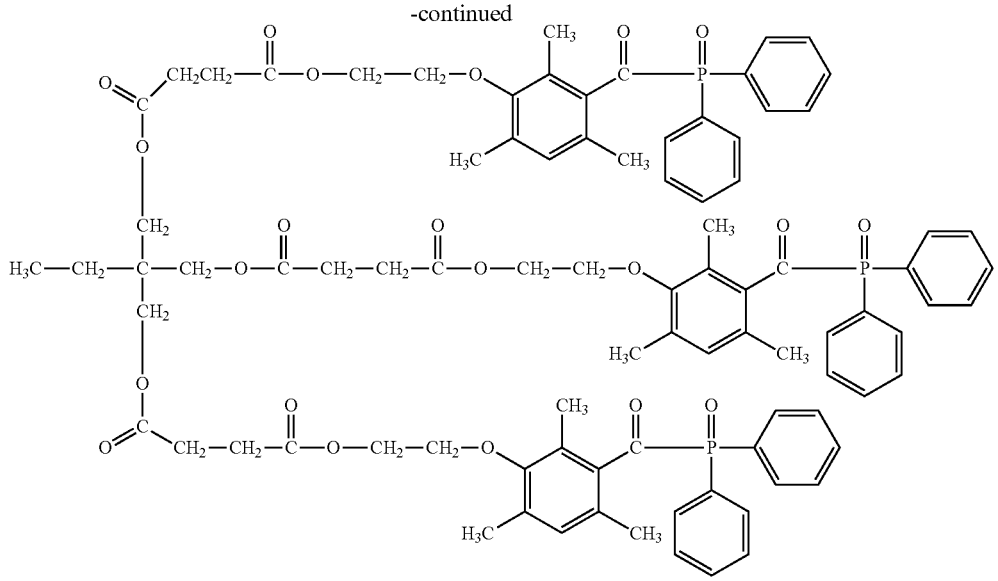

(M20)

In a 1 L flask having a condenser, a thermometer, a nitrogen introducing tube, a dropping funnel, and a mixer, 17.1 g of the intermediate (117) synthesized by Example 4, 1.47 g of trimethylolpropane, and 0.89 g of N,N-dimethylaminopyridine were dissolved in 500 mL of dichloromethane, and cooled with ice under a nitrogen atmosphere. Under cooling with ice, a dichloromethane solution of 6.39 g of N,N'-diisopropyl carbodiimide was dropped to this solution, and stirred at room temperature for one day and one night, so as to finish the reaction. The urea derivative generated by the reaction was filtered and collected, and the filtrate was washed with 10% hydrochloric acid once and washed with distilled water twice. The organic layer was dried with anhydrous sodium sulfate, reduced-pressure concentration was performed, and thereby a crude product was obtained. The crude product was refined by column chromatography, so as to obtain 15.3 g of an exemplary acyl phosphine oxide compound (M20) of this invention at a yield of 87%.

(Example 14) Synthesis of Exemplary Acyl Phosphine Oxide Compound (M22)

[Chemical formula 0]

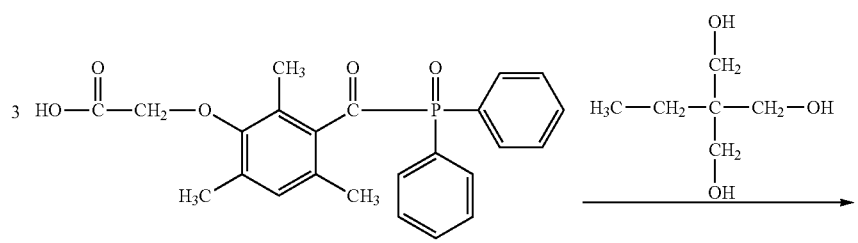

(A2-1)

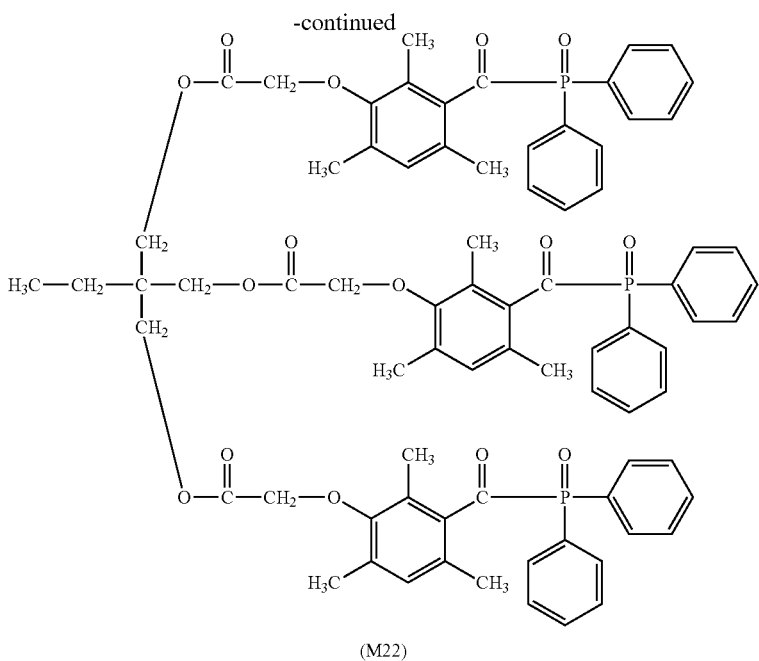

(M22)

In a 500 mL flask having a condenser, a thermometer, a nitrogen introducing tube, a dropping funnel, and a mixer, 2.55 g of the acyl phosphine oxide intermediate (A1-2) synthesized by Example 2, 1.25 g of trimethylolpropane, and 0.11 g of N,N-dimethylaminopyridine were dissolved in 150 mL of dichloromethane, and cooled with ice under a nitrogen atmosphere. Under cooling with ice, a dichloromethane solution of 1.01 g of N,N'-diisopropyl carbodiimide was dropped to this solution, and stirred at room temperature for one day and one night, so as to finish the reaction. The urea derivative generated by the reaction was filtered and collected, and the filtrate was washed with 1% hydrochloric acid once and washed with distilled water twice. The organic layer was dried with anhydrous sodium sulfate, reduced-pressure concentration was performed, and thereby a crude product was obtained. The crude product was refined by column chromatography, so as to obtain 1.80 g of an exemplary acyl phosphine oxide compound (M22) of this invention at a yield of 70%.

(Example 15) Synthesis of Exemplary Acyl Phosphine Oxide Compound (M24)

[Chemical formula 0]

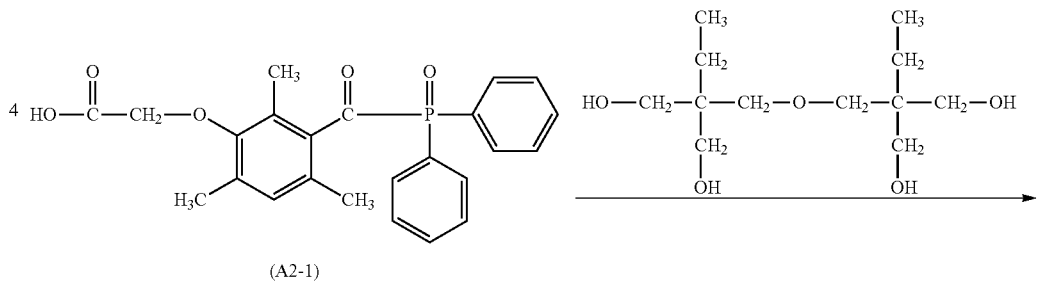

(A2-1)

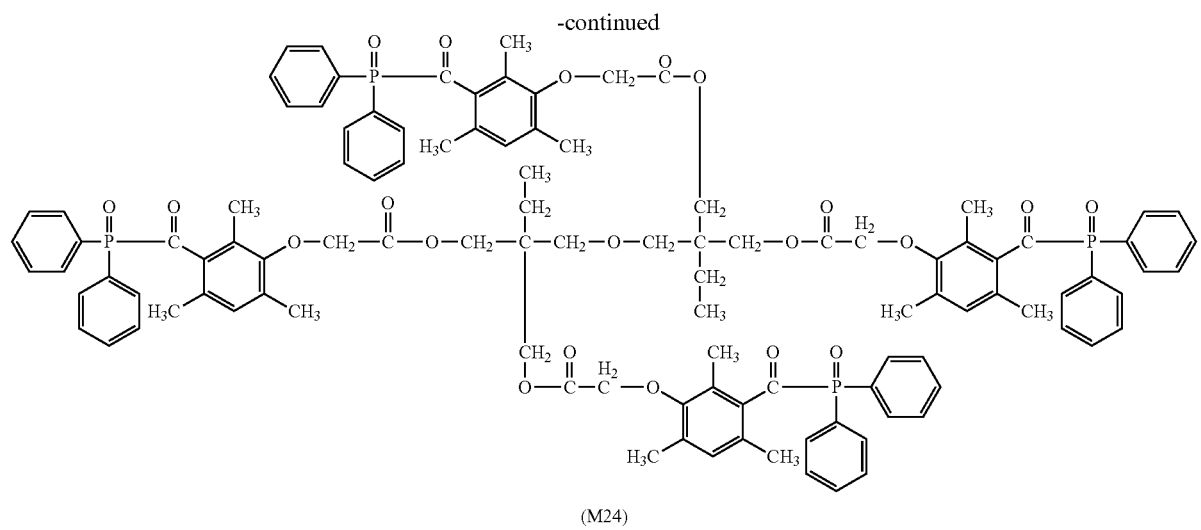

(M24)

In a 500 mL flask having a condenser, a thermometer, a nitrogen introducing tube, a dropping funnel, and a mixer, 3.40 g of the acyl phosphine oxide intermediate (A1-2) synthesized by Example 2, 0.50 g of ditrimethylolpropane, and 0.15 g of N,N-dimethylaminopyridine were dissolved in 150 mL of dichloromethane, and cooled with ice under a nitrogen atmosphere. Under cooling with ice, a dichloromethane solution of 1.12 g of N,N'-diisopropyl carbodiimide was dropped to this solution, and stirred at room temperature for one day and one night, so as to finish the reaction. The urea derivative generated by the reaction was filtered and collected, and the filtrate was washed with 1% hydrochloric acid once and washed with distilled water twice. The organic layer was dried with anhydrous sodium sulfate, reduced-pressure concentration was performed, and thereby a crude product was obtained. The crude product was refined by column chromatography, so as to obtain 2.54 g of an exemplary acyl phosphine oxide compound (M24) of this invention at a yield of 68%.

(Example 16) Synthesis of Exemplary Acyl Phosphine Oxide Compound (M27)

[Chemical formula 0]

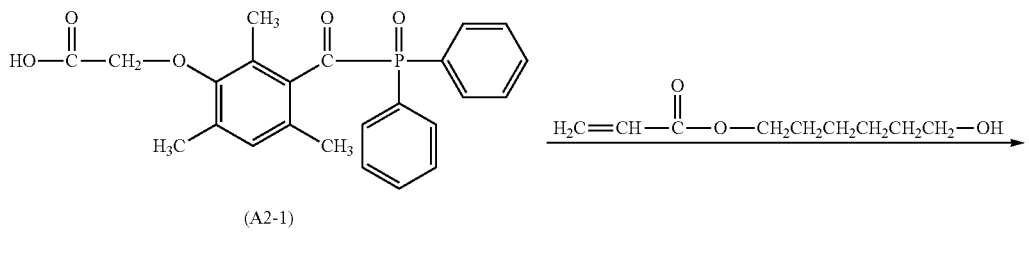

(A2-1)

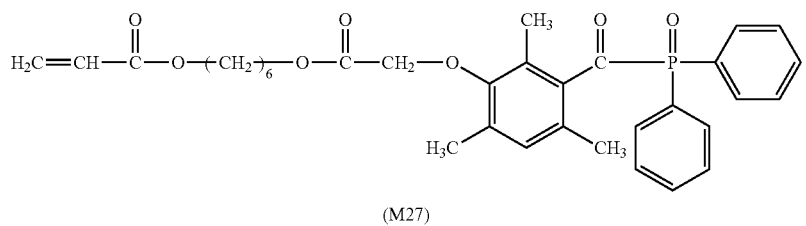

(M27)

In a 300 mL flask having a condenser, a thermometer, a nitrogen introducing tube, a dropping funnel, and a mixer, 2.11 g of the acyl phosphine oxide intermediate (A1-2) synthesized by Example 2, 0.95 g of 6-hydroxyhexyl acrylate, and 0.22 g of N,N-dimethylaminopyridine were dissolved in 100 mL of dichloromethane, and cooled with ice under a nitrogen atmosphere. Under cooling with ice, a dichloromethane solution of 0.76 g of N,N'-diisopropyl carbodiimide was dropped to this solution, and stirred at room temperature for one day and one night, so as to finish the reaction. The urea derivative generated by the reaction was filtered and collected, and the filtrate was washed with 1% hydrochloric acid once and washed with distilled water twice. The organic layer was dried with anhydrous sodium sulfate, reduced-pressure concentration was performed, and thereby a crude product was obtained. The crude product was refined by column chromatography, so as to obtain 2.21 g of an exemplary acyl phosphine oxide compound (M27) of this invention at a yield of 77%.

(Example 17) Synthesis of Exemplary Acyl Phosphine Oxide Compound (M30)

[Chemical formula 0]

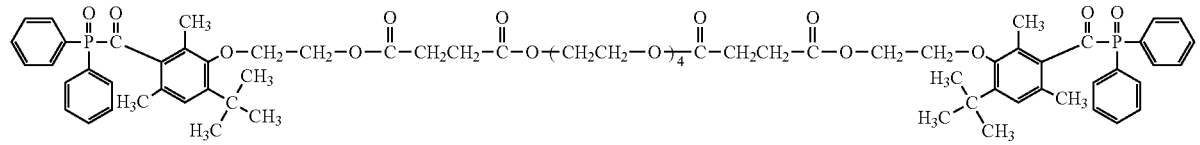

(M30)

In the synthesis of M6 of Example 6, an exemplary acyl phosphine oxide compound (M30) of this invention was synthesized according to the method described in Example 6, except that the acyl phosphine oxide intermediate (A1-1) was replaced by the acyl phosphine oxide intermediate (A1-5).

(Example 18) Synthesis of Exemplary Acyl Phosphine Oxide Compound (M31)

[Chemical formula 0]

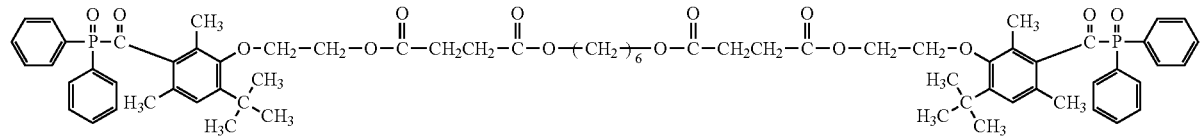

(M31)

In the synthesis of M10 of Example 7, an exemplary acyl phosphine oxide compound (M31) of this invention was synthesized according to the method described in Example 7, except that the acyl phosphine oxide intermediate (A1-1) was replaced by the acyl phosphine oxide intermediate (A1-5).

(Example 19) Synthesis of Exemplary Acyl Phosphine Oxide Compound (M32)

[Chemical formula 0]

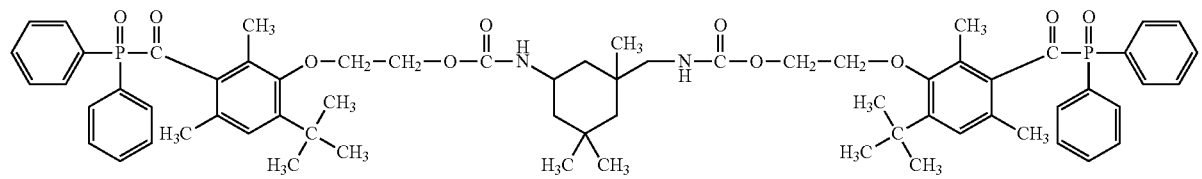

(M32)

In the synthesis of M15 of Example 10, an exemplary acyl phosphine oxide compound (M32) of this invention was synthesized according to the method described in Example 10, except that the acyl phosphine oxide intermediate (A1-1) was replaced by the acyl phosphine oxide intermediate (A1-5).

(Example 20) Synthesis of Exemplary Acyl Phosphine Oxide Compound (M33)

[Chemical formula 0]

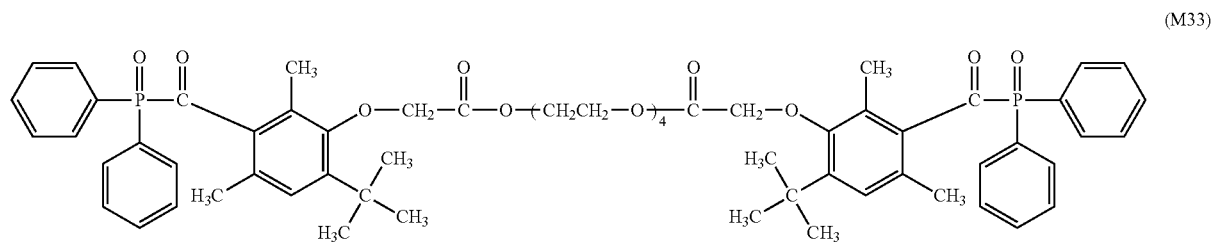

(M33)

In the synthesis of M18 of Example 12, an exemplary acyl phosphine oxide compound (M33) of this invention was synthesized according to the method described in Example 12, except that the acyl phosphine oxide intermediate (A2-1) was replaced by the acyl phosphine oxide intermediate (A2-5).

(Example 21) Synthesis of Exemplary Acyl Phosphine Oxide Compound (M34)

[Chemical formula 0]

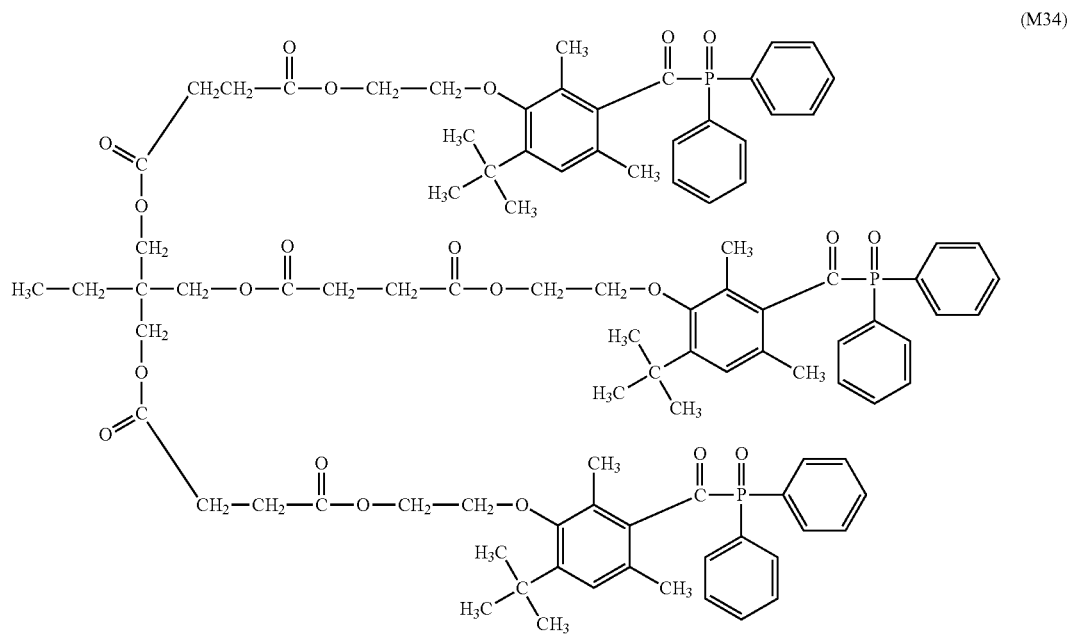

(M34)

In the synthesis of M24 of Example 15, an exemplary acyl phosphine oxide compound (M34) of this invention was synthesized according to the method described in Example 13, except that the acyl phosphine oxide intermediate (A1-1) was replaced by the acyl phosphine oxide intermediate (A1-5).

(Example 22) Synthesis of Exemplary Acyl Phosphine Oxide Compound (M36)

[Chemical formula 0]

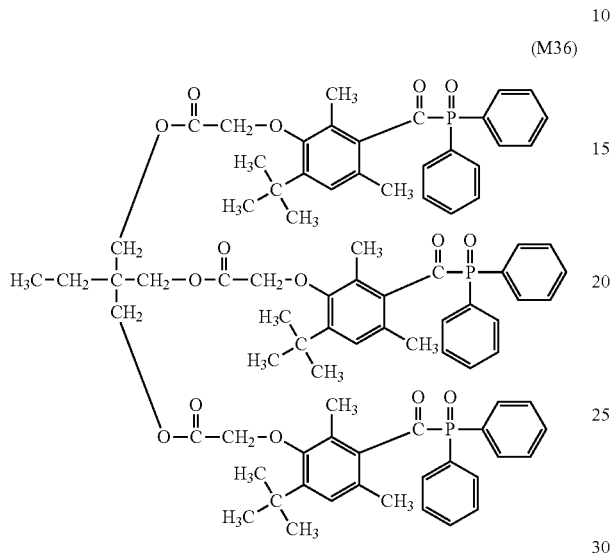

(M36)

In the synthesis of M22 of Example 14, an exemplary acyl phosphine oxide compound (M36) of this invention was synthesized according to the method described in Example 14, except that the acyl phosphine oxide intermediate (A2-1) was replaced by the acyl phosphine oxide intermediate (A2-5).

(Example 23) Synthesis of Exemplary Acyl Phosphine Oxide Compound (M38)

[Chemical formula 0]

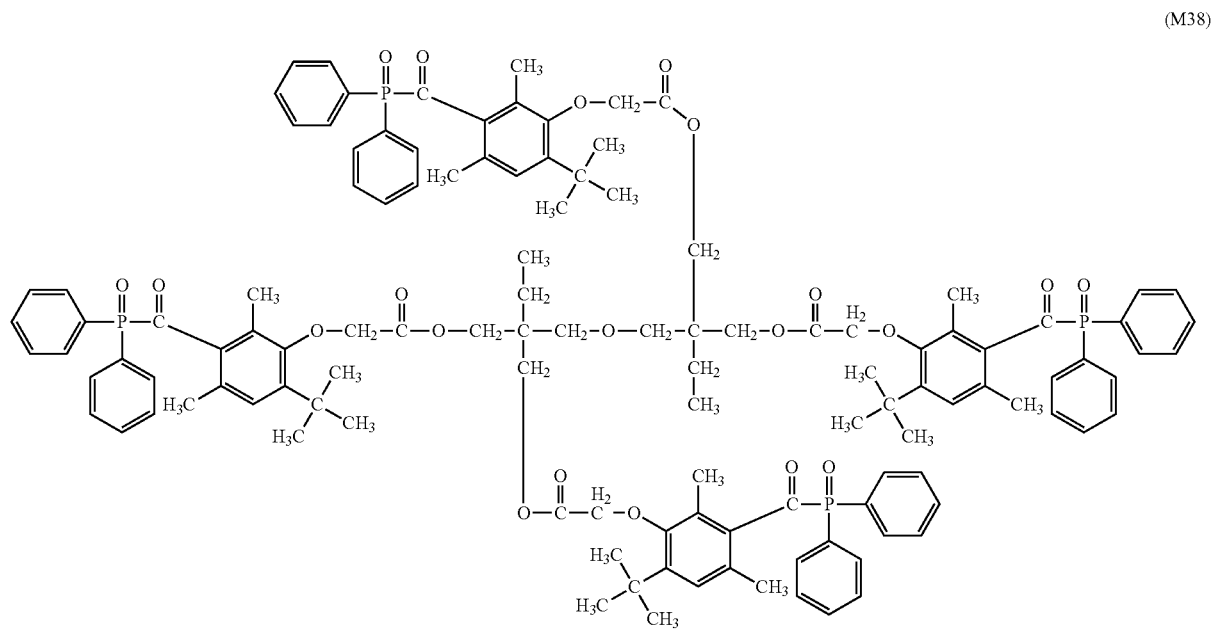

(M38)

In the synthesis of M24 of Example 15, an exemplary acyl phosphine oxide compound (M38) of this invention was synthesized according to the method described in Example 15, except that the acyl phosphine oxide intermediate (A2-1) was replaced by the acyl phosphine oxide intermediate (A2-5).

Example and Comparative Examples of Printing Inks (Production Method of Photocurable Inks for Offset Printing)

Raw materials were compounded according to the compositions as shown in Table 1 and Table 2, evenly stirred with a mixer, and kneaded with a three-roll mill, so as to produce a matrix ink used for a printing ink.

Then, various photopolymerization initiators produced by Examples 5 to 23 or other commercially available photopolymerization initiators were compounded into the matrix ink according to the compositions as shown in Table 3 to Table 5, evenly stirred with a mixer, and kneaded with a three-roll mill again, so as to produce photocurable inks of the Examples and Comparative Examples.

TABLE 1

| Table 1 Composition of matrix ink | Raw material (Product name) | Raw material (Substance name) | Parts by mass |
|---|---|---|---|
| Binder | Diallyl phthalate resin varnish | A mixture obtained by dissolving 35 wt % of DAISO DAP A in 65 wt % of SR355NS | 29.0 |
| Monomer | DPHA | Dipentaerythritol hexaacrylate | 35.0 |
|  | SR355NS | Ditrimethylolpropane tetraacrylate | 6.8 |
| Pigment | Raven 1060 Ultra | Carbon black | 16.0 |
|  | Fastogen Blue TGR-1 | Pigment blue 15:3 | 3.0 |
|  | Hostaperm RL 02 | Dioxazine purple | 2.0 |
| Filling pigment | Magnesium Carbonate TT | Basic magnesium carbonate | 2.0 |
| WAX | S-381-N1 | Polyolefin wax | 1.0 |
| Polymerization inhibitor | Stearer TBH | 2-t-butyl hydroquinone | 0.2 |
| Auxiliary photopolymerization initiator | Omnipol TX | Bifunctional thioxanthone photopolymerization initiator | 5.0 |
|  |  | Total | 100.0 |

TABLE 2

| Table 2 Composition of matrix ink | Raw material (Product name) | Raw material (Substance name) | Parts by mass |
|---|---|---|---|
| Binder | Diallyl phthalate resin varnish | A mixture obtained by dissolving 35 wt % of DAISO DAP A in 65 wt % of SR355NS | 29.0 |
| Monomer | DPHA | Dipentaerythritol hexaacrylate | 40.0 |
|  | SR355NS | Ditrimethylolpropane tetraacrylate | 6.8 |
|  | Calcene CC | A fatty acid treated calcium carbonate | 19.0 |
| Filling pigment | Magnesium Carbonate TT | Basic magnesium carbonate | 4.0 |
| WAX | S-381-N1 | Polyolefin wax | 1.0 |
| Polymerization inhibitor | Stearer TBH | 2-t-butyl hydroquinone | 0.2 |
|  |  | Total | 100.0 |

In the tables, abbreviations were as follows:
Carbon black: "Raven 1060Ultra"
Phthalocyanine blue: a blue pigment "FASTOGEN BLUE TGR-1" produced by DIC Corporation
Dioxazine purple: dioxazine purple "Hostaperm Violet RL 02" produced by CLARIANT Corporation
Talc: hydrous magnesium silicate (a filling pigment "HIFILLER #5000PJ" produced by Matsumura Sangyo Co., Ltd.)
Magnesium carbonate: basic magnesium carbonate ("Magnesium Carbonate TT" produced by Naikai Salt Industries Co., Ltd.)
Calcene CC: a fatty acid treated calcium chloride (Shiraishi Calcium Kaisha, Ltd.)
Polyolefin wax: "S-381-N1" produced by Shamrock Co., Ltd.
Stearer TBH: 2-t-butyl hydroquinone (produced by Seiko Chemical Co., Ltd.)
DAISO DAP A: a DAP resin (produced by OSAKA SODA CO., LTD.)
DPHA: dipentaerythritol pentaacrylate and dipentaerythritol hexaacrylate ("ARONIX M-400" from Toagosei Co., Ltd., 5,000 to 7,000 mPa·s/25° C.)
SR355NS: ditrimethylolpropane tetraacrylate (produced by ARKEMA Corporation)
OmnipolTX: a diester of carboxymethoxy thioxanthone and polytetraethylene glycol 250 (produced by IGM RESINS Corporation)

(Production Method of Prints of Photocurable Ink for Offset Printing)

A simple color developing machine (RI TESTER, produced by Houei Seiko Co., Ltd.) was used, and 0.10 ml of an ink was used. The photocurable ink obtained above was evenly spread on a rubber roll and a metal roll of the RI TESTER, and evenly coated on the surface of a milk carton board (a polyethylene laminated board) with an ink concentration of 1.8 (measured with a "SpectroEye" concentration meter produced by X-Rite Corporation). Color development was performed in this manner to produce a print. It was to be indicated that the RI TESTER refers to a tester which performed color development of an ink on a paper or a film and can adjust the transfer amount of the ink and the printing pressure.

(Curing Method of Photocurable Ink for Offset Printing Based on UV-LED Light Source)

The print coated with the photocurable ink obtained by the method described above was irradiated with ultraviolet (UV) to allow an ink film to be cured and dried. A UV irradiation apparatus (produced by EYE GRAPHICS CO., LTD.), which carried a water-cooling type UV-LED (the central light-emitting wavelength was 385 nm±5 nm, and the output power of the UV-LED was 100%) and a conveying belt, was used. The print was loaded and placed on the conveying belt and was allowed to pass just beneath the LED with an irradiation distance of 9 cm.

(Evaluation Method of Photocurable Ink for Offset Printing: Surface·Internal Curability)

The internal curability of a cured film was evaluated by rubbing a cured ink layer with a fingernail immediately after curing. On the other hand, the surface curability of a cured film was evaluated by rubbing surface layers of respective cured products with a high-quality paper.

Evaluation criteria were set as follows.

⊚: Not damaged even if rubbing with a great force, which shows very good UV curability.

◯: Slightly damaged if rubbing with a great force.

Δ: Significantly damaged if rubbing with a great force.

x: Significantly damaged even if rubbing with a small force, which shows bad UV curability.

(Evaluation Method of Photocurable Ink for Offset Printing: Yellowing)

The inks described in Examples 43 to 61 and Comparative Examples 3 to 4, which was obtained by compounding various photopolymerization initiators produced by Examples 1 to 23 or other commercially available photopolymerization initiators into a colorless and transparent matrix ink of Table 2, were evenly spread on a white paper using a spatula. The white paper coated with the inks described above was irradiated with ultraviolet by using the UV-LED ultraviolet irradiation apparatus described above under conditions that the output power was 100% and the speed of the conveying belt was 10 m/minute. Next, the change in color caused by the color change (yellowing) of a cured film after irradiated with ultraviolet was confirmed, and evaluated according to the 3 ranks described below.

◯: Completely or substantially no change in color

Δ: Slightly yellowing may be confirmed x: Significant change in color caused by yellowing may be confirmed (Evaluation Method of Prints of Photocurable Ink for Offset Printing: Migration Resistance)

With respect to the evaluation of migration resistance, the basic evaluation steps were based on the guideline by the European Printing Ink Association (EuPIA) (EuPIA Guideline on Printing Inks, applied to the non-food contact surface of food packaging materials and articles, November 2011 (Replaces the September 2009 version)).

Figure 2:
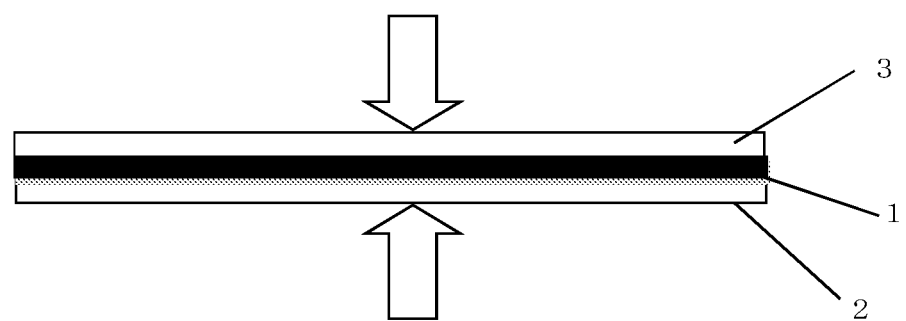
FIG. 2 is a graph of performing overlapping in a manner of bringing the back side of a milk carton white board into contact with the upper surface of a print irradiated with ultraviolet light and pressing along the direction as shown by the arrows.
Figure 3:
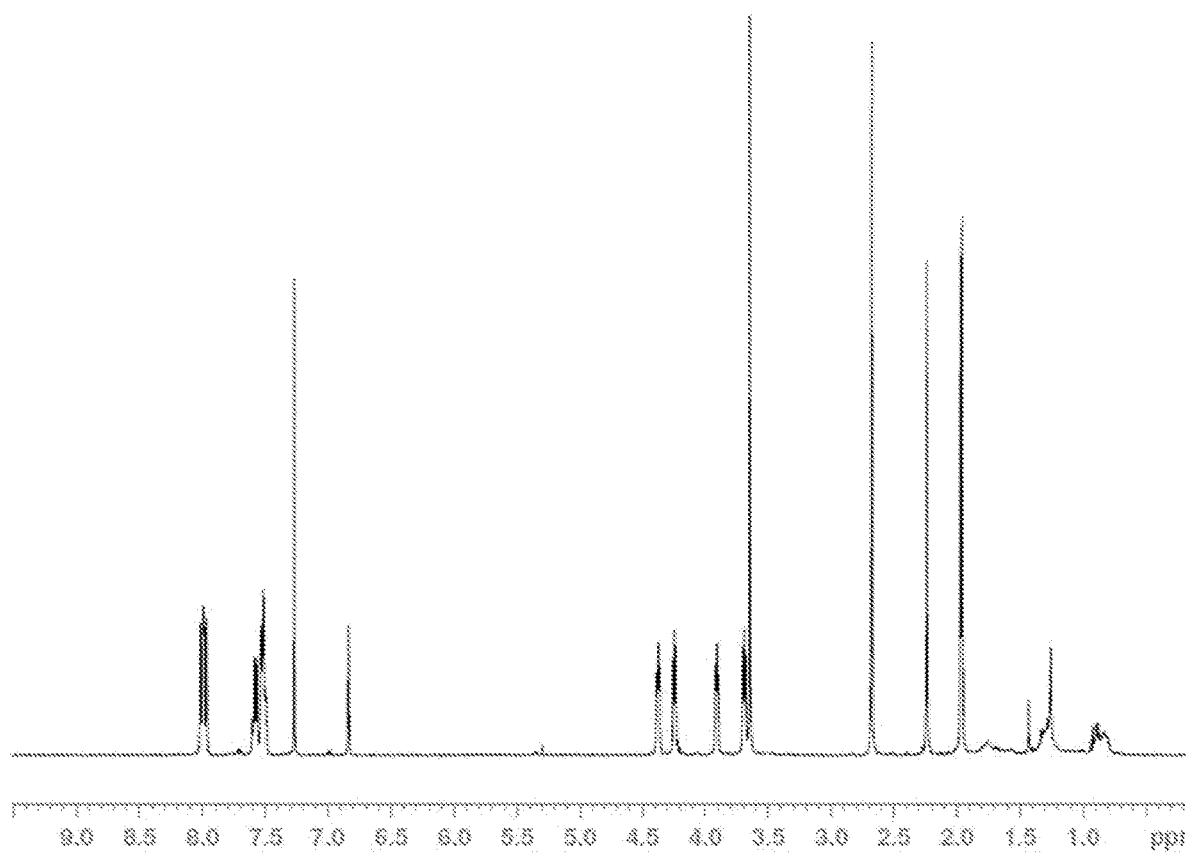
FIG. 3 is a $^1$H-NMR spectrum of the compound M6 obtained in Example 6.
Figure 4:
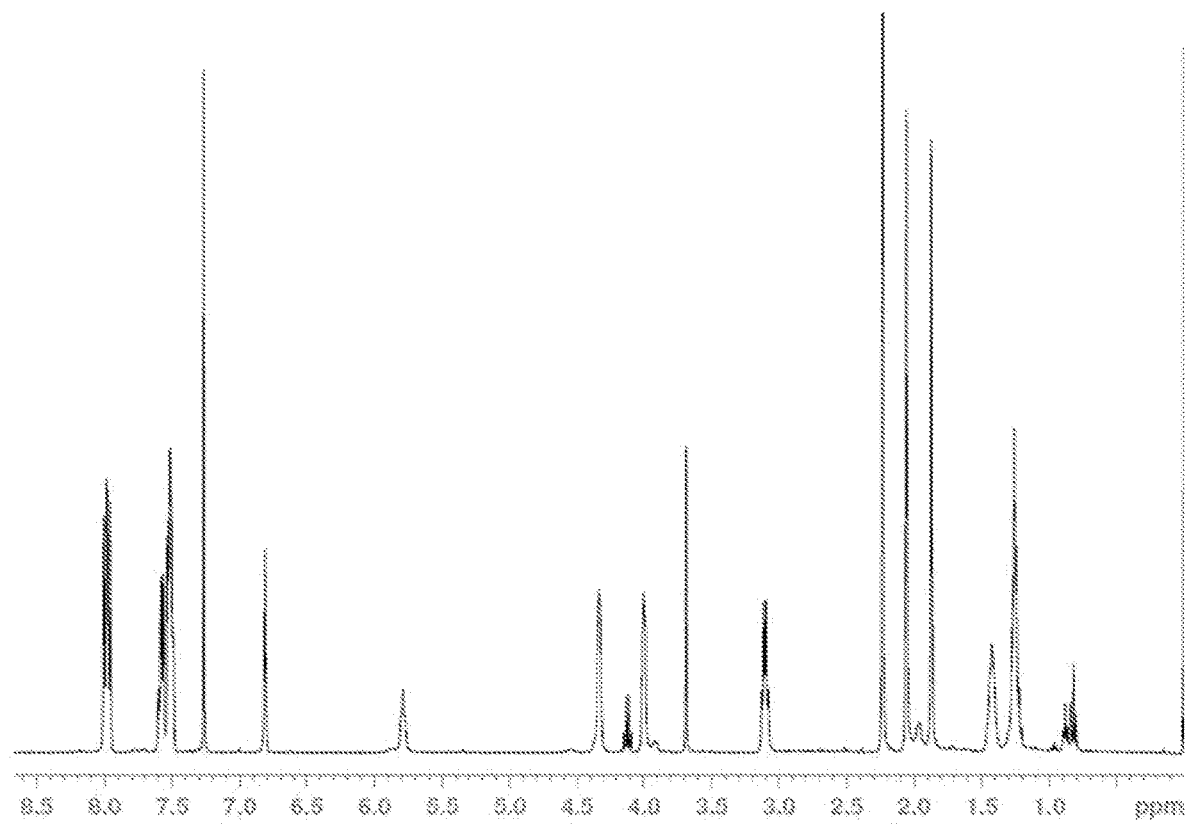
FIG. 4 is a $^1$H-NMR spectrum of the compound M14 obtained in Example 9.
Figure 5:
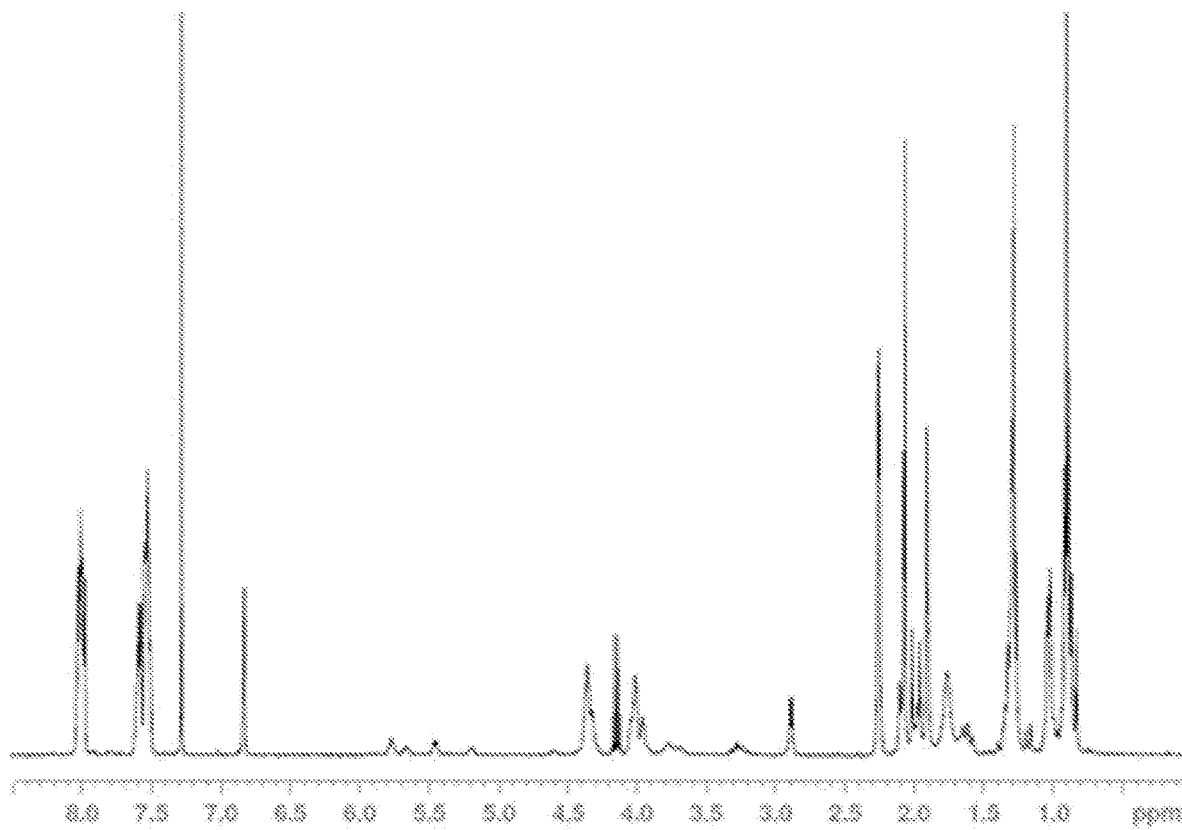
FIG. 5 is a $^1$H-NMR spectrum of the compound M15 obtained in Example 10.
Figure 6:
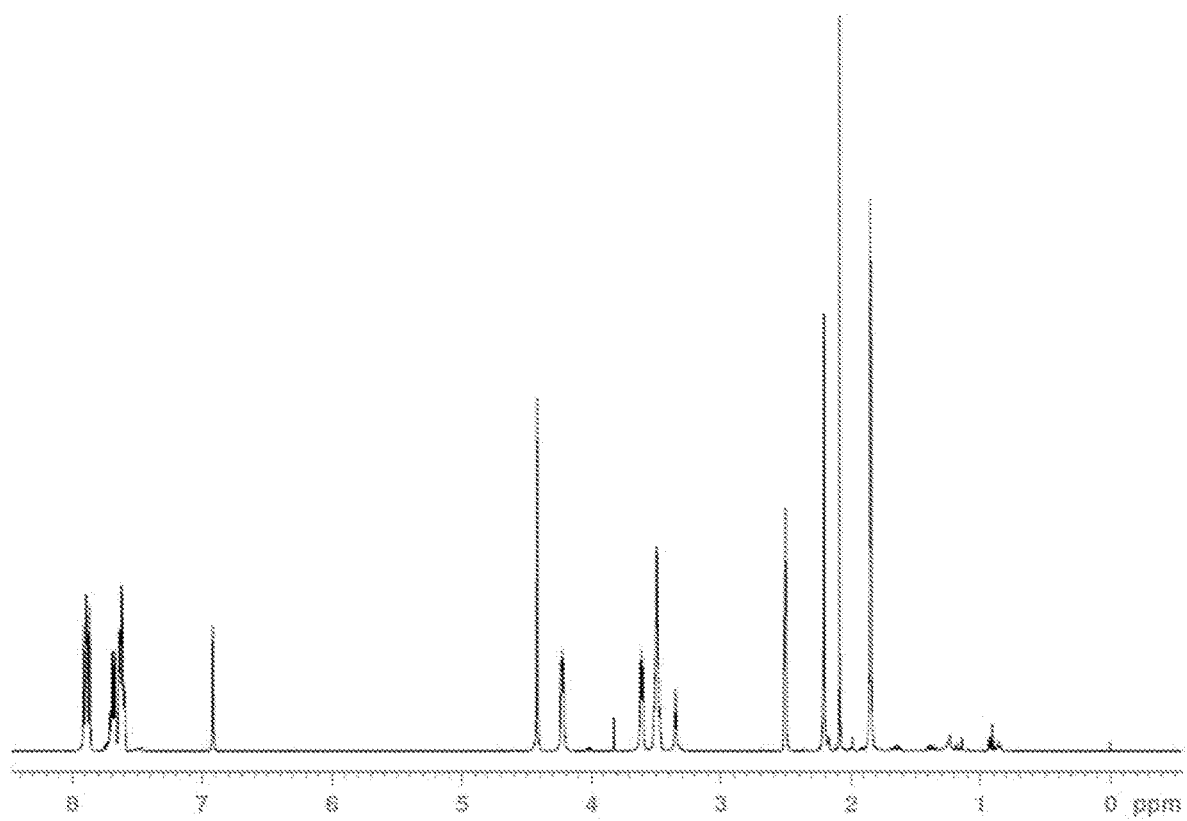
FIG. 6 is a $^1$H-NMR spectrum of the compound M18 obtained in Example 12.
Figure 7:
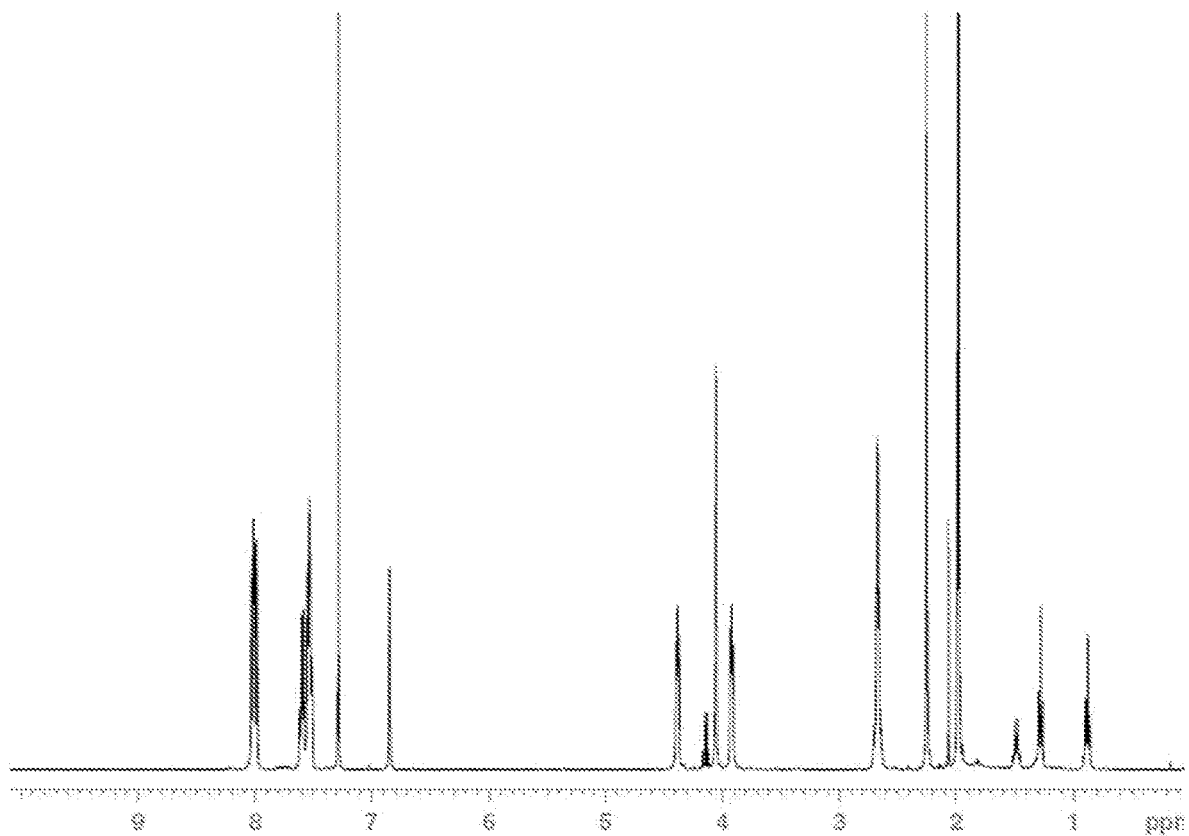
FIG. 7 is a $^1$H-NMR spectrum of the compound M20 obtained in Example 13.
Figure 8:
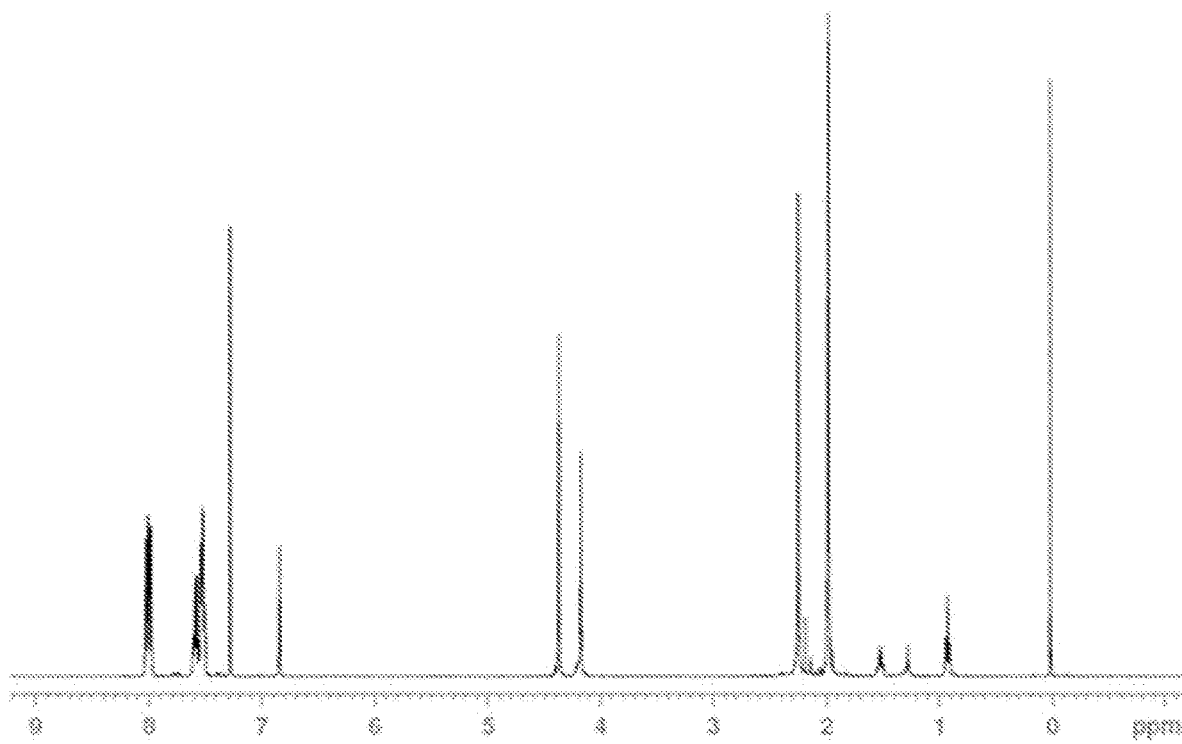
FIG. 8 is a $^1$H-NMR spectrum of the compound M22 obtained in Example 14.
Figure 9:
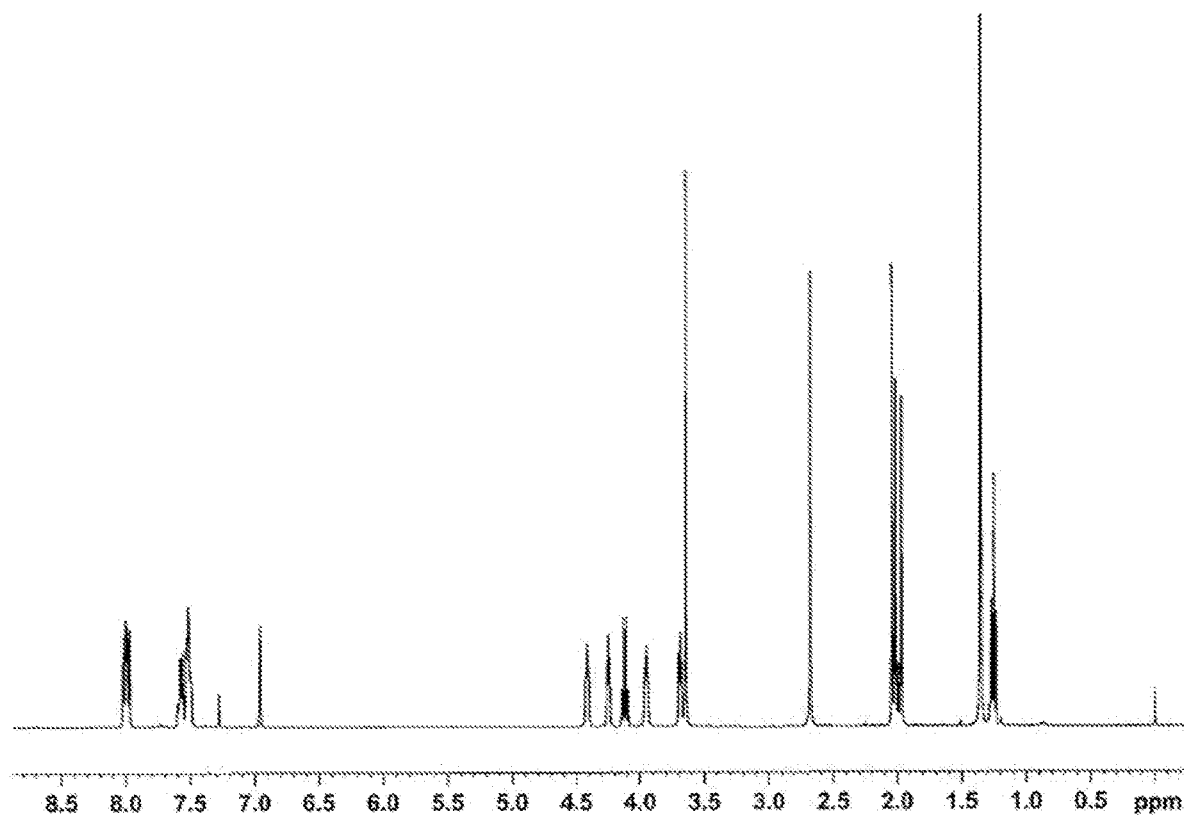
FIG. 9 is a $^1$H-NMR spectrum of the compound M30 obtained in Example 17.

First, a UV irradiation apparatus (produced by EYE GRAPHICS CO., LTD., attached with a cold mirror), which carried a water-cooling metal halide lamp (the output power was 100 W/cm$^2$ per lamp) and a conveying belt, was used to perform UV irradiation twice on a print coated with an ink at a conveying belt speed of 40 m/minute, so as to allow the ink layer to be dried. The ultraviolet integral dose was about 120 mJ/cm$^2$ under this condition. Next, overlapping was performed in a manner of bringing the back side of a milk carton white board (hereinafter, a milk carton board without color development of ink in a non-printed state was referred to as a milk carton white board) into contact with a cured ink layer on the upper surface of a print, and pressurization is performed using a hydraulic press at a press pressure of 40 kg/cm$^2$ and under an atmosphere of room temperature of 25° C. for 48 hours. Therefore, the unreacted components in the cured ink layer were transferred (migrated) onto the back side of the milk carton white board (with reference to FIGS. 1 and 2). After pressing, the milk carton white board was removed and formed to produce a liquid container with a volume of 1000 ml. In this liquid container, the back side to which ink components were transferred faced inside.

Next, 1000 ml of an aqueous ethanol solution (a mixed solution of 95 wt % of ethanol and 5 wt % of pure water) prepared as a simulated liquid food was injected into the liquid container and sealed. It was to be indicated that the total area of the inner surface of the liquid container in contact with the 1000 ml of the aqueous ethanol solution was about 600 cm$^2$ under this condition. The enclosed liquid container was left under an atmosphere of room temperature of 25° C. for 24 hours, whereby the ink components transferred to the back side of the milk carton white board were extracted into the aqueous ethanol solution.

Then, the aqueous ethanol solution was withdrawn from the liquid container, the identification of the initiator used and decomposition products thereof and the quantification of various dissolution concentrations (mobility concentrations) were performed by using liquid chromatography mass spectrometry analysis.

Ethanol solutions of various compounds, including compound M1, compound M6, compound M10, compound M12, compound M14, compound M15, compound M17, compound M18, compound M20, compound M22, compound M24, compound M27, compound M30, compound M31, compound M32, compound M33, compound M34, compound M36, and compound M38, were adjusted and used as standard coupons. Furthermore, a compound having the same molecular structure as that of the above compound (2a) as the decomposition product of these compounds was synthesized, the compound (2b) and the compound (2c) made use of the commercially available agents having the same molecular structure, and their ethanol solutions were used as standard samples. Identification was performed by using these standard samples, a standard curve was preliminarily produced, and the dissolution concentration was calculated.

Furthermore, the ethanol solutions of "Omnirad TPO" (2,4,6-trimethylbenzoyldiphenylphosphine oxide, produced by IGM RESINS Corporation) and "Omnirad TPO-L" (ethyl [2,4,6-trimethylbenzoyl]phenylphosphinate, produced by IGM RESINS Corporation) used in Comparative Examples were produced as standard samples by using the same operation. Furthermore, the decomposition products of "Omnirad TPO" and "Omnirad TPO-L", i.e., 2,4,6-trimethylbenzaldehyde, biphenyl phosphine oxide, biphenyl phosphinic acid, ethoxyphenyl phosphine oxide, and ethoxyphenyl phosphinic acid, were purchased as the commercially available agents and were produced ethanol solutions as standard samples. As for these standard samples, identification was performed while a standard curve was produced to calculate the dissolution concentrations.

Dissolution amounts of respective substances were calculated by the operation in this manner, and the migration was evaluated according to the criteria described below.

⊚: Less than 20 ppb

◯: 20 to less than 30 ppb

Δ: 30 ppb or more to less than 60 ppb x: 60 ppb or more (Evaluation Method of Prints of Photocurable Ink for Offset Printing: Odor)

The print cured by the curing method described above was cut into pieces with a length of 5 cm and a width of 2.5 cm, and 10 pieces were prepared. These 10 pieces were quickly placed in a collection vial having an outer diameter of 40 mm, a height of 75 mm, a mouth inner diameter of 20.1 mm, and a volume of 50 ml, and the collection vial was capped and stored in a constant-temperature tank at 60° C. for 1 hour, and the collection vial was filled with odor. Next, the collection vial was left until room temperature was reached, the intensity of odor was evaluated by 10 panelists, and the odor intensity of each sample was evaluated by 10 ranks.

The odor evaluation results of 10 panelists were averaged and used as the odor intensity of the sample. It was to be indicated that a higher numeric value indicated a smaller odor.

⊚: 10 to 9

◯: 8 to 6

Δ: 5 to 3 x: 2 to 1

TABLE 3

| Table 3 | | Example 24 | Example 25 | Example 26 | Example 27 | Example 28 | Example 29 | Example 30 | Example 31 | Example 32 | Example 33 |
|---|---|---|---|---|---|---|---|---|---|---|---|
| Matrix ink for offset printing described in Table 1 | | 100 | 100 | 100 | 100 | 100 | 100 | 100 | 100 | 100 | 100 |
| Photopolymerization initiator | M1 | 18.0 | | | | | | | | | |
| | M6 | | 18.2 | | | | | | | | |
| | M10 | | | 16.5 | | | | | | | |
| | M12 | | | | 13.5 | | | | | | |
| | M14 | | | | | 14.5 | | | | | |
| | M15 | | | | | | 15.5 | | | | |
| | M17 | | | | | | | 13.8 | | | |
| | M18 | | | | | | | | 15.5 | | |
| | M20 | | | | | | | | | 16.0 | |
| | M22 | | | | | | | | | | 13.2 |
| Total | | 118.0 | 118.2 | 116.5 | 113.5 | 114.5 | 115.5 | 113.8 | 115.5 | 116.0 | 113.2 |
| Internal curability | | ◎ | ◎ | ◎ | ◎ | ◎ | ◎ | ◎ | ◎ | ◎ | ◎ |
| Surface curability | | ○ | ○ | ○ | ○ | ○ | ○ | ○ | ○ | ○ | ○ |
| Odor | | ○ | ◎ | ◎ | ◎ | ◎ | ◎ | ◎ | ◎ | ◎ | ◎ |
| Migration of the unreacted photopolymerization initiator | | ○ | ◎ | ◎ | ◎ | ◎ | ◎ | ◎ | ◎ | ◎ | ◎ |
| Migration of benzaldehyde compound (2a) | | ◎ | ◎ | ◎ | ◎ | ◎ | ◎ | ◎ | ◎ | ◎ | ◎ |
| Migration of alkyl phosphine oxide compound (2b) | | ◎ | ◎ | ◎ | ◎ | ◎ | ◎ | ◎ | ◎ | ◎ | ◎ |
| Migration of alkyl phosphinic acid compound (2c) | | ◎ | ◎ | ◎ | ◎ | ◎ | ◎ | ◎ | ◎ | ◎ | ◎ |

TABLE 4

| Table 4 | | Example 34 | Example 35 | Example 36 | Example 37 | Example 38 | Example 39 | Example 40 | Example 41 | Example 42 |
|---|---|---|---|---|---|---|---|---|---|---|
| Matrix ink for offset printing described in Table 1 | | 100 | 100 | 100 | 100 | 100 | 100 | 100 | 100 | 100 |
| Photopolymerization initiator | M24 | 8.8 | | | | | | | | |
| | M27 | | 21.5 | | | | | | | |
| | M30 | | | 20.0 | | | | | | |
| | M31 | | | | 18.2 | | | | | |
| | M32 | | | | | 17.1 | | | | |
| | M33 | | | | | | 17.0 | | | |
| | M34 | | | | | | | 17.5 | | |
| | M36 | | | | | | | | 14.5 | |
| | M38 | | | | | | | | | 15.2 |
| Total | | 108.8 | 121.5 | 120.0 | 118.2 | 117.1 | 117.0 | 117.5 | 114.5 | 115.2 |
| Internal curability | | ◎ | ◎ | ◎ | ◎ | ◎ | ◎ | ◎ | ◎ | ◎ |
| Surface curability | | ○ | ◎ | ○ | ○ | ○ | ○ | ○ | ○ | ○ |
| Odor | | ◎ | ○ | ◎ | ◎ | ◎ | ◎ | ◎ | ◎ | ◎ |
| Migration of the unreacted photopolymerization initiator | | ◎ | ○ | ◎ | ◎ | ◎ | ◎ | ◎ | ◎ | ◎ |
| Migration of benzaldehyde compound (2a) | | ◎ | ◎ | ◎ | ◎ | ◎ | ◎ | ◎ | ◎ | ◎ |
| Migration of alkyl phosphine oxide compound (2b) | | ◎ | ◎ | ◎ | ◎ | ◎ | ◎ | ◎ | ◎ | ◎ |
| Migration of alkyl phosphinic acid compound (2c) | | ◎ | ◎ | ◎ | ◎ | ◎ | ◎ | ◎ | ◎ | ◎ |

TABLE 5

| Table 5 | | Comparative Example 1 | Comparative Example 2 |
|---|---|---|---|
| Matrix ink for offset printing described in Table 1 | | 100 | 100 |
| Photopolymerization initiator | TPO | 10.0 | |
| | TPO-L | | 9.0 |
| Total | | 110.0 | 109.0 |
| Internal curability | | ◎ | ◎ |
| Surface curability | | ○ | ○ |
| Odor | | X | X |
| Migration of the unreacted photopolymerization initiator | | X | X |
| Migration of benzaldehyde compound (2a) | | X | X |
| Migration of alkyl phosphine oxide compound (2b) | | ◎ | ◎ |
| Migration of alkyl phosphinic acid compound (2c) | | ◎ | ◎ |

TABLE 6

| Table 6 | | Example 43 | Example 44 | Example 45 | Example 46 | Example 47 | Example 48 | Example 49 | Example 50 | Example 51 | Example 52 |
|---|---|---|---|---|---|---|---|---|---|---|---|
| Matrix ink for offset printing described in Table 2 | | 100 | 100 | 100 | 100 | 100 | 100 | 100 | 100 | 100 | 100 |
| Photopolymerization initiator | M1 | 18.0 | | | | | | | | | |
| | M6 | | 18.2 | | | | | | | | |
| | M10 | | | 16.5 | | | | | | | |
| | M12 | | | | 13.5 | | | | | | |
| | M14 | | | | | 14.5 | | | | | |
| | M15 | | | | | | 15.5 | | | | |
| | M17 | | | | | | | 13.8 | | | |
| | M18 | | | | | | | | 15.5 | | |
| | M20 | | | | | | | | | 16.0 | |
| | M22 | | | | | | | | | | 13.2 |
| | Total | 118.0 | 118.2 | 116.5 | 113.5 | 114.5 | 115.5 | 113.8 | 115.5 | 116.0 | 113.2 |
| Yellowing | | ○ | ○ | ○ | ○ | ○ | ○ | ○ | ○ | ○ | ○ |

TABLE 7

| Table 7 | | Example 53 | Example 54 | Example 55 | Example 56 | Example 57 | Example 58 | Example 59 | Example 60 | Example 61 |
|---|---|---|---|---|---|---|---|---|---|---|
| Matrix ink for offset printing described in Table 2 | | 100 | 100 | 100 | 100 | 100 | 100 | 100 | 100 | 100 |
| Photopolymerization initiator | M24 | 8.8 | | | | | | | | |
| | M27 | | 21.5 | | | | | | | |
| | M30 | | | 20.0 | | | | | | |
| | M31 | | | | 18.2 | | | | | |
| | M32 | | | | | 17.1 | | | | |
| | M33 | | | | | | 17.0 | | | |
| | M34 | | | | | | | 17.5 | | |
| | M36 | | | | | | | | 14.5 | |
| | M38 | | | | | | | | | 15.2 |
| | Total | 108.8 | 121.5 | 120.0 | 118.2 | 117.1 | 117.0 | 117.5 | 114.5 | 115.2 |
| Yellowing | | ○ | ○ | ○ | ○ | ○ | ○ | ○ | ○ | ○ |

TABLE 8

| Table 8 | | Comparative Example 3 | Comparative Example 4 |
|---|---|---|---|
| Matrix ink for offset printing described in Table 2 | | 100 | 100 |
| Photopolymerization initiator | TPO | 10.0 | |
| | TPO-L | | 9.0 |
| | Total | 110.0 | 109.0 |
| Yellowing | | ○ | ○ |

In the tables, the blank was the short form of "not compounded", and abbreviations were as follows:

TPO: Omnirad TPO (2,4,6-trimethylbenzoyl diphenyl phosphine oxide, produced by IGM RESINS Corporation)

TPO-L: Omnirad TPO-L (ethyl [2,4,6-trimethylbenzoyl] phenylphosphinate, produced by IGM RESINS Corporation)

(Production Method of Photocurable Ink for Inkjet Recording)

Raw materials were compounded according to the compositions as shown in Table 9, evenly stirred with a mixer, and treated with a bead mill for 4 hours, so as to produce a grinding matrix.

Next, the resultant grinding matrix and other raw materials are compounded according to the composition as shown Table 10, and evenly stirred with a mixer, so as to produce an inkjet matrix ink.

Finally, various photopolymerization initiators produced by Examples 5 to 23 or other commercially available photopolymerization initiators were compounded into the inkjet matrix ink according to the compositions as shown in Table 12 to Table 14, evenly stirred with a mixer, so as to produce photocurable inks for inkjet recording of the Examples and the Comparative Examples.

TABLE 9

| Table 9 Composition of grinding matrix | Raw material (Product name) | Raw material (Substance name) | Parts by mass |
|---|---|---|---|
| Pigment | CARBON #960 | Carbon black | 10.0 |
| Dispersant | SOLSPERSE 32000 | Basic dispersant | 6.0 |
| | Miramer M-222 | Dipropylene glycol diacrylate | 84.0 |
| Total | | | 100 |

In the table, abbreviations were as follows:

CARBON #960: Mitsubishi carbon black #960 (produced by Mitsubishi Chemical, Co., Ltd.) SOLSPERSE 32000: a basic dispersant (produced by The Lubrizol Corporation)

Miramer M-222: dipropylene glycol diacrylate (produced by MIWON Corporation)

TABLE 10

| Table 10 Matrix ink for ink jetting | | Raw material (Substance name) | Parts by mass |
|---|---|---|---|
| Grinding matrix (Parts by mass) | — | | 25.0 |
| Monomer | VEEA-AI | Ethyleneoxyethoxyethyl acrylate | 33.8 |
| | Miramer M-222 | Dipropylene glycol diacrylate | 10.5 |
| | SR341 | 3-methyl-1,5-pentanediol diacrylate | 25.3 |
| Polymerization inhibitor | NONFLEX ALBA | 2,5-di-t-butyl hydroquinone | 0.1 |
| Surface tension adjusting agent | KF-351A | A polyether-modified polydimethylsiloxane | 0.3 |
| Auxiliary photopolymerization initiator | OmnipolTX | Bifunctional thioxanthone photopolymerization initiator | 5 |
| Total | | | 100.0 |

In the table, abbreviations were as follows:
Miramer M-222: dipropylene glycol diacrylate (produced by MIWON Corporation)
VEEA-AI: 2-ethyleneoxyethoxyethyl acrylate (produced by Nippon Shokubai)
SR341: 3-methyl-1,5-pentanediol diacrylate (produced by SARTOMER Corporation)
NONFLEX ALBA: 2,5-di-t-butyl hydroquinone (produced by Seiko Chemical Co., Ltd.)
KF-351A: a polyether-modified polydimethylsiloxane (produced by Shin-Etsu Chemical Co., Ltd.)
Omnipol TX: a diester of carboxymethoxy thioxanthone and polytetraethylene glycol 250 (produced by IGM RESINS Corporation).

(Production Method of Prints of Photocurable Ink for Inkjet Recording)

Using an inkjet printer (an inkjet tester EB100 produced by KONICA MINOLTA, INC.) and using a printer head KM512 L (the ejection amount was 42 pl), the resultant photocurable ink for inkjet recording was printed on the surface of a milk carton board (a polyethylene laminated board) with an ink concentration of 1.8 (measured with a SpectroEye concentration meter produced by X-Rite Corporation) to obtain a solid testing pattern, so as to produce a print.

(Curing Method of Photocurable Ink for Inkjet Recording Based on a UV Lamp Light Source)

The print coated with the photocurable ink for inkjet recording obtained by the method described above was irradiated with ultraviolet (UV) to allow an ink film to be cured and dried. A UV irradiation apparatus (produced by EYE GRAPHICS CO., LTD.), which carried a water-cooling type UV-LED (the central light-emitting wavelength was 385 nm±5 nm, and the output power of the UV-LED was 100%) and a conveying belt, was used. The print was placed on the conveying belt and was allowed to pass just beneath the LED with an irradiation distance of 9 cm 4 times, at a conveying belt speed of 50 m/minute.

(Evaluation Method of the Photocurable Ink Composition for Inkjet Recording: Surface-Internal Curability)

The internal curability of a cured film was evaluated by rubbing a cured ink layer with a fingernail immediately after curing. On the other hand, the surface curability of a cured film was evaluated by rubbing surface layers of respective cured products with a high-quality paper.

Evaluation criteria were set as follows.

◎: Not damaged even if rubbing with a great force, which shows very good UV curability.

○: Slightly damaged if rubbing with a great force.

Δ: Significantly damaged if rubbing with a great force.

x: Significantly damaged even if rubbing with a small force, which shows bad UV curability.

(Evaluation Method of the Photocurable Ink Composition for Inkjet Recording: Yellowing)

Inks described in Examples 81 to 99 and Comparative Examples 7 to 8, which was obtained by compounding various photopolymerization initiators produced by Examples 1 to 23 or other commercially available photopolymerization initiators into a colorless and transparent matrix ink of Table 11, were loaded on a white PET film Lumirror 250-E22 produced by Toray Co., Ltd. An even coating film was produced by using a No. 4 bar coater. With the PET film loaded with the ink described above, the white PET film coated with the ink described above was irradiated 4 times with ultraviolet by using the UV-LED ultraviolet irradiation apparatus described above under conditions that the output power was 100% and the speed of the conveying belt was 10 m/minute. Next, the change in color caused by the color change (yellowing) of a cured film after irradiated with ultraviolet was confirmed, and evaluated according to the 3 ranks described below.

○: Completely or substantially no change in color,

Δ: Slightly yellowing may be confirmed, x: Significant change in color caused by yellowing may be confirmed.

TABLE 11

| Table 11 | | Raw material (Substance name) | Parts by mass |
|---|---|---|---|
| Monomer | VEEA-AI | Ethyleneoxyethoxyethyl acrylate | 34.0 |
| | Miramer M-222 | Dipropylene glycol diacrylate | 38.5 |
| Polymerization inhibitor | SR341 | 3-methyl-1,5-pentanediol diacrylate | 27.1 |
| | NONFLEX ALBA | 2,5-di-t-butyl hydroquinone | 0.1 |
| Surface tension adjusting agent | KF-351A | A polyether-modified polydimethylsiloxane | 0.3 |
| Total | | | 100 |

(Evaluation Method of Prints of Photocurable Ink for Inkjet Recording: Migration Resistance)

A method, which is the same as the evaluation method of (photocurable ink for offset printing) described above, was used.

(Evaluation Method of Prints of Photocurable Ink for Inkjet Recording: Odor)

A method, which is the same as the evaluation method of (photocurable ink for offset printing) described above, was used.

TABLE 0

| Table 12 | | Example 62 | Example 63 | Example 64 | Example 65 | Example 66 | Example 67 | Example 68 | Example 69 | Example 70 | Example 71 |
|---|---|---|---|---|---|---|---|---|---|---|---|
| Matrix ink for ink jetting described in Table 10 | | 100 | 100 | 100 | 100 | 100 | 100 | 100 | 100 | 100 | 100 |
| Photopolymerization initiator | M1 | 18.0 | | | | | | | | | |
| | M6 | | 18.2 | | | | | | | | |
| | M10 | | | 16.5 | | | | | | | |
| | M12 | | | | 13.5 | | | | | | |
| | M14 | | | | | 14.5 | | | | | |
| | M15 | | | | | | 15.5 | | | | |
| | M17 | | | | | | | 13.8 | | | |
| | M18 | | | | | | | | 15.5 | | |
| | M20 | | | | | | | | | 16.0 | |
| | M22 | | | | | | | | | | 13.2 |
| Total | | 120.0 | 120.0 | 118.0 | 114.8 | 116.0 | 117.0 | 115.0 | 117.0 | 117.5 | 114.5 |
| Internal curability | | ◎ | ◎ | ◎ | ◎ | ◎ | ◎ | ◎ | ◎ | ◎ | ◎ |
| Surface curability | | ○ | ○ | ○ | ○ | ○ | ○ | ○ | ○ | ○ | ○ |
| Odor | | ○ | ◎ | ◎ | ◎ | ◎ | ◎ | ◎ | ◎ | ◎ | ◎ |
| Migration of the unreacted photopolymerization initiator | | ○ | ◎ | ◎ | ◎ | ◎ | ◎ | ◎ | ◎ | ◎ | ◎ |
| Migration of benzaldehyde compound (2a) | | ◎ | ◎ | ◎ | ◎ | ◎ | ◎ | ◎ | ◎ | ◎ | ◎ |
| Migration of alkyl phosphine oxide compound (2b) | | ◎ | ◎ | ◎ | ◎ | ◎ | ◎ | ◎ | ◎ | ◎ | ◎ |
| Migration of alkyl phosphinic acid compound (2c) | | ◎ | ◎ | ◎ | ◎ | ◎ | ◎ | ◎ | ◎ | ◎ | ◎ |

TABLE 13

| Table 33 | | Example 72 | Example 73 | Example 74 | Example 75 | Example 76 | Example 77 | Example 78 | Example 79 | Example 80 |
|---|---|---|---|---|---|---|---|---|---|---|
| Matrix ink for ink jetting described in Table 10 | | 100 | 100 | 100 | 100 | 100 | 100 | 100 | 100 | 100 |
| Photopolymerization initiator | M24 | 8.8 | | | | | | | | |
| | M27 | | 21.5 | | | | | | | |
| | M30 | | | 20.0 | | | | | | |
| | M31 | | | | 18.2 | | | | | |
| | M32 | | | | | 17.1 | | | | |
| | M33 | | | | | | 17.0 | | | |
| | M34 | | | | | | | 17.5 | | |
| | M36 | | | | | | | | 14.5 | |
| | M38 | | | | | | | | | 15.2 |
| Total | | 108.8 | 121.5 | 120.0 | 118.2 | 117.1 | 117.0 | 117.5 | 114.5 | 115.2 |
| Internal curability | | ◎ | ◎ | ◎ | ◎ | ◎ | ◎ | ◎ | ◎ | ◎ |
| Surface curability | | ○ | ◎ | ○ | ○ | ○ | ○ | ○ | ○ | ○ |
| Odor | | ◎ | ○ | ◎ | ◎ | ◎ | ◎ | ◎ | ◎ | ◎ |
| Migration of the unreacted photopolymerization initiator | | ◎ | ○ | ◎ | ◎ | ◎ | ◎ | ◎ | ◎ | ◎ |
| Migration of benzaldehyde compound (2a) | | ◎ | ◎ | ◎ | ◎ | ◎ | ◎ | ◎ | ◎ | ◎ |
| Migration of alkyl phosphine oxide compound (2b) | | ◎ | ◎ | ◎ | ◎ | ◎ | ◎ | ◎ | ◎ | ◎ |
| Migration of alkyl phosphinic acid compound (2c) | | ◎ | ◎ | ◎ | ◎ | ◎ | ◎ | ◎ | ◎ | ◎ |

TABLE 14

| Table 14 | | Comparative Example 5 | Comparative Example 6 |
|---|---|---|---|
| Matrix ink for ink jetting described in Table 10 | | 100 | 100 |
| Photopolymerization initiator | TPO | 10.0 | |
| | TPO-L | | 9.0 |
| Total | | 110.0 | 109.0 |
| Internal curability | | ◎ | ◎ |
| Surface curability | | ○ | ○ |
| Odor | | X | X |
| Migration of the unreacted photopolymerization initiator | | X | X |
| Migration of benzaldehyde compound (2a) | | X | X |
| Migration of alkyl phosphine oxide compound (2b) | | ◎ | ◎ |
| Migration of alkyl phosphinic acid compound (2c) | | ◎ | ◎ |

TABLE 15

| Table 15 | | Example 81 | Example 82 | Example 83 | Example 84 | Example 85 | Example 86 | Example 87 | Example 88 | Example 89 | Example 90 |
|---|---|---|---|---|---|---|---|---|---|---|---|
| Matrix ink for ink jetting described in Table 11 | | 100 | 100 | 100 | 100 | 100 | 100 | 100 | 100 | 100 | 100 |
| Photopolymerization initiator | M1 | 18.0 | | | | | | | | | |
| | M6 | | 18.2 | | | | | | | | |
| | M10 | | | 16.5 | | | | | | | |
| | M12 | | | | 13.5 | | | | | | |
| | M14 | | | | | 14.5 | | | | | |
| | M15 | | | | | | 15.5 | | | | |
| | M17 | | | | | | | 13.8 | | | |
| | M18 | | | | | | | | 15.5 | | |
| | M20 | | | | | | | | | 16.0 | |
| | M22 | | | | | | | | | | 13.2 |
| Total | | 120.0 | 120.0 | 118.0 | 114.8 | 116.0 | 117.0 | 115.0 | 117.0 | 117.5 | 114.5 |
| Yellowing | | ○ | ○ | ○ | ○ | ○ | ○ | ○ | ○ | ○ | ○ |

TABLE 16

| Table 16 | | Example 91 | Example 92 | Example 93 | Example 94 | Example 95 | Example 96 | Example 97 | Example 98 | Example 99 |
|---|---|---|---|---|---|---|---|---|---|---|
| Matrix ink for ink jetting described in Table 11 | | 100 | 100 | 100 | 100 | 100 | 100 | 100 | 100 | 100 |
| Photopolymerization initiator | M24 | 8.8 | | | | | | | | |
| | M27 | | 21.5 | | | | | | | |
| | M30 | | | 20.0 | | | | | | |
| | M31 | | | | 18.2 | | | | | |
| | M32 | | | | | 17.1 | | | | |
| | M33 | | | | | | 17.0 | | | |
| | M34 | | | | | | | 17.5 | | |
| | M36 | | | | | | | | 14.5 | |
| | M38 | | | | | | | | | 15.2 |
| Total | | 108.8 | 121.5 | 120.0 | 118.2 | 117.1 | 117.0 | 117.5 | 114.5 | 115.2 |
| Yellowing | | ○ | ○ | ○ | ○ | ○ | ○ | ○ | ○ | ○ |

TABLE 17

| Table 17 | | Comparative Example 7 | Comparative Example 8 |
|---|---|---|---|
| Matrix ink for ink jetting described in Table 11 | | 100 | 100 |
| Photopolymerization initiator | TPO | 10.0 | |
| | TPO-L | | 9.0 |
| Total | | 110.0 | 109.0 |
| Yellowing | | ○ | ○ |

In the tables, the blank was the short form of "not compounded", and abbreviations were the same as those above.

Based on the results, it may be confirmed that the inks obtained by the Examples exhibit the same excellent curability and coloring reduction of cured products as those of the existing photopolymerization initiators, and compared to the existing photopolymerization initiators, the migration of the unreacted initiator residues and initiator decomposition products after curing has been reduced and the odor is also small.

DESCRIPTION OF REFERENCE NUMERALS

1 Cured ink layer
2 Milk carton board
3 Milk carton white board

What is claimed is:

1. A compound, characterized in that it is represented by general formula (1):

[Chemical formula 0]

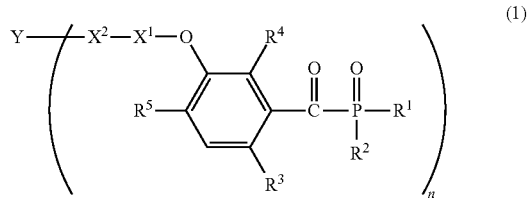

wherein in formula (1), $R^1$ and $R^2$ each independently represent an alkyl group, an aryl group, or an alkoxy group; $R^3$ to $R^5$ each independently represent a hydrogen atom, an alkyl group having a carbon atom number of 1 to 4, or an alkoxy group having a carbon atom number of 1 to 4; $X^1$ represents an optionally branched alkylene group having a carbon atom number of 1 to 6; and $X^2$ represents a bonding group represented by general formulas (2) to (4),

[Chemical formula 0]

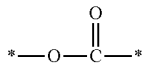   (2)

[Chemical formula 0]

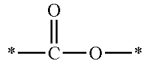   (3)

[Chemical formula 0]

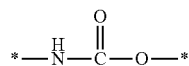   (4)

n represents an integer of 1 to 6; when n is an integer of 1, Y represents an aryl group, a structural moiety (y-3) represented by formula (y-3), a structural moiety (y-5) represented by formula (y-5), a structural moiety (y-8) represented by formula (y-8), a structural moiety (y-9) represented by formula (y-9); and when n is an integer of 2 to 6, Y represents a 2- to 6- valent linking group,

[Chemical formula 1]

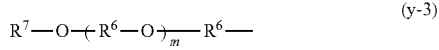   (y-3)

wherein in formula (y-3), $R^6$ represents an alkylene group having a carbon atom number of 2 to 4; $R^7$ represents a hydrogen atom or a phenyl group or an alkyl group having a carbon atom number of 1 to 4; and m represents an integer of 1 to 20,

[Chemical formula 2]

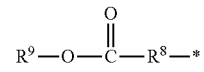   (y-5)

wherein in formula (y-5), $R^8$ represents an alkylene group having a carbon atom number of 1 to 18 or an arylene group having a carbon atom number of 6 to 18; and $R^9$ represents an alkyl group having a carbon atom number of 1 to 18 or an aryl group having a carbon atom number of 6 to 18,

[Chemical formula 3]

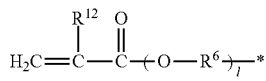   (y-8)

wherein in formula (y-8), $R^6$ represents an alkylene group having a carbon atom number of 2 to 4; $R^{12}$ represents a hydrogen atom or a methyl group; and l represents an integer of 2 to 20,

[Chemical formula 4]

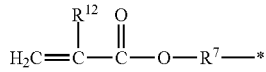   (y-9)

wherein in formula (y-9), $R^7$ represents an alkylene group having a carbon atom number of 1 to 18; and $R^{12}$ represents a hydrogen atom or a methyl group.

2. The compound according to claim 1, wherein the compound represented by the general formula (1) is a compound represented by structural formula (M6), (M10), (M12), (M14), (M15), (M17), (M18), (M20), (M22), (M24), (M27), (M30) to (M34), (M36), or (M38):

[Chemical formula 0]

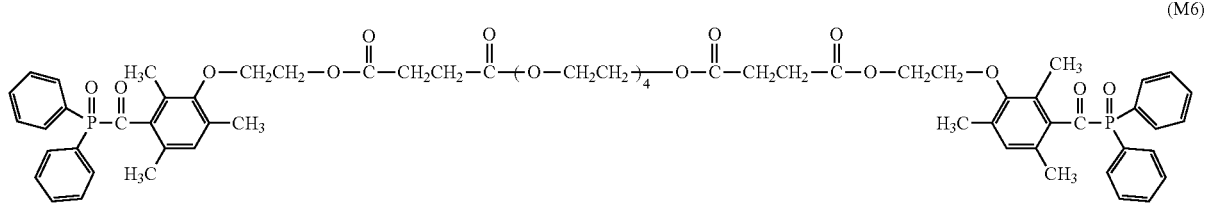   (M6)

[Chemical formula 0]

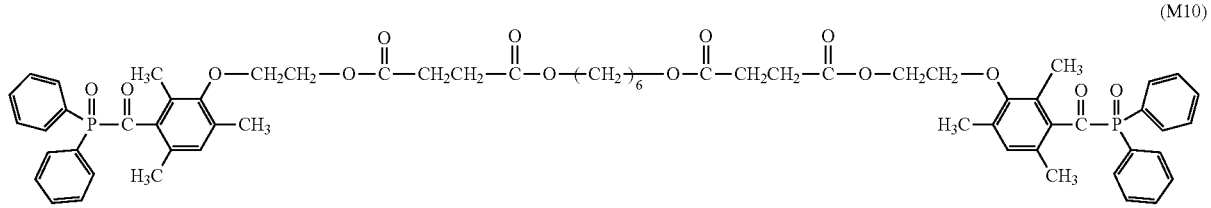   (M10)

[Chemical formula 0]
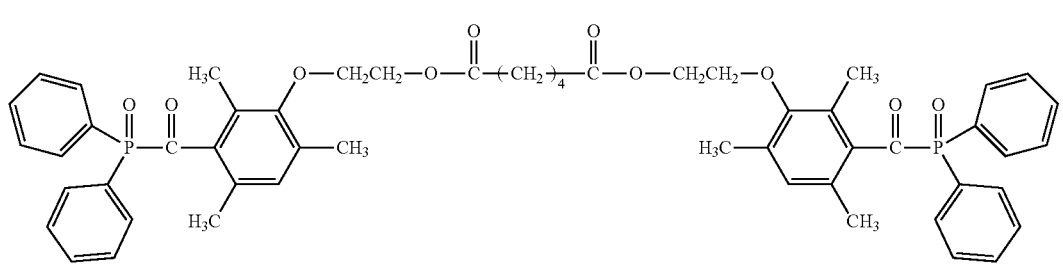
(M12)
[Chemical formula 0]
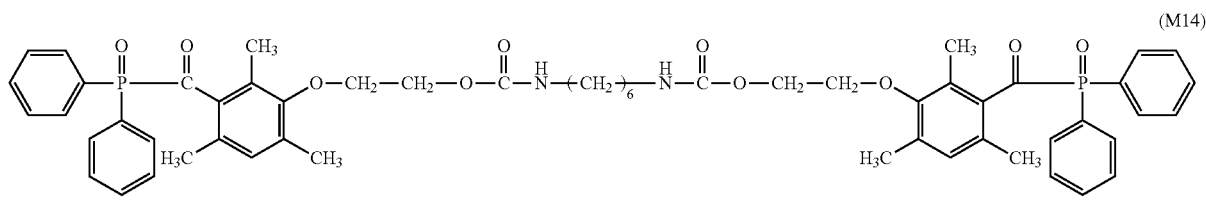
(M14)
[Chemical formula 0]
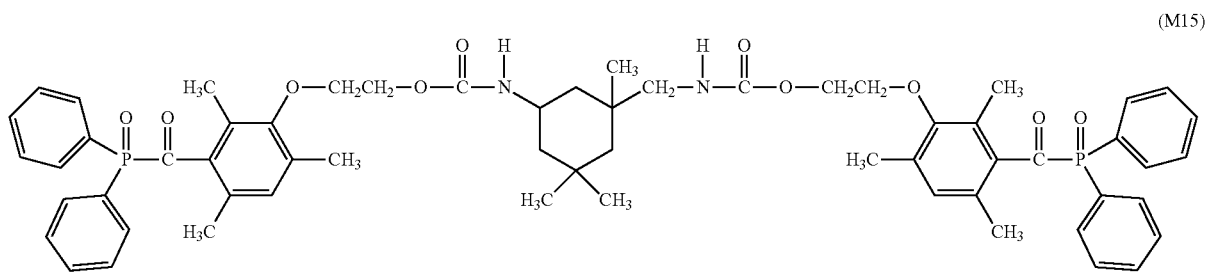
(M15)
[Chemical formula 0]
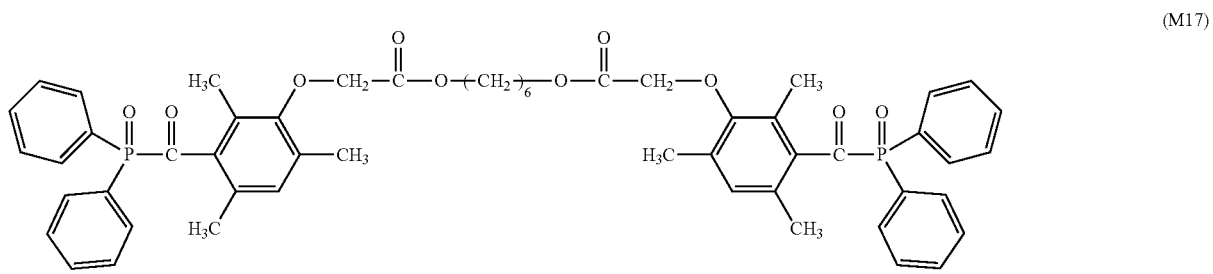
(M17)
[Chemical formula 0]
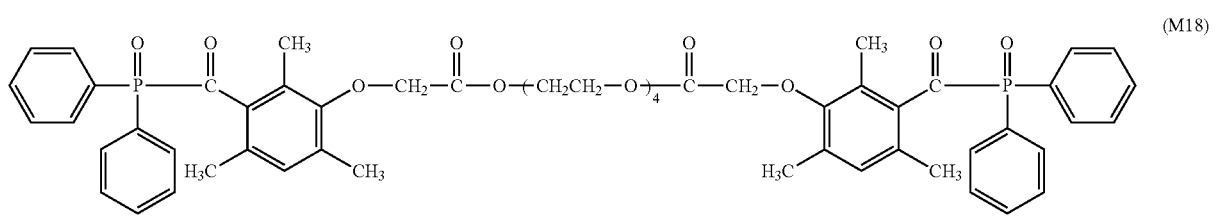
(M18)

[Chemical formula 0]
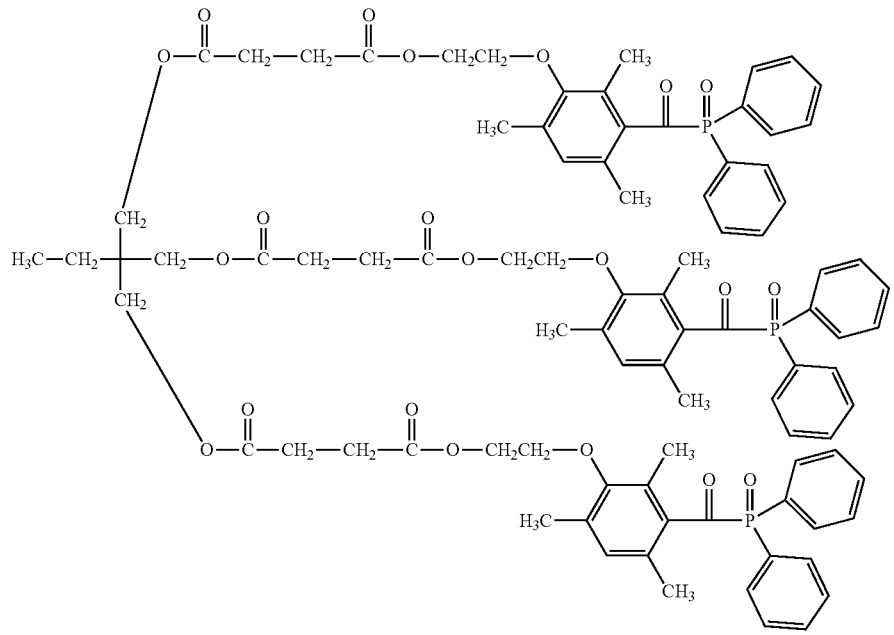
(M20)
[Chemical formula 0]
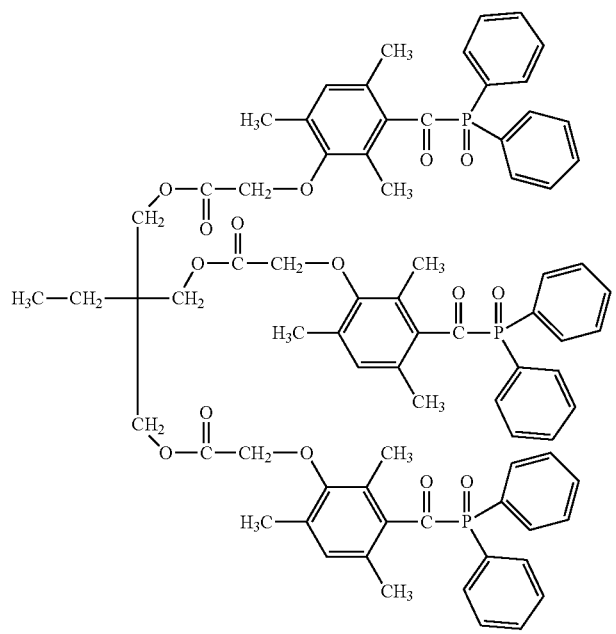
(M22)

-continued
[Chemical formula 0]
(M24)
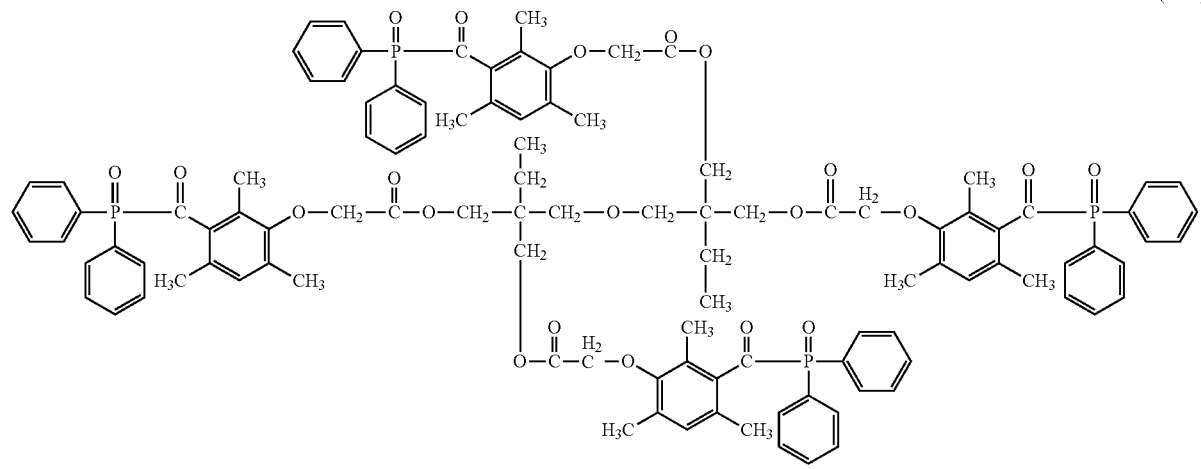
[Chemical formula 0]
(M27)
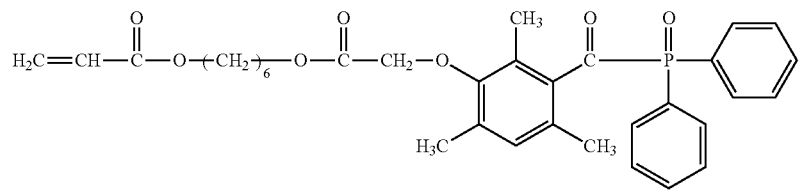
[Chemical formula 0]
(M30)
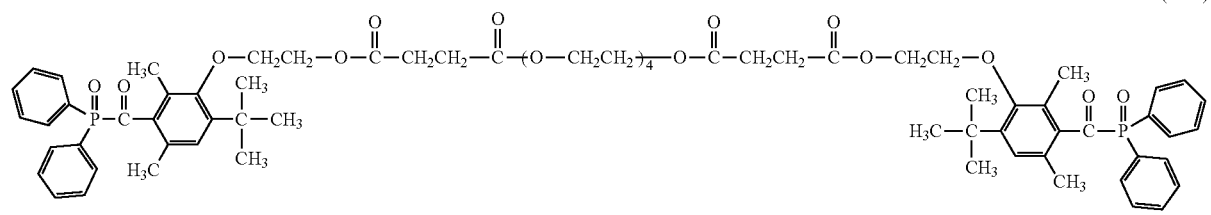
[Chemical formula 0]
(M31)
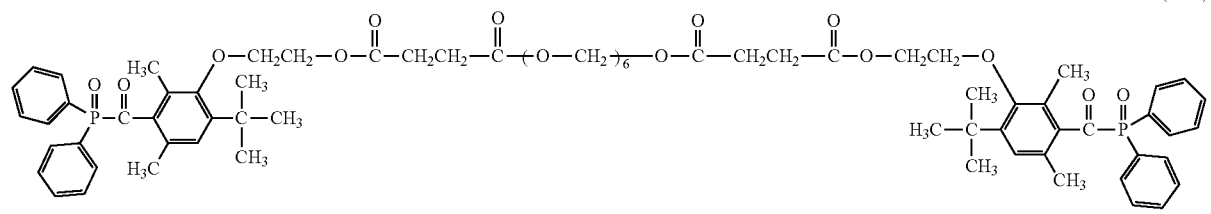
[Chemical formula 0]
(M32)
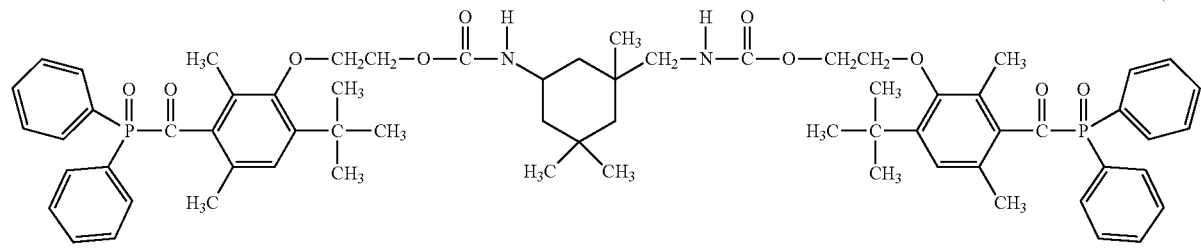

[Chemical formula 0]
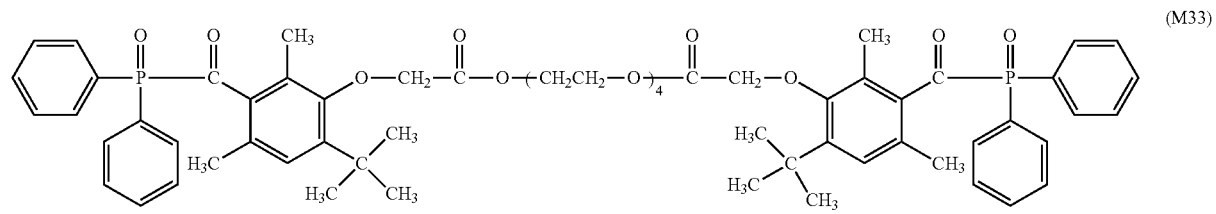
(M33)
[Chemical formula 0]
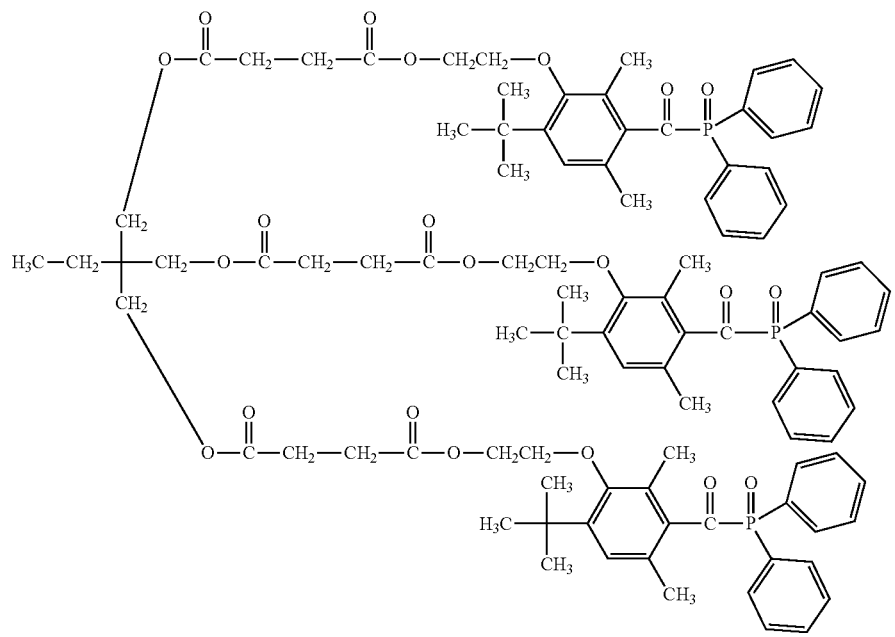
(M34)
[Chemical formula 0]
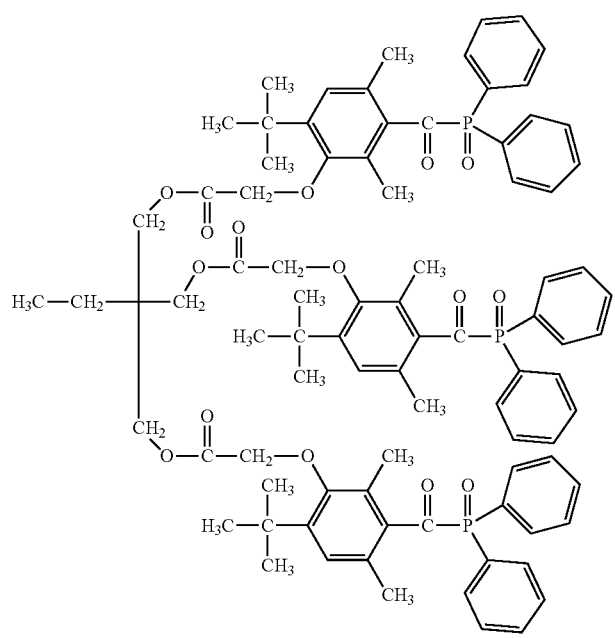
(M36)

[Chemical formula 0]

-continued

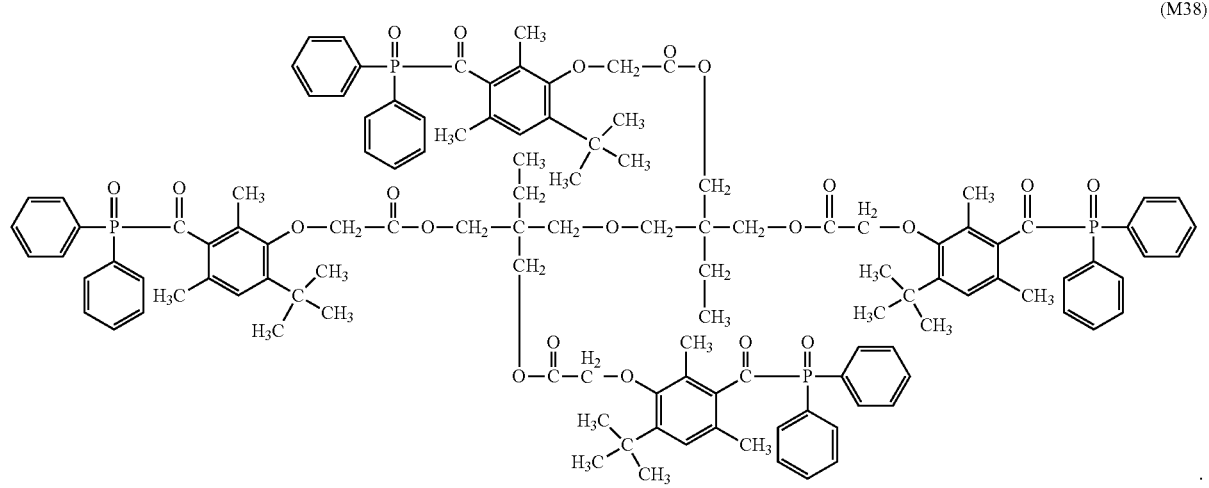

(M38)

3. A photopolymerization initiator, comprising the compound of claim 1.

4. A photocurable composition, comprising the photopolymerization initiator of claim 3 and a photocurable compound as essential components.

5. A cured product, which is a cured product formed by curing the photocurable composition of claim 4.

6. A photocurable ink, comprising the photocurable composition of claim 4.

7. A print, characterized in that it is a print formed by printing the photocurable ink of claim 6 on a base material, wherein the print comprises a benzaldehyde compound (2a), an alkyl phosphine oxide compound (2b), or an alkyl phosphinic acid compound (2c), and wherein the migration concentration of the compound (2a) as measured by the following method is 50 ppb or less, the migration concentration of the compound (2b) as measured by the following method is 50 ppb or less, and the migration concentration of the compound (2c) as measured by the following method is 50 ppb or less, and the method for measurement comprises the steps of:
performing overlapping in a manner of bringing the back side of a milk carton white board in a non-printed state into contact with a cured ink layer evenly printed on a milk carton board, and pressurizing at 25° C. for 48 hours under a press pressure of 40 kg/cm$^2$;

manufacturing a liquid container having a volume of 1000 ml from this milk carton white board in a non-printed state after pressurization;

injecting 1000 ml of an aqueous ethanol solution into this liquid container and enclosing the liquid container, wherein the aqueous ethanol solution is a mixed solution of 95 wt % ethanol and 5 wt % pure water;

keeping the liquid container at room temperature at 25° C. for 24 hours for extracting ink components transferred to the back side of the milk carton white board into the aqueous ethanol solution; and withdrawing the aqueous ethanol solution from the liquid container, and quantifying dissolution concentrations of the compound (2a), the compound (2b), and the compound (2c) by a LC/MS/MS analysis as the migration concentrations.

8. The compound according to claim 1, wherein Y is represented by formula Y5.

9. The compound according to claim 1, wherein Y is represented by structural moiety Y8.

* * * * *